United States Patent
Sheard et al.

(10) Patent No.: US 6,453,356 B1
(45) Date of Patent: Sep. 17, 2002

(54) DATA EXCHANGE SYSTEM AND METHOD

(75) Inventors: Nicolas C. Sheard, Palo Alto; Larry J. Fischer, Campbell; Richard W. Matthews, Redwood City; Gurla Himabindu, Sunnyvale; Qilin Hu, Mountain View; Wendy J. Zheng, Cupertino; Boyle Y. Mow, Freemont, all of CA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/060,667

(22) Filed: Apr. 15, 1998

(51) Int. Cl.$^7$ .............................................. G06F 15/16
(52) U.S. Cl. ...................................................... 709/231
(58) Field of Search ................................ 709/223, 315, 709/100, 231, 230, 329; 713/1; 717/10, 5; 345/335

(56) References Cited

U.S. PATENT DOCUMENTS

| | | | |
|---|---|---|---|
| 4,791,558 A | | 12/1988 | Chaitin et al. |
| 5,386,568 A | | 1/1995 | Wold et al. |
| 5,524,246 A | | 6/1996 | Hurley et al. |
| 5,684,967 A | | 11/1997 | McKenna et al. |
| 5,754,775 A | * | 5/1998 | Adamson et al. ............ 370/261 |
| 5,794,018 A | * | 8/1998 | Vrvilo et al. ................ 709/231 |
| 5,812,768 A | * | 9/1998 | Page et al. ................... 709/217 |
| 6,047,323 A | * | 4/2000 | Krause ........................ 709/201 |
| 6,067,566 A | * | 5/2000 | Moline ....................... 707/500.1 |
| 6,141,691 A | * | 10/2000 | Frink et al. .................. 709/230 |
| 6,202,096 B1 | * | 3/2001 | Williams et al. ............. 709/227 |

FOREIGN PATENT DOCUMENTS

| WO | WO 97/37303 | 10/1997 |
|---|---|---|
| WO | WO 99/15986 | 4/1999 |

OTHER PUBLICATIONS

Robertson, "Integrating Legacy Systems with Modern Corporate Applications," *Communications of the ACM*, 40, 39–46 (1997).

(List continued on next page.)

*Primary Examiner*—St. John Courtenay, III
*Assistant Examiner*—Van H. Nguyen
(74) *Attorney, Agent, or Firm*—Schwegman, Lundberg, Woessner & Kluth, P.A.

(57) ABSTRACT

A system and method for exchanging data between two or more applications includes a data exchange engine and a number of adapters associated with a corresponding number of applications. Each of the adapters is customized to interface with a corresponding application and transforms data being transferred between the application and the data exchange engine. Data produced by a particular application is converted from a technology dependent form to a technology independent form by the corresponding adapter. In one embodiment, the format associated with a data stream is disassociated from the informational content of the data stream by the adapter. The informational content of the data stream is then transformed by the adapter into a common or generic format. The data exchange engine receives data in a technology independent form from each of its associated adapters and coordinates the routing of informational content to particular adapters associated with applications that have requested specific informational content. The adapters receiving the informational content from the data exchange engine transform the informational content having the common format into a data format compatible with, or specific to, their associated applications. A queuing mechanism is employed to construct a reliable asynchronous or pseudo-synchronous interface between disparate applications and systems. The data exchange engine may apply business rules or logic when processing a request for particular informational content. User-specified routing logic may be applied by the data exchange engine to dispatch selected informational content to one or more destination applications.

56 Claims, 18 Drawing Sheets

OTHER PUBLICATIONS

Gilbert, G., "Business Applications Cross the Border," *Beyond the Enterprise*, 2 pgs. (Oct. 1997).

Greenbaum, J., "Competitve Linking Update: CrossRoads to the Rescue," *Hurwitz Balanced View Research Bulletin*, 6 pgs. (Jun. 1997).

"Managing Emerging Telecommunications Technologies For Competitive Advantage," *Versant Object Technolgy* 25 pgs. (1997).

"MQSeries Version 5—The Next Generation," 8 pgs. (Undated).

"ServiceGate™ Retail Service Manager Software," *Bellcore*, 6 pgs. (1997).

"Software Distributed Services Environment," *Softwire*, 4 pgs. (1997).

"Versant ODBMS Release 5," *Versant Object Technologies*, 8 pgs. (Oct. 1997).

Product Literature, "SAIC Project Profile," http:www.saic.com/telecom/profiles/ebss.html, 1 pg. (Oct. 1997).

Product Literature, "DSET Company Profile," http://www.dset.com/company/profile.html, 11 pgs. (Oct. 1997).

Product Literature, "Crossroads Software," http://www.crossroads–software.com/archsvcs.html, 5 pgs. (Jan. 1998), Product Literature, "CrossRoads Customer Interaction, "http//www.crossroads–software.com/customer interaction.html, 1 pg. (Jan. 1998).

Product Literature, "CrossRoads," http://www.crossroads–software.com/processware.html, 2 pgs. (Jan. 1998).

Product Literature, "CrossRoads Partner," http://www.crossroads–software.com/partner information.html, 2 pgs. (Jan. 1998).

Product Literature, "Aberdeen Group," http://www.crossroads–software.com/aberdeenimpact.html, 3 pgs. (Jan. 1998).

Product Literature, "CrossRoads Management," http://www.crossroads–software.com/mgmt team.html, 3 pgs. (Jan. 1998).

Product Literature, "Enterprise Management Strategy," http://www.cai.com/products/unicent/whitepap.html, 23 pgs. (Feb. 1998).

Product Literature, "Computer Associates Press Release," http://www.cai.com/press/97dec/jasmine launch.html, 3 pgs. (Feb. 1998).

Product Literature, "Computer Associates Unicenter® TNG," http://www.cai.com/products/tng endorse.html, 6 pgs. (Feb. 1998).

Product Literature, "Computer Associates Product Description," http://www.cai.com/products/unicent/tng ov.html, 8 pgs. (Feb. 1998).

Product Literature, "OPAL Version 2," http://www.cai.com/products/opal/wp1.html, 20 pgs. (Feb. 1998).

Product Literature, "Versant Object Technology," http://www.versant.com/whats new, 27 pgs. (Jan. 1998).

Product Literature, "SAIC The Vision," http://www.saic.com/telecom/index.html, 4 pgs. (Jan. 1998).

Product Literature, "Electronic Bonding," http://www.gteds.com/html/eb.html, 3 pgs. (May 1997).

Product Literature, "CLECs Use Internet Technology to Bond with Bells," http://www.zdnet.com/intweek/daily/97052e.html, 2 pgs. (Jan. 1998).

Product Literature, "MQSeries Business Partners Index," http://www.software.ibm.com/ts/mqseries/partners/partner.html, 1 pg. (Feb. 1998).

Product Literature, "MQSeries in General," http://www.software.ibmcom/ts/mqseries/library/brouchures/business, 3 pgs. (Feb. 1998).

Product Literature, "Massachusetts agencies exchange a wealth of data using MQSeries,"http://www.software.ibm.com/ts/mqseries/solutions/mass.html, 3 pgs. (Feb. 1998).

Product Literature, "Landmark Announces Performace Managment Solutin for MQSeries," http://www.software.ibm.com/news/2f46.html, 2 pgs. (Feb. 1998).

Products Literature, "Boole and Babage" http://www.boole.com/news/current/mqseries.html, 2 pgs. (Jan, 1998).

Product Literature, "Boole and Babage," http://www.boole.com/news/96%5Farchive/Commandmq.html, 2 pgs. (Jan. 1998).

Product Literature, "MSMQ: Interoperability," http://www.microsoft.com/ntserver/guide/msmq_interoperability.asp, 1 pg. (Jan. 1998).

Product Literature, "Microsoft Windows NT Server," http://www.microsoft.com./ntserver/community/msmqarchive.asp?A=7&B=5, 1 pg. (Jan. 1998).

Product Literature, "Microsoft Windows NT Server," http://www.microsoft.com/ntserver/guide/msmq—rev—patsey.asp?A=7 &B=5, 8 pgs. (Jan. 1998).

Product Literature, "Frontec—The AMTrix™ System Technical Overview," http://www.frontec.com/amtrixtechover.html, 5 pgs. (Jan. 1998).

Product Literature, "Frontec—The AMtrix™ System," http://www.frontec.com/amtrixsystem.html, 3 pgs. (Jan. 1998).

Product Literature, "Introduction to Messaging and Queuing," http://candy1, hursley.ibm.com:8001...r.cmd/book/HORAA101/, 31 pgs. (Jan. 1998).

* cited by examiner

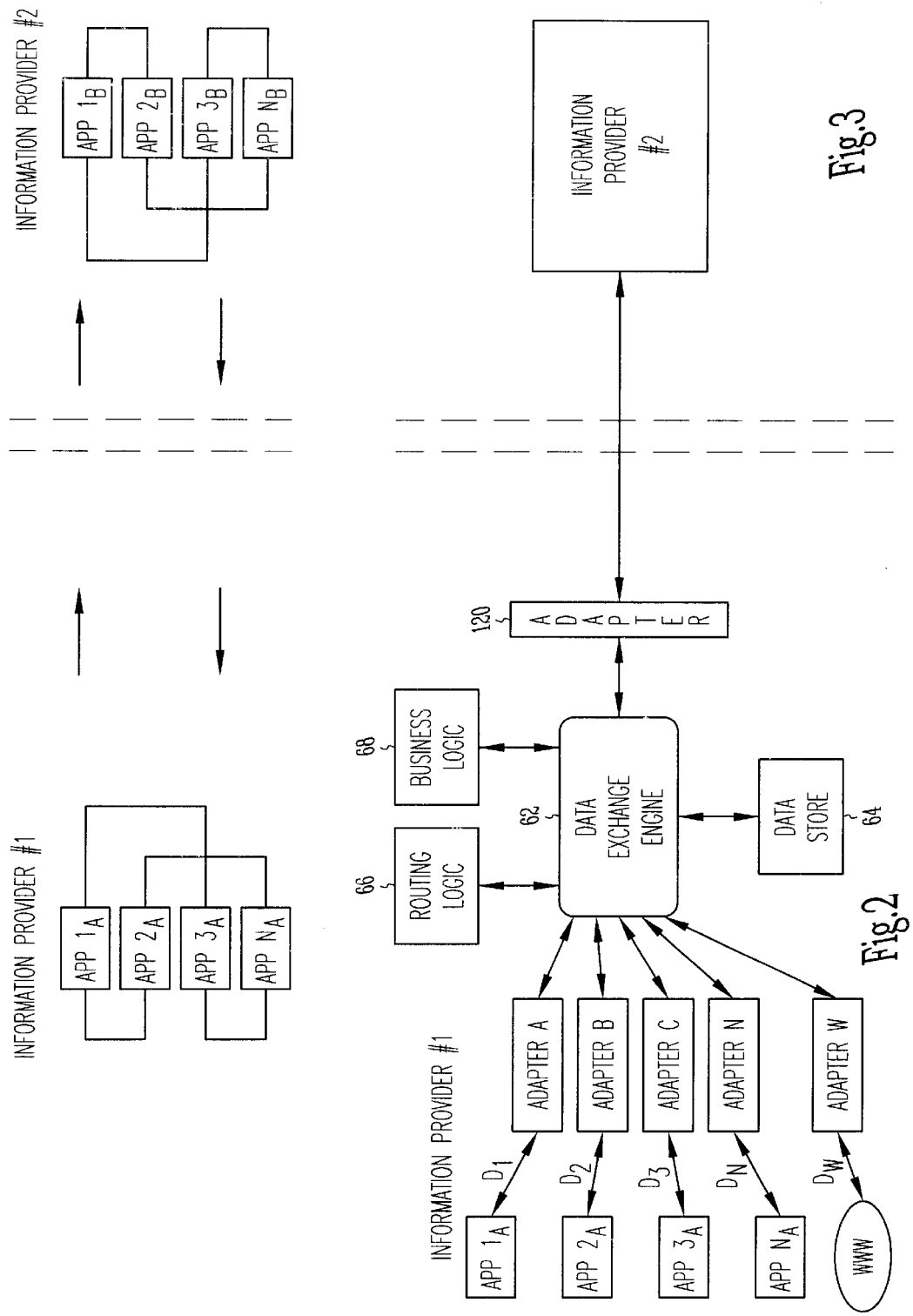

COMMON ATTRIBUTE THAT
CONTAINS A STRING VALUE

COMMON ATTRIBUTE THAT
CONTAINS A INTEGER VALUE

COMMON ATTRIBUTE THAT CONTAINS
A POINTER TO A COMMON OBJECT

COMMON ATTRIBUTE THAT CONTAINS
A POINTER TO A LIST OBJECT

DATA EXCHANGE SYSTEM AND METHOD

FIELD OF THE INVENTION

The present invention relates generally to information systems, and more particularly, to a system and method for exchanging data among dissimilar applications.

BACKGROUND OF THE INVENTION

A number of proposed solutions have been advanced to address the problem of effecting the communication of data between computer system platforms and applications developed using distinctly different technologies. The increased reliance on distributed data processing systems and architectures, such as those employed to support Internet and Electronic Data Interchange (EDI) activities for example, has created a keenly felt need for improved methods of transporting vast amounts of data of various types and formats between applications having dissimilar interface characteristics.

In an attempt to address the problem of transporting dissimilar types of data between dissimilar systems and applications, various data interchange products and approaches have been developed. A traditional approach of electronically linking a number of disparate systems together involves the creation of custom gateways or interface systems. A typical custom gateway is created to solve a narrowly focused interface problem, such as permitting systems #1 and #2 to exchange data of types 'A' and 'B' produced by systems #1 and #2, respectively. Such specialized gateways are generally not intended nor designed to accommodate data interchange between a large number of disparate systems and applications. It is understood in the art that modifying an existing custom gateway to address a new and different interface problem is generally unproductive and costly, given the inherent limitations of the original gateway design.

Various information technology standards have been advanced in an attempt to address these and other data interchange problems experienced within a distributed data processing and communications environment. One such standard, referred to in the art as CORBA (Common Object Request Broker), has received much recent attention, as it would appear to solve many of these problems. A critical review of the CORBA approach, however, reveals that CORBA is not designed to act as a data transport mechanism. Rather, CORBA is primarily designed to pass control methods over TCP/IP. The strength of CORBA is its ability to use C++ methods over a network. CORBA requires that all applications must be object oriented, which precludes inclusion of a substantial number of existing applications developed using structured programming techniques. Moreover, although CORBA is referred to as a "standard," there are several product implementations of CORBA which are not compatible, and as such, are incapable of communicating with one another.

Other technologies, such as transaction monitors, have been developed primarily to control complex transactions between multiple applications in a distributed processing environment. Such transaction monitors typically interface applications through rigorous transaction rules applied through defined IDL (Interface Definition Language) interfaces across IPC (Inter Process Communication) methods. A typical transaction monitor has a complex structure that must be conformed to, and is complicated to use and maintain. If any one of the individual transactions that make up a transaction set fails, the entire complex transaction must be backed out, rather than the single failed transaction. Transaction monitors are generally optimized for transaction control, and not for effecting data interchange.

Fourth and fifth generation languages, termed 4GL and 5GL, would appear to offer a partial solution to the data interchange problem. These and other similar languages, such as those used to construct "business objects," are optimized around the construction of applications and user interfaces for the primary purpose of providing powerful querying and reporting tools. The objects created by such languages typically define access paths to data residing in databases. The objects can be combined in various ways to create complex queries and for building powerful report generators. Fourth and fifth generation languages are not well suited for transporting vast amounts of data from one application to one or more other applications in a reliable and efficient manner. Although business objects constructed using 4GL and 5GL techniques do carry with them a certain amount of data, this data is typically data resulting from a query that is transported with an object definition for the purpose of performing additional analysis on the data.

There exists a keenly felt need for a data exchange system and methodology that is capable of exchanging data of varying size, content, and format between dissimilar systems and applications. There exists a further need for such a system and methodology that is independent of any current or future technology. The present invention fulfills these and other needs.

SUMMARY OF THE INVENTION

The present invention is directed to a system and method for exchanging data between two or more applications. The data exchange system includes a data exchange engine and a number of adapters associated with a corresponding number of applications. Each of the adapters is customized to interface with a corresponding application and transforms the data being transferred between the application and the data exchange engine. Data produced by a particular application is converted from a technology dependent form to a technology independent form by the corresponding adapter.

In one embodiment, the format associated with a data stream is disassociated from the informational content of the data stream by the adapter. The informational content of the data stream is then transformed by the adapter into a common or generic format. The data exchange engine receives data in a technology independent form from each of its associated adapters and coordinates the routing of informational content to particular adapters associated with applications that have requested specific informational content. The adapters receiving the informational content from the data exchange engine transform the informational content having the common format into a data format compatible with, or specific to, their associated applications. In one embodiment, a queuing mechanism is employed to construct a reliable asynchronous or pseudo-synchronous interface between disparate applications and systems.

The data exchange engine may apply business rules or logic when processing a request for particular informational content. An application, for example, may require informational content produced by a number of different applications. The data exchange engine obtains, organizes, and processes the multiple source informational content as dictated by user-specific business logic. Changes to processing and organizational requirements for a particular user or application are effected simply by modifying the user-specific business logic, rather than data exchange engine code.

User-specified routing logic may be applied by the data exchange engine to dispatch selected informational content to one or more destination applications. As with the business logic, changes in routing requirements are effected simply by modifying the routing logic, rather than data exchange engine code.

Process monitoring, tracing, and logging are provided to track the progress of data passing through the data exchange engine and to detect and correct processing errors. In the case of a processing anomaly, the data exchange engine effects a rollback of failed transactions to preclude the loss of data. Performance statistics may also be provided.

A wide variety of interfaces may be developed by appropriate deployment of adapters and one or more data exchange engines. Proprietary back-end systems having only a single user-interface, for example, may be logically transformed into an open system having multi-user Web intefaces. Unreliable applications may be stabilized by employment of the data exchange infrastructure. Disparate business systems, whether they be archaic or state-of-the-art, may be effectively linked together to create electronic bonding gateways, for example.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 2 illustrates in block diagram form the flow of data between disparate applications within information systems operated by two information service providers in accordance with a conventional approach;

FIG. 3 illustrates the deployment of a data exchange infrastructure within the information system environment of information provider #1 shown in FIG. 2;

Figure 1:
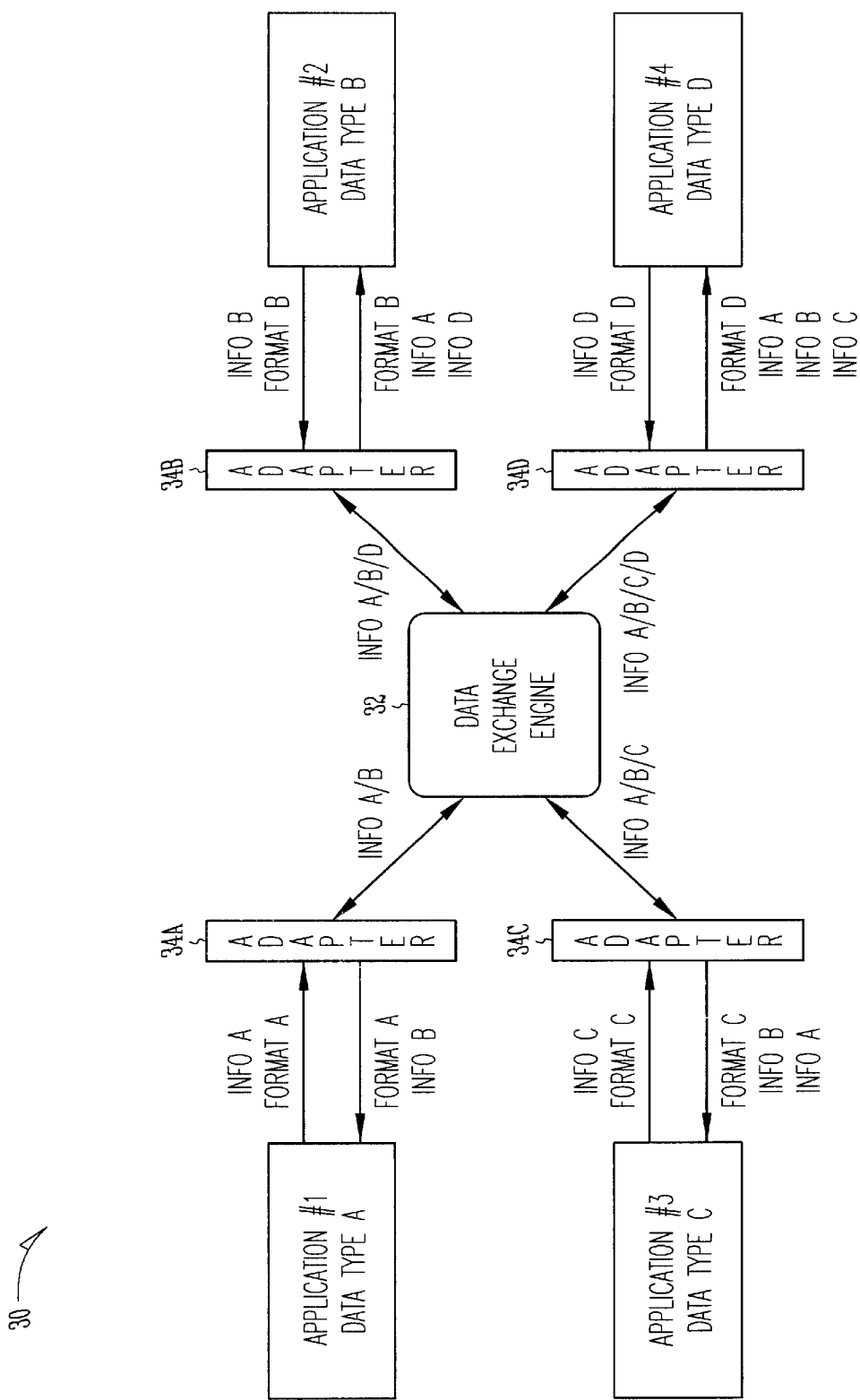
FIG. 1 is a system level diagram of a data exchange architecture in accordance with an embodiment of the present invention.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the spirit and scope of the invention as defined by the appended claims.

DETAILED DESCRIPTION OF THE VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

For purposes of illustrating various features and advantages realized when implementing a data exchange architecture in accordance with the principles of the present invention, reference is made to the Figures, and more particularly, to FIG. 1. In accordance with this illustrative embodiment, it is assumed that dissimilar applications, identified as Applications #1, #2, #3, and #4, produce various types of dissimilar data. The term dissimilar applications as used herein is intended to refer to applications that differ in terms of technology, operation, supporting platforms and operating systems, data, input/output interfaces, communication protocols, and the like. The term dissimilar data is intended to refer to data types that differ in terms of format, structure, protocol, content, and the like.

It is further assumed that each of the Applications shown in FIG. 1 requires information produced by other Applications. Application #3, for example, produces informational content 'C' which is required by Application 'D,' and requires informational content 'A' and 'B' produced by Applications #1 and #2, respectively. As such, each of the Applications, although representing distinctly different technologies which may be supported on distinctly different platforms, are dependent upon one another for various informational content. Those skilled in the art well appreciate the difficulties of providing a mechanism to effect the required exchange of information between dissimilar Applications while concurrently addressing a myriad of technological interdependencies.

It can be appreciated that the traditional approach of implementing a customized interface to effect the exchange of information between two disparate applications generally solves a narrowly focused communications problem, but typically results in an inflexible solution intolerant to even slight changes in terms of format, function, or operation. Prior art solutions to developing such interfaces to permit communication between disparate applications are generally dependent upon the technologies inherent in either or both of the application software and/or platform hardware/software supporting the application. Such technology dependencies are well-understood as significantly limiting the ability to modify, expand, and scale an existing communications infrastructure, and significantly complicates or even precludes the integration of new information sources and technologies.

By way of example, and with further reference to FIG. 1, it is assumed that Application #1 produces data of type 'A' which may be viewed as constituting two constituent components. The term data, within the context of the environment illustrated in FIG. 1, is assumed to include an informational content component and a format component. The informational content component represents raw information, typically business information, such as accounting information for example. The format component typically represents a technology-dependent construct that provides a means for electronically interacting with the informational content component. The format component, for example, may be defined to include data structures, protocols, scripts, control codes, and other technology-specific content. It is well appreciate in the art that many so-called "compatible" or "compliant" applications are in truth inherently technology-dependent, thus precluding seamless and reliable transport of information between two or more "compatible" applications. As was previously discussed, even standards-based applications are often incapable of communicating effectively with one another without intervening logic or protocol.

Returning again to FIG. 1, Application #1 produces data of type 'A' which comprises informational content 'A' associated with a format 'A.' It is assumed in this illustrative example that Applications #2, #3, and #4 require selected portions of informational content 'A' produced by Application #1. The data exchange engine 32, in cooperation with the adapters 34a–34d, facilitate the exchange of required portions of informational content 'A' in the following manner. In response to a request for particular data from Application #1, selected data of type 'A' is transmitted to the adapter 34a. The adapter 34a processes the type 'A' data in such a way as to eliminate any technology dependencies associated with the type 'A' data. In particular, the adapter 34a disassociates the informational content component 'A,' alternatively referred to as informational content 'A,' from its associated format component 'A,' and transmits only the informational content 'A' to the data exchange engine 32.

In accordance with one embodiment of the present invention, the adapter 34a reformulates the informational content 'A' into a common or generic form which is subsequently operated on by the data exchange engine 32. Each of the adapters 34a–34d perform this process of reformulating a technology-specific data stream into a generic or common data form.

Assuming that Application #2 requires selected informational content 'A' produced by Application #1, the data exchange engine 32 facilitates the transport of the content 'A' information to adapter 34b associated with Application #2. The adapter 34b reformulates the informational content 'A' having a common representation to a format 'B' representation which is compatible with Application #2. The adapter 34d, in a similar manner, receives from the data exchange engine 32 specified informational content 'A' reformulated from format 'A' to the common or generic format. Adapter 34d reformulates the informational content 'A' from the common representation to a type 'D' format suitable for incorporation by application #4. As is also shown in FIG. 1, Application #3 requires selected informational content 'A' from Application #1. The specified informational content 'A' is converted to generic form by the adapter 34a, transmitted through the data exchange engine 32 to adapter 34c, and converted to a format 'C' form for inclusion by Application #3.

It can be seen from FIG. 1 that disparate types of selected data may be effectively and reliably transported between dissimilar applications with relative ease through employment of a data exchange architecture in accordance with the principles of the present invention. The cooperative use of adapters associated with specific applications in conjunction with one or more data exchange engines either eliminates or renders innocuous technology dependencies inherent in the data transferred through the data exchange infrastructure. Such an implementation generally eliminates or significantly reduces the need for customized interfaces otherwise required to facilitate the transport of dissimilar types of data between dissimilar applications. In other words, the traditional N×N connectivity problem associated with traditional interfacing approaches may be effectively reduced to a 1×N connectivity scenario using a data exchange approach consistent with the principles of the present invention.

To facilitate a better appreciation for the advantages offered by the data exchange infrastructure implemented in accordance with the present invention, reference is made to FIGS. 2–3. In FIG. 2, there is depicted a number of Applications, Applications #$1_A$–#$N_A$, which interact within an information systems environment operated by an information provider #1. Information provider #2 operates an information system within which a number of disparate applications, represented by Applications #$1_B$–#$N_B$, interact in a specified manner. In addition to communicating information within each respective information systems environment, various types of information must be shared between the two information providers #1 and #2.

By way of example, and assuming that information providers #1 and #2 provide telecommunications services, information provider #1 may represent a local exchange carrier while information provider #2 may represent an inter-exchange carrier. It can be appreciated that the information system architecture associated with each of the information providers #1 and #2 typically represents a complex amalgam of archaic or legacy applications in addition to state-of-the-art applications. This hybrid environment has generally led to an increased dependency on customized data exchange interfaces needed to facilitate sharing of information between dissimilar applications within a given information provider's operating environment. Even simple modifications to a single application typically has significant upstream and downstream ramifications which often require costly and specialized interfacing solutions.

In the illustrative embodiment shown in FIG. 2, it is assumed that local exchange carrier #1 desires to enter the long distance market to expand its service and customer base. The recently passed Telecommunications Act of 1996, however, mandates that local exchange carrier #1 provide equivalent access to its local loops which permits inter-exchange carrier #2 to gain access to the applications and information supported within the information infrastructure operated by local exchange carrier #1. In order to comply with federal regulation, local exchange carrier #1 must tolerate intrusion into its internal information systems by inter-exchange carrier #2. It can be appreciated that the conventional approach of constructing customized electronic bonding gateways to facilitate communications between two dissimilar information provider environments would result in a costly and generally inflexible interface solution.

A data exchange infrastructure implemented in accordance with the principles of the present invention greatly simplifies the task of interfacing numerous disparate applications to facilitate reliable communication of information between two information provider environments such as those depicted in FIG. 2. As is shown in FIG. 3, a data exchange infrastructure in accordance with one embodiment of the present invention may be deployed to accommodate the access requirements of inter-exchange carrier #2 and the security considerations of local exchange carrier #1.

This illustrative solution offers a number of advantages heretofore not attainable using conventional interfacing approaches. In particular, expandability, flexibility, and scalability is introduced into the information system environment of the local exchange carrier #1 which was not previously realizable using the original architecture shown in FIG. 2. Moreover, none of the applications or data supported or produced by the applications (i.e., Applications $1_A$–$N_A$) need be changed when deploying a data exchange infrastructure in accordance with the principles of the present invention.

In this illustrative example, each adapter A–N is associated with a corresponding data stream $D_1$–$D_N$. Data stream $D_1$, for example, may represent EDI data generated by Application #1 running on a back-end proprietary system. It is understood in the telecommunications industry that EDI represents a generally accepted standard for passing electronic messages between telecommunications service providers. However, it is also understood in the industry that various EDI dialects exist which necessitates some form of data transformation to occur in order to facilitate effective communication between back-end systems.

Adapter A is configured to disassociate the informational content transported within the EDI data stream $D_1$ from its associated EDI format and dialect. The EDI informational content extracted by adapter A is reformatted to a common representation and then transported through the data exchange engine 62 to a destination application within the inter-exchange carrier #2 environment. The adapter 120, in this embodiment, is configured to translate the EDI information content having a common format to an EDI format and dialect required by the destination application. Adapter 120 also converts source EDI information transmitted from inter-exchange carrier #2 into the common or generic form.

The data exchange infrastructure depicted in FIG. 3 effectively isolates the proprietary information and systems of local exchange carrier #1 yet provides the required access to inter-exchange carrier #2 mandated by current federal regulations. In addition, deploying the data exchange architecture shown in FIG. 3 provides for the development of new interfaces not contemplated or easily achievable given the limitations of the original system architecture. For example, an adapter, such as adapter W, may be deployed to facilitate communication and data exchange via the Internet. By way of further example, a Web browser interface may be developed to convert a single-user interface of a proprietary back-end system to a multi-user, Web browser interface without the need to modify the back-end system or applications running thereon. A Web browser interface, represented as application WWW in Fig,. 3, may thus be implemented with little effort and cost.

Figure 4:
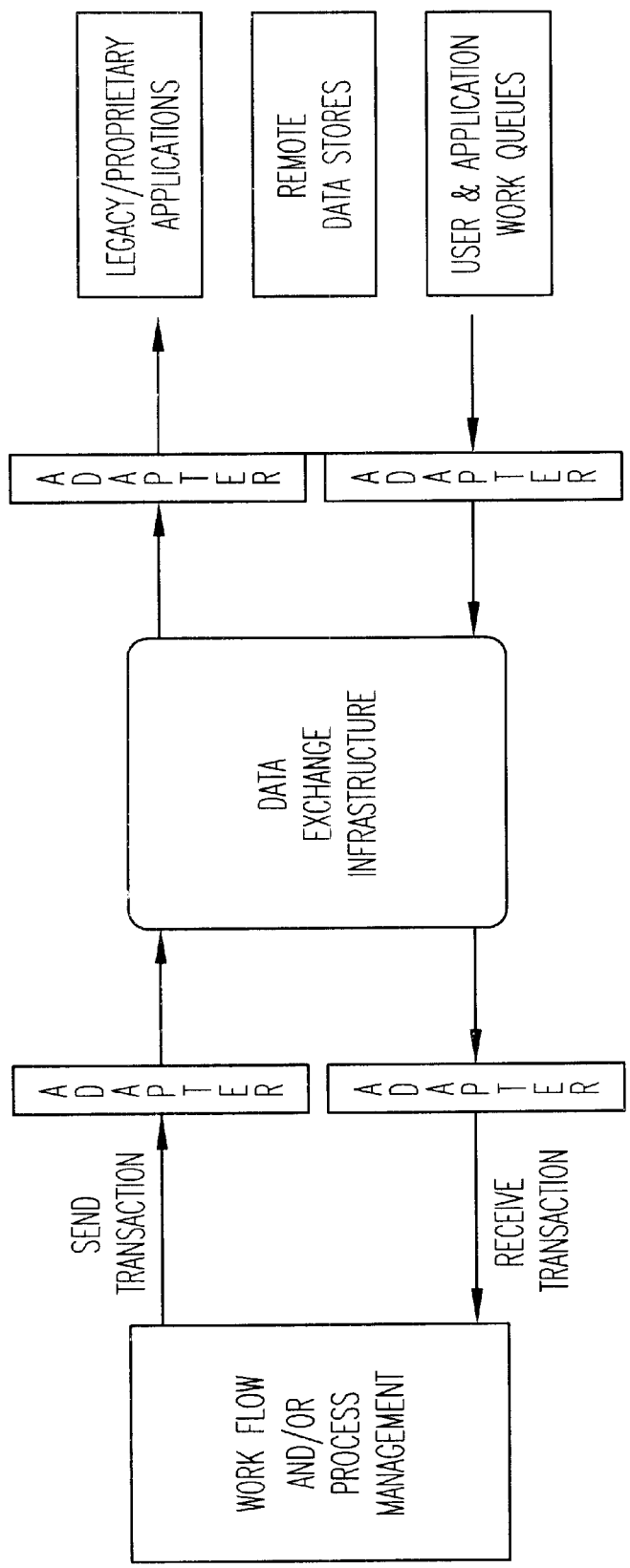
FIGS. 4 and 5 illustrate additional embodiments of a data exchange infrastructure deployed to significantly enhance data interchange within existing information system environments.

In FIG. 4, there is illustrated another embodiment of an information interchange environment within which the data exchange infrastructure in accordance with the present invention may find particular application. The data exchange infrastructure may be implemented to enhance workflow or process management systems which interact with any number of legacy or proprietary applications, remote data stores, or various user and application work queues. In this embodiment, the data exchange infrastructure provides for reliable application integration, data movement, and remote work queues. In this configuration, unreliable system implementations, such as screen scraping applications or networks with poor line condition, may be transformed into reliable implementations through use of the data exchange infrastructure. In particular, this unreliable to reliable conversion is achieved, for example, through the use of persistent queues, rollback processing upon transaction failures, which provides for transactional integrity, and transaction retry processing as necessary.

Figure 5:
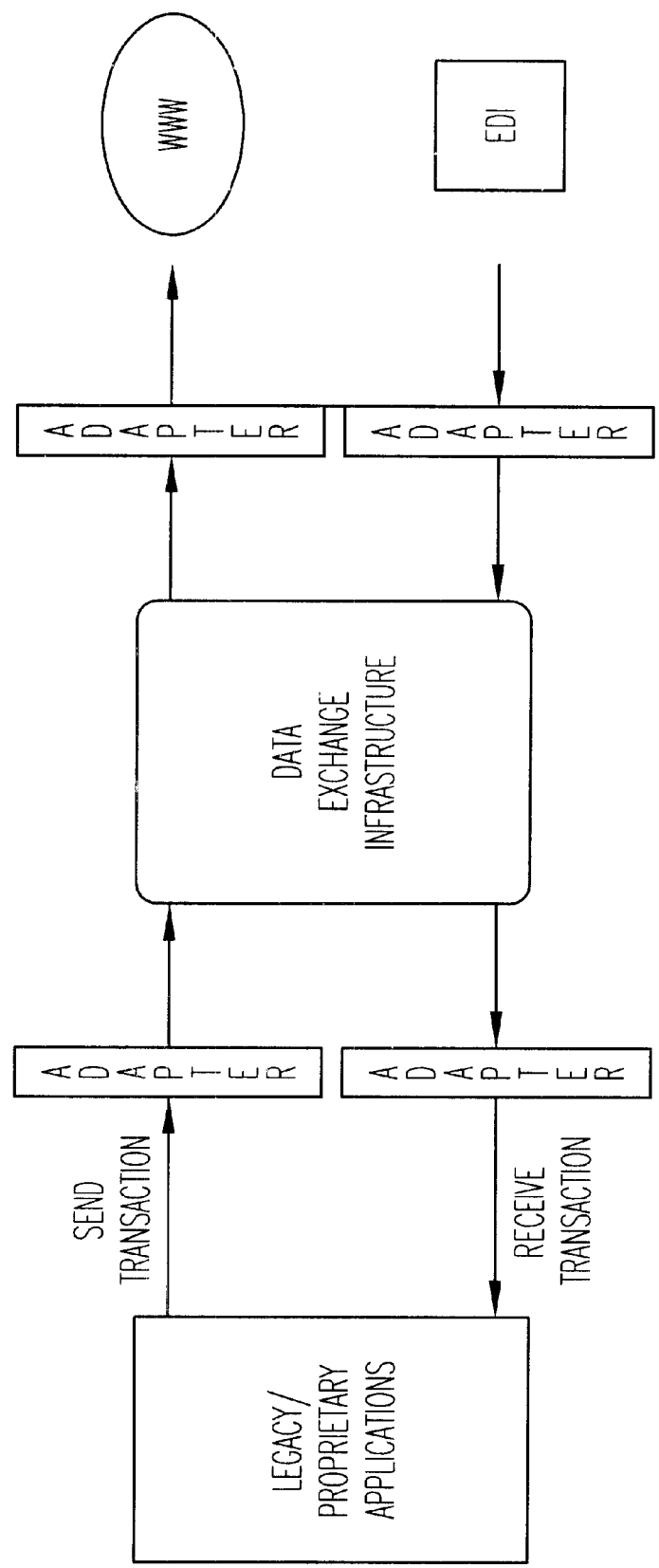

FIG. 5 depicts a data exchange infrastructure implemented within an existing information exchange environment. In this illustrative example, a data exchange infrastructure is implemented to provide reliable interfaces between legacy or proprietary applications and newer interfaces, such as Web-based interfaces. In this regard, archaic or legacy applications may be provided with state-of-the-art interfaces to facilitate substantially enhanced user interaction.

In this example, an EDI data stream is processed through the data exchange infrastructure as a received transaction initiated by a legacy or proprietary application. In response to a user inquiry, for example, selected data generated by the legacy or proprietary application is processed through the data exchange infrastructure to provide user access through a Web-based interface. As in previous examples, neither the EDI data nor the legacy/proprietary applications require modification, as all accommodations to dissimilar data formats and applications are provided for through the data exchange infrastructure.

Figure 6:
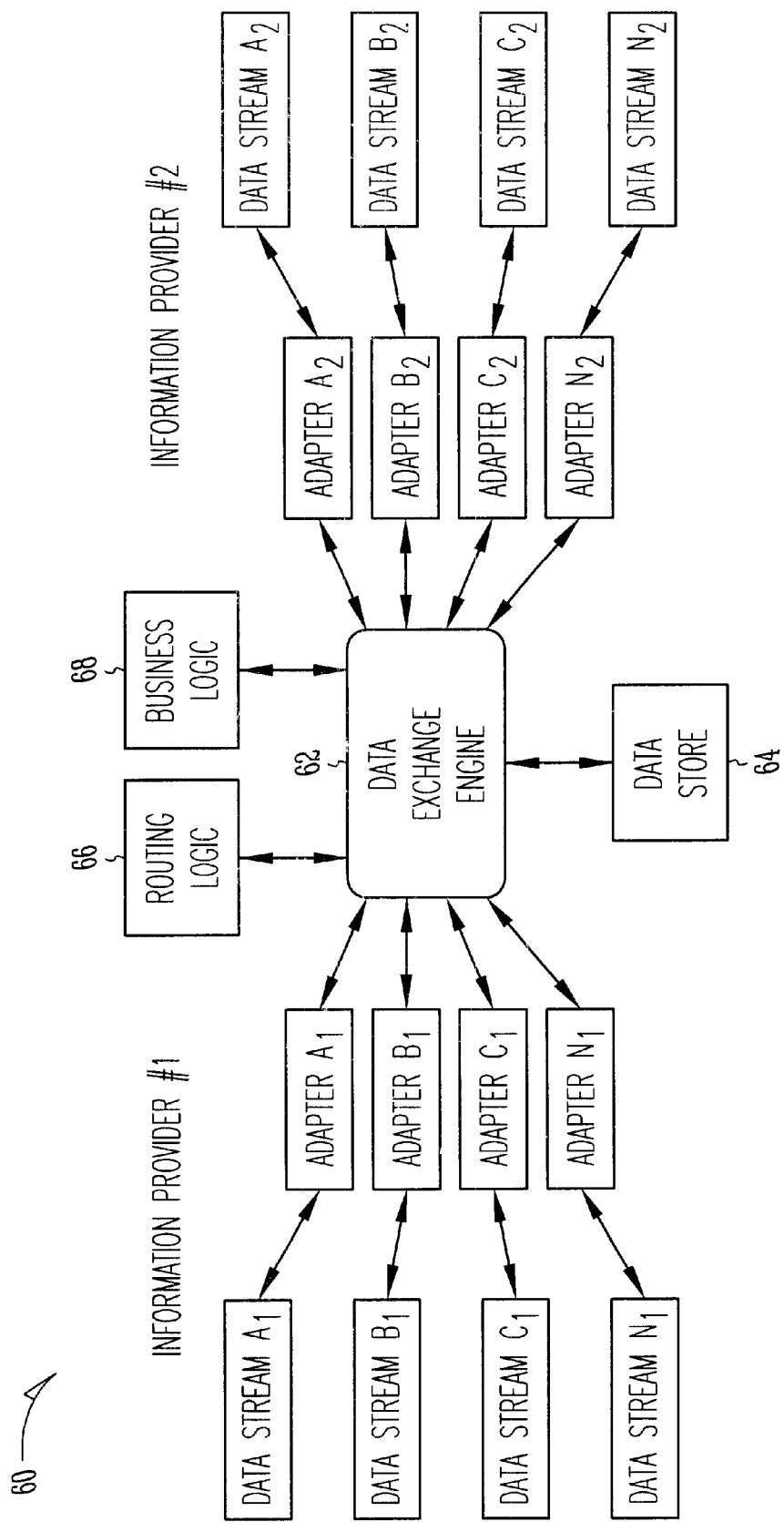
FIG. 6 is a system block diagram of a data exchange architecture in accordance with another embodiment of the present invention.

Referring now to FIG. 6, there is illustrated an expanded depiction of one embodiment of a data exchange infrastructure implemented in accordance with the principles of the present invention. In this embodiment, the data exchange infrastructure provides for the effective and reliable transport of information among any number of disparate applications, data streams, and platforms associated with two or more information providers. Information provider #1, for example, produces data streams of various types which, when processed by associated adapters, are received by a data exchange engine 62 in a generic or common format. Associated with each of the data streams produced by information provider #1 is control or request information which is further processed by the data exchange engine 62. The information or raw data component associated with the control or request information is buffered in a data store 64.

The data exchange engine 62 cooperates with a routing logic module 66 to determine one or more destination applications within the information provider #2 systems environment that require particular data streams from information provider #1. It is noted that the content of a particular data stream, such as data stream $A_1$, may have been requested by more than one information provider #2 application. Assuming that three such applications within the information provider #2 systems environment have requested all or selected portions of the data stream $A_1$ content, three corresponding adapters are employed to convert the data stream $A_1$ content from a generic format into corresponding pre-determined formats specified for the three destination applications.

The data exchange engine 62 also cooperates with a business logic module 68 to process the content of one or more data streams in a particular manner desired by a user. By way of example, an application running within the system environment operated by information provider #2 may require data that is derived through computation or manipulation from data streams $B_1$ and $C_1$ produced by corresponding applications running within the system environment operated by information provider #1. The data exchange engine 62 operates on data streams $B_1$ and $C_1$ in the manner dictated by user-specified business logic stored in the business logic module 68.

In contrast to a custom interface implemented in accordance with a prior art approach, the data exchange architecture illustrated in FIG. 6 and in other Figures provides a system administrator or end-user the ability to modify routing logic, business logic, or the format of a given data stream/application without requiring any modification to programs or configurations within the data exchange engine 62. By way of example, if an application or format of a particular data stream requires modification, such a change may be accomplished in the data exchange architecture by simply modifying the interface logic of the implicated adapter. If, by way of further example, a particular data stream produced by information provider #1 is required by two, rather than one, application within the information provider #2 systems environment, a simple change to the routing logic 66 and the addition of another adapter may be effected to satisfy this additional need. Further, if new or additional processing is required for a particular data stream in order to satisfy a new need by either a source or destination application, a simple change to the business logic 68 will satisfy this additional need.

It will be appreciated by the skilled artisan that the cooperation between easily modifiable adapters and one or more data exchange engines having user-modifiable routing and business logic provides for enhanced scalability, expandability, and flexibility to meet current and future information exchange requirements. In contrast to conventional interfacing schemes, a data exchange architecture implemented in accordance with the present invention is not subject to obsolescence, primarily due to its inherent ability to readily accommodate new and unforeseen applications, platform technologies, data types and formats, and logic and routing requirements.

Figure 7:
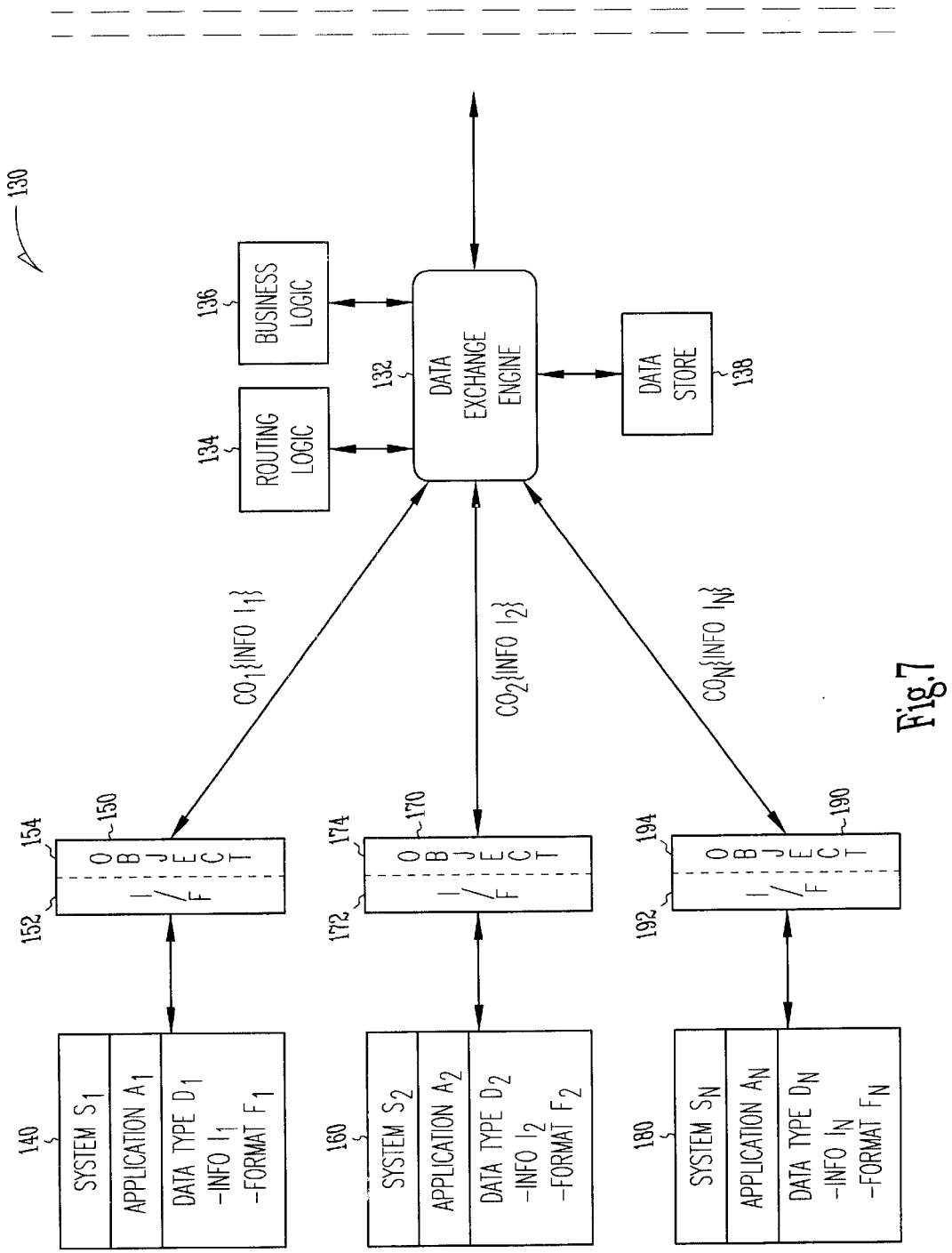
FIG. 7 is a depiction of a number of adapters operating in cooperation to effect data exchange in accordance with one embodiment of the present invention.
Figure 10:
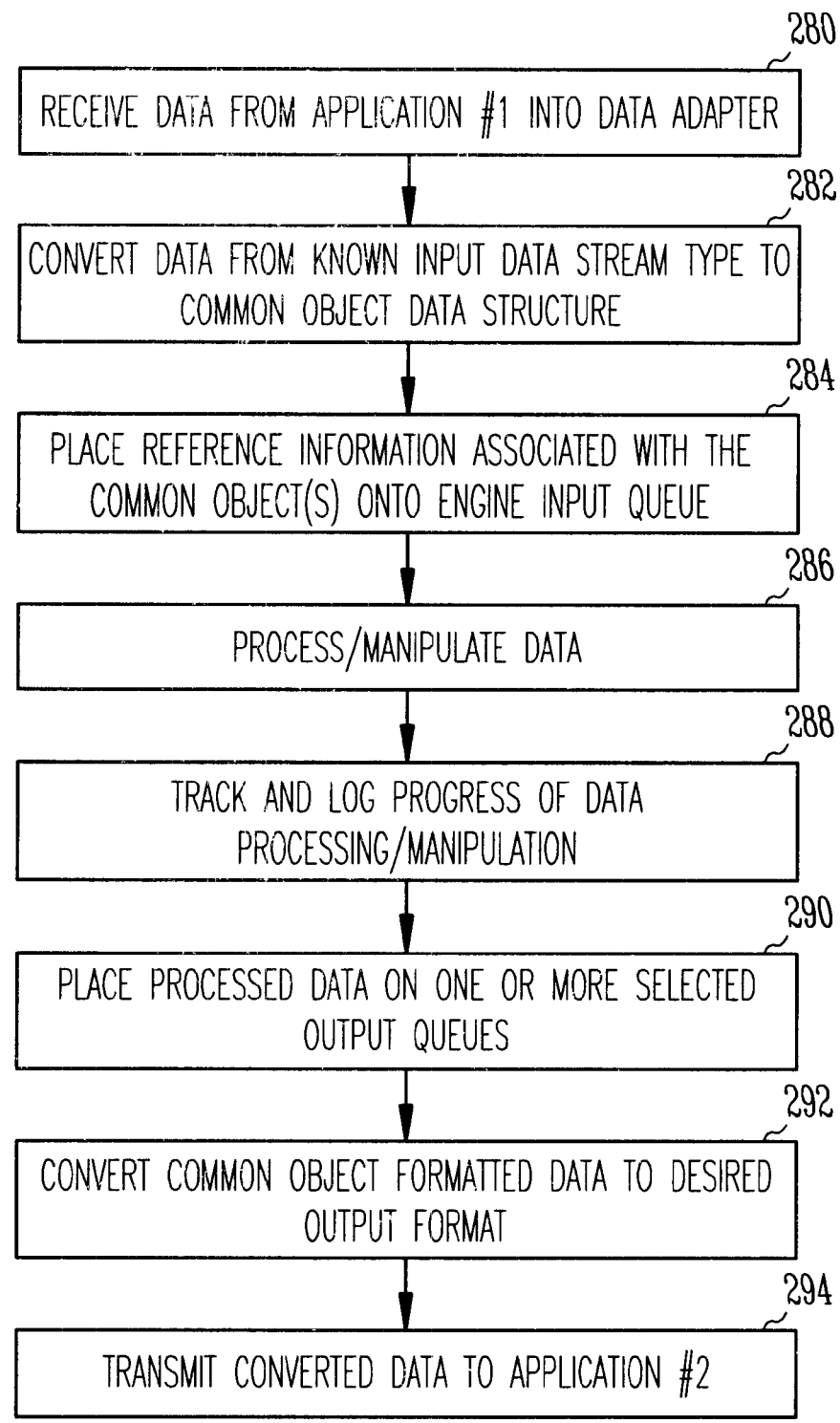
FIGS. 10–11 are flow diagrams illustrating various processes involving the transport of data through a data exchange engine in accordance with two additional embodiments of the present invention.

A more detailed description of various aspects of an adapter in accordance with one embodiment of the present invention will now be described with reference to FIGS. 7 and 10. In FIG. 7, there is shown a number of systems, $S_1$–$S_N$, which may or may not be similar in terms of platform configuration. Each of the systems, $S_1$–$S_N$, implements one or more applications, $A_1$–$A_N$, that produce various types of data, denoted as $D_1$–$D_N$. As was discussed previously, each of the data types has an associated informational content component and format component, such as informational content component $I_1$ and format component $F_1$ associated with data type $D_1$.

Each of the adapters 150, 170, 190 include an interface module 152, 172, 192 and an object converter 154, 174, 194, respectively. As is shown in FIG. 10, data of type $D_1$ produced by application $A_1$, for example, is received 280 by the interface module 152 of adapter 150. The interface module 152 typically includes a validation module which validates the type $D_1$ data received from application $A_1$. The object converter 154 converts 282 the informational content component $I_1$ of the type $D_1$ data to a Common Object data structure, $CO_1$. Reference information, which may be viewed as control or identification information, associated with the Common Object or Objects is placed 284 onto an input queue of the data exchange engine 132.

The data exchange engine 132 processes and/or manipulates 286 the informational content $I_1$ of the type $D_1$ in a manner required by the business logic module 136. Routing logic 134 is used by the data exchange engine 132 to place 290 the processed informational content $I_1$ on one or more selected output queues (not shown). One or more adapters (not shown) having a structure equivalent to adapter 150 and individually configured for specified destination applications convert 290 the informational content $I_1$ from the common format to a specified output format for transmission 294 to one or more destination applications.

Figure 8:
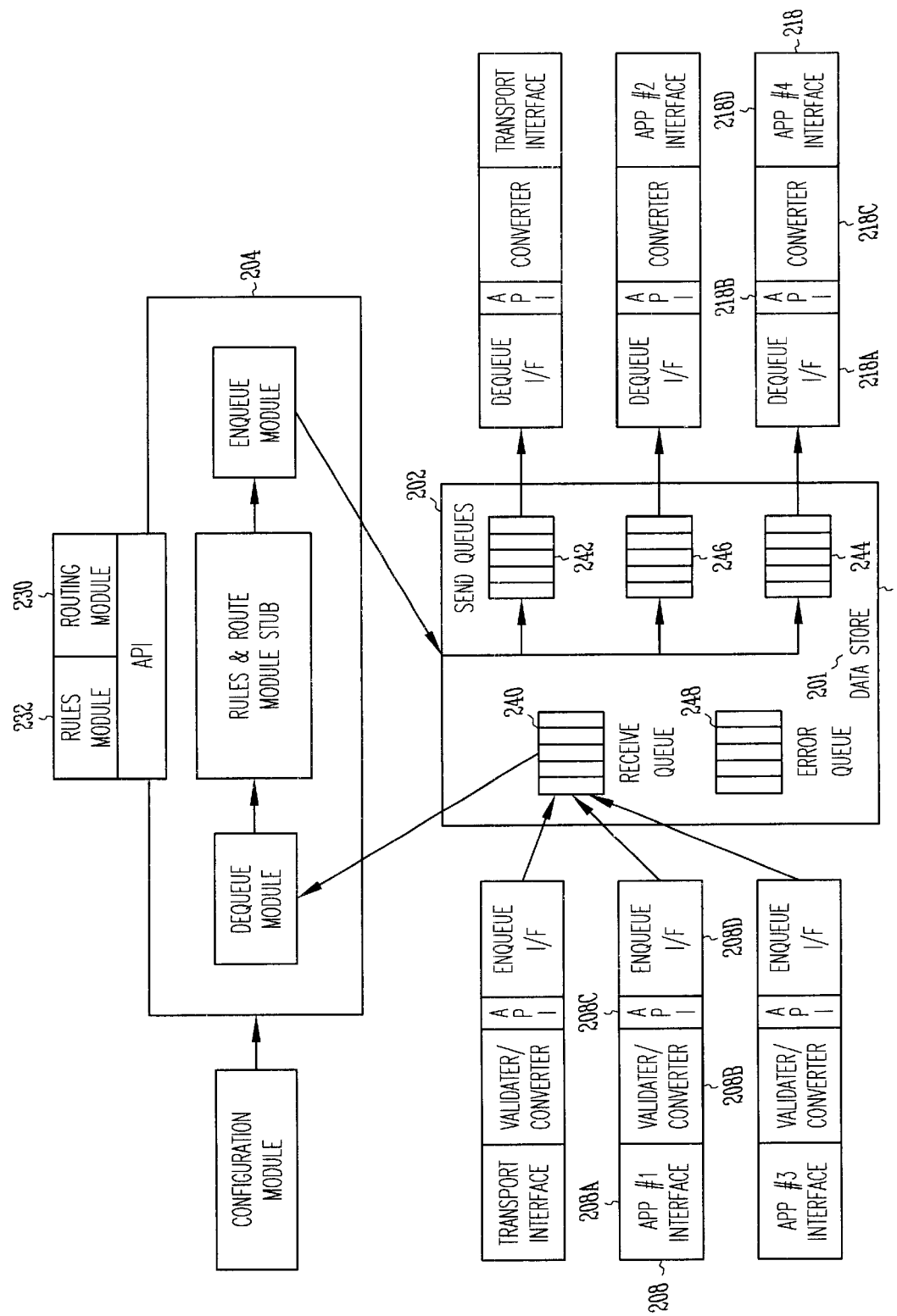
FIG. 8 is a detailed system block diagram of another embodiment of a data exchange architecture operating in accordance with the principles of the present invention.
Figure 9:
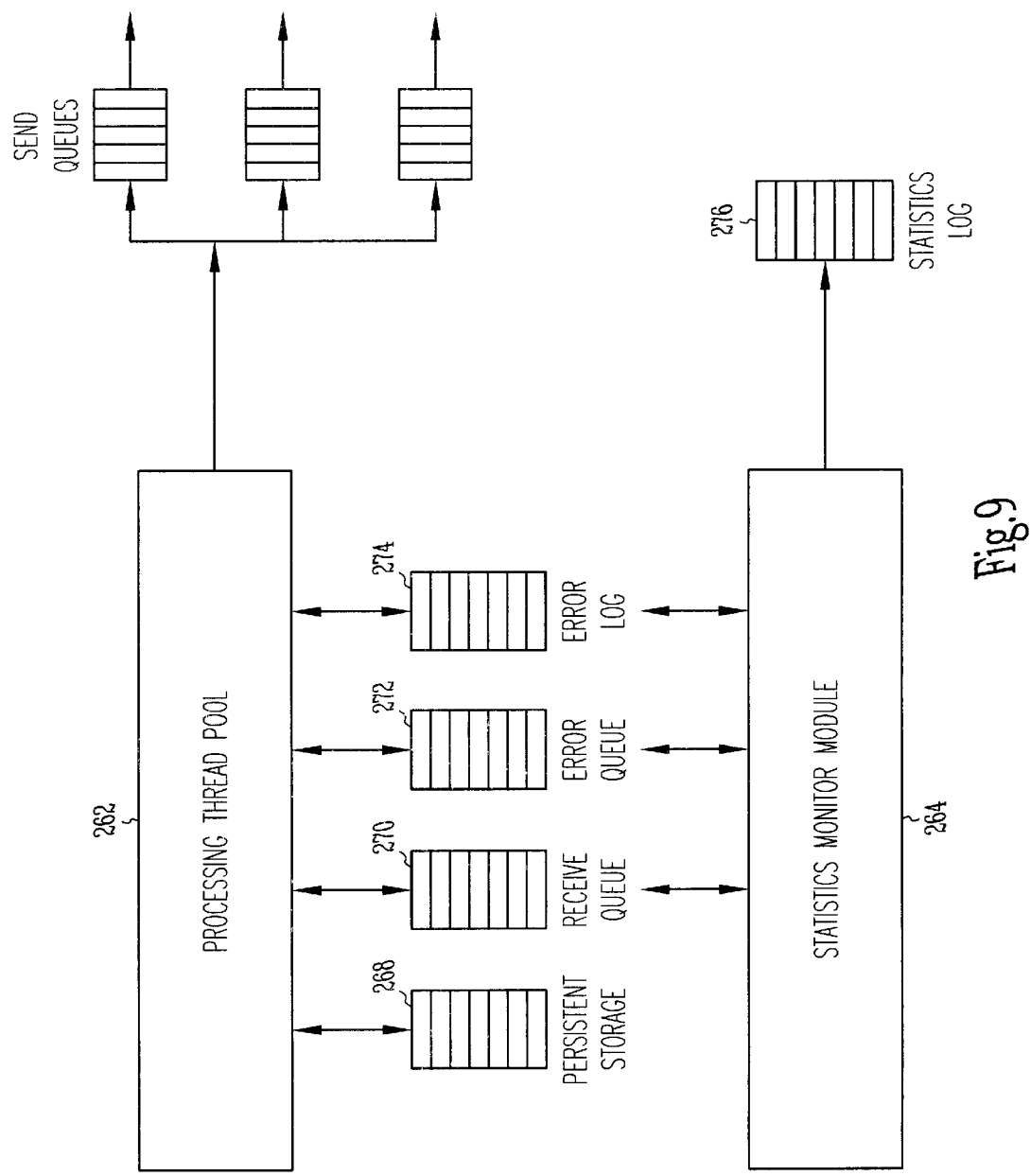
FIG. 9 illustrates additional details concerning various control and queuing features of a data exchange architecture operating in accordance with the principles of the present invention.
Figure 11:
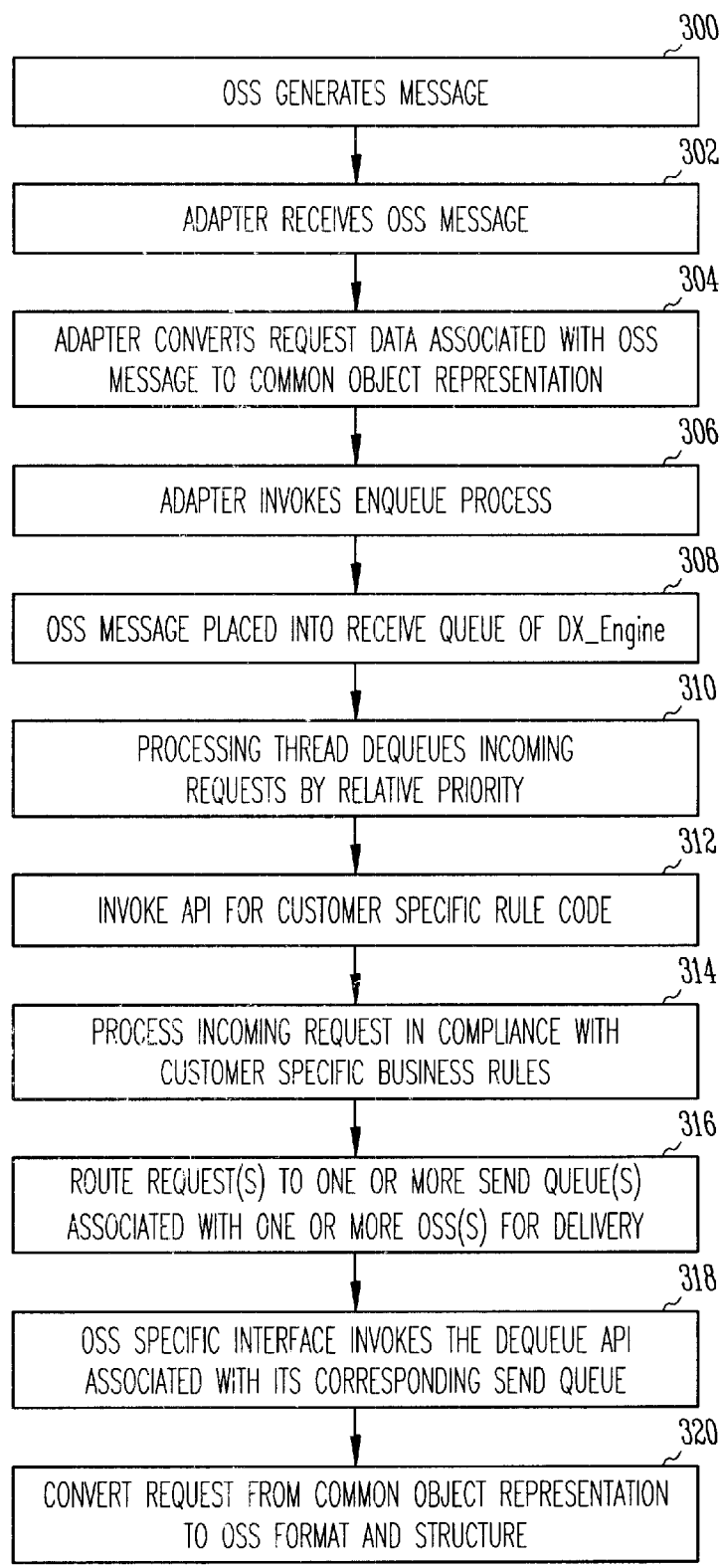

FIGS. 8, 9, and 11 provide additional details of various data exchange operations associated with one embodiment of the present invention. Initially, an adapter, such as adapter 208, receives 300 an externally generated message from an application, such as an Operation Support System (OSS) application, of a destination service provider. The adapter 208 receives 302 the message generated by the OSS. The application interface 208a of the adapter 208 receives the OSS message and data associated with the OSS message transmitted from the OSS. The OSS message and/or associated data is validated and converted 304 to a Common Object representation by the validater/converter 208b of the adapter 208. The API 208c of the adapter 208 represents an application programmer's interface that allows Common Objects to be readily constructed, manipulated, and enqueued. After the request has been converted into Common Object form, the adapter 208 invokes 306 an enqueue interface 208d to place the OSS message into the receive queue 240 of the data exchange engine 202. The informational content component or raw data associated with the OSS message is transferred to the data store 201 coupled to the data exchange engine 202.

A processing thread received from a processing thread pool 262 from the gateway core 204 is implemented 310 to dequeue any incoming requests by relative priority. The API for the custom-specific rule code is then invoked 312 to process the incoming request in compliance with customer-specific business rules received from the rules module 232. After the business rules have been applied, requests to one or more destination OSS applications are then routed 316 to a corresponding send queue 242, 244, 246 for delivery. An adapter, such as adapter 218, associated with a specific destination OSS may then invoke a corresponding dequeue API 318 associated with its corresponding send queue 244. The API 218b and converter 218c cooperate to convert 320 the requested information represented in Common Object form to a format and structure specified by the particular OSS. The converted data is then transmitted from the application interface 218d of the adapter 218 to its corresponding OSS.

Figure 12:
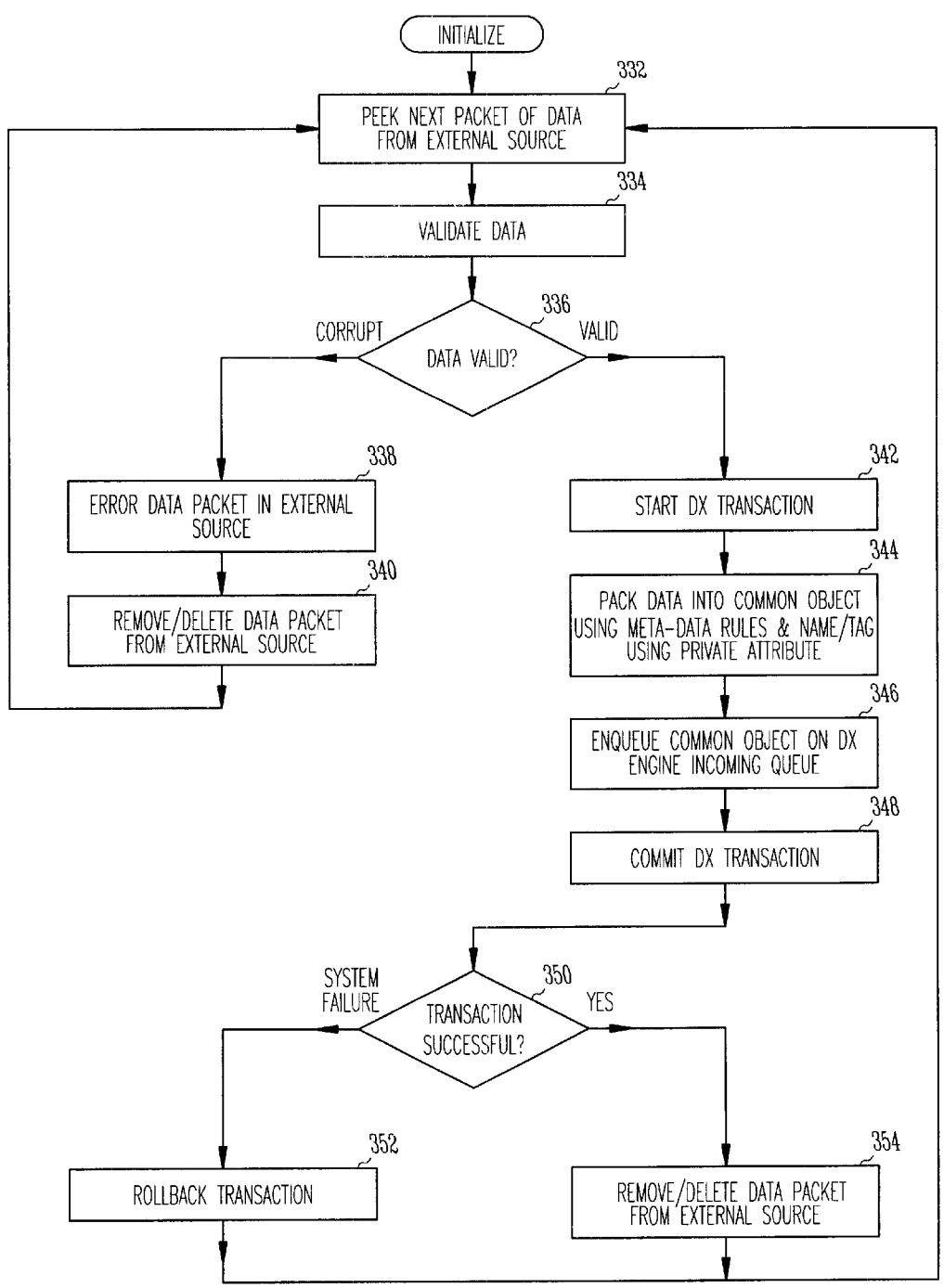
FIGS. 12–14 illustrate in flow diagram form various processes involving the transport of data through a data exchange engine in accordance with a further embodiment of the present invention.
Figure 13:
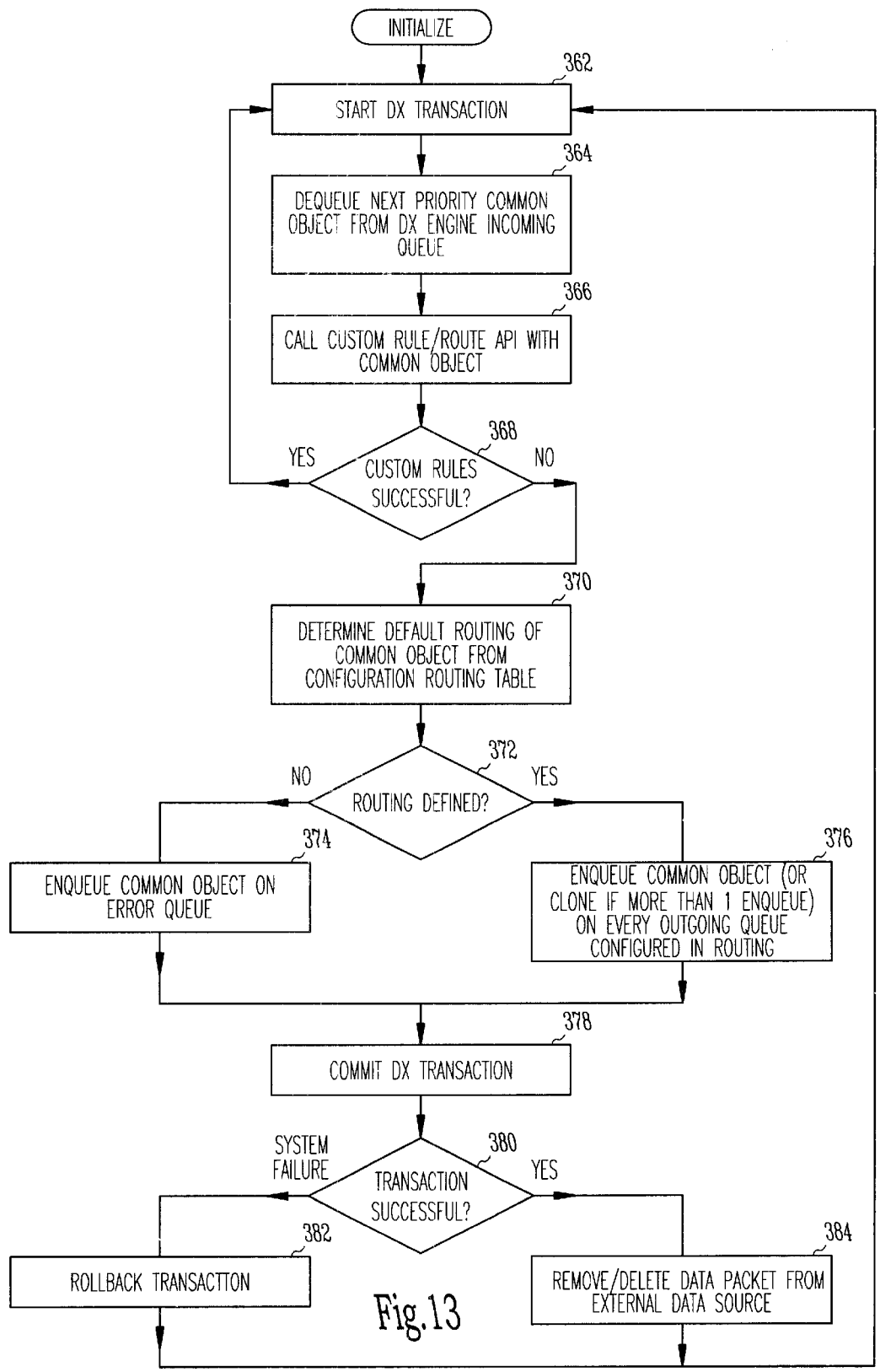
Figure 14:
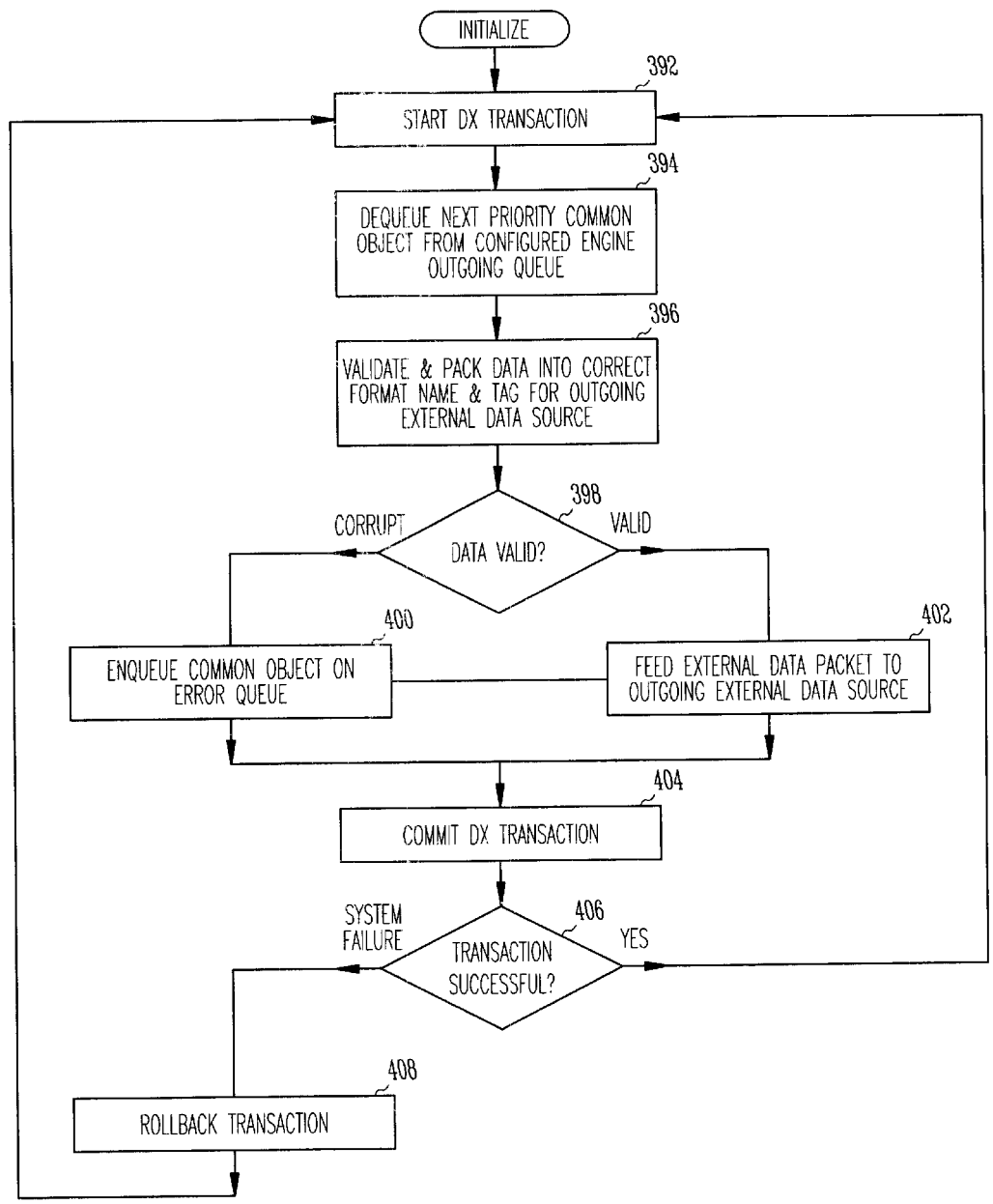

FIGS. 12–14 provide additional processing details concerning the transport of data through employment of a data exchange infrastructure in accordance with an embodiment of the present invention. As is shown in FIG. 12, a packet of data is received 332 from an external source. The received data then undergoes a validation process 334. If the data is considered corrupt 336, an error in the data packet received from the external source is verified 338, and, in response, is removed or deleted 340 for purposes of further processing. If the data from the external source is determined to be valid 336, a data exchange transaction is then initiated 342.

The data received from the external source is then packed 344 into a Common Object in accordance with meta-data rules and identified using a unique name or tag. The Common Object is then enqueued 346 on the incoming queue of the data exchange engine. The data exchange transaction is then committed. If the transaction is not successful 350, a rollback of the transaction is then initiated 352. If the transaction is successful 350, the data packet from the external data source is then removed or deleted 354. The above-described process is then repeated for subsequent data packets received from the external source 332.

Referring now to FIG. 13, additional details concerning a data exchange transaction will now be described. When a data exchange transaction is initiated 362, a prioritization scheme is employed to dequeue 364 the next Common Object from the incoming queue of the data exchange engine. During the dequeue operation, the custom rule/route API associated with the Common Object is called 366. If the custom rules are successfully applied 368, another data exchange transaction is initiated 362. If the custom rules cannot be applied successfully 368, the data exchange engine 370 determines the default routing of the Common Object from the configuration routing table.

If the routing has not been previously defined 372, the Common Object is enqueued 374 on an error queue. If routing has been previously defined 372, the Common Object, or a clone of the Common Object if more than one enqueue operation is applicable, is enqueued on every outgoing queue identified in the routing table. The data exchange transaction is then committed 378 and if successful 380, the associated data packet is removed or deleted 384 from the external data source. If the data exchange transaction is not successful 380, roll-back of the transaction is initiated 382. A subsequent data exchange transaction 362 is then initiated.

Additional steps associated with Common Object dequeueing are shown in FIG. 14. Assuming that a data exchange transaction has been initiated 392, the data exchange engine dequeues 394 the next priority Common Object from a configured outgoing queue. The data associated with the Common Object in the outgoing queue is then validated 396 and packed into a specified structure having a format and name appropriate for the outgoing or destination external data source. If the data validation process is not successful 398, then the data is deemed corrupt and the Common Object is enqueued 400 on the error queue. If the data is valid 398, the external data packet is transmitted 402 to the outgoing or destination external data source. The data exchange transaction is then committed 404 and if deemed successful 406, a subsequent data exchange transaction is initiated 392. If unsuccessful, the transaction is subject to rollback 408 by the engine exchange.

Referring once again to FIG. 9, a processing thread pool 262 stores a number of processing threads which are selectively implemented when performing dequeue operations. The processing thread pool 262 represents a pool of threads whose number is externally controlled. Its function is to provide a thread of control for the custom logic portions of the system. This thread will control the dequeueing of requests, the invocation of the rule/routing stub API, and the enqueueing of the send request. A processing thread may make use of additional system resources, including persistent storage 268, writing to and reading from the error queue 272, and writing to an error log 274.

Also shown in FIG. 9 is a statistics monitor module 264 and an associated statistics log 276 which are used to provide monitoring and tracking of data as it moves through the data exchange system. The statistics monitor module 264 also provides historical performance information on queues and historical information on system resource usage. As will be described in greater detail hereinbelow, the statistics monitor module 264 provides a means for logging and tracing a given application. Logging reveals the state of the application at the time of an error, while tracing provides a description of all software events as they occur. The tracing information may be used for tracking the application, state, and other related operations. The tracing information may be used in conjunction with the logging information to determine the cause for an error since it provides information about the sequence of events prior to an error.

FIGS. 15–20 illustrate various aspects of one embodiment of a data exchange infrastructure implemented in an object oriented program environment. It is to be understood that the foregoing description represents one of many possible approaches to implementing a data exchange architecture in accordance with the principles of the present invention, and that other hardware and software implementations may alternatively be employed, such as an implementation using structured programming techniques.

The architecture for implementing the data exchange infrastructure in accordance with this embodiment is intended to provide a series of modular building blocks that may be used in varying combinations to implement a wide range of information exchange solutions. Each of the blocks described below is intended to provide an abstract level of functionality, where the underlying components and their specific implementation are transparent to the user, such as developers and administrators.

The basic architecture described hereinbelow provides a queue interface, basic system infrastructure, and stub API hooks that allow implementation of customer specific code. The blocks described within this architecture may be organized as a single or separate executables. All modules within the context of this embodiment are intended to be completely modular.

As was briefly described previously, all requests processed within this architecture are converted into a Common Object format that provides for a generic construction and behavior for all requests. All request and request field naming is externally defined in a meta-data store which provides for data definition and/or processing behavior changes without modification of the data exchange engine code.

The basic architecture configuration is intended to provide for a highly scaleable system. All gateway operations can run multiple distributed instances since, in this embodiment, the only shared resource is the request queuing mechanism. System resource allocations may be controlled by an external configuration file and may be dynamically configurable. The various alterable resources include number of processing threads, system and message timeout thresholds, and audit trail and message logging levels. All extensions to business logic may be implemented in customer specific code that is invoked through a stub API.

Figure 15:
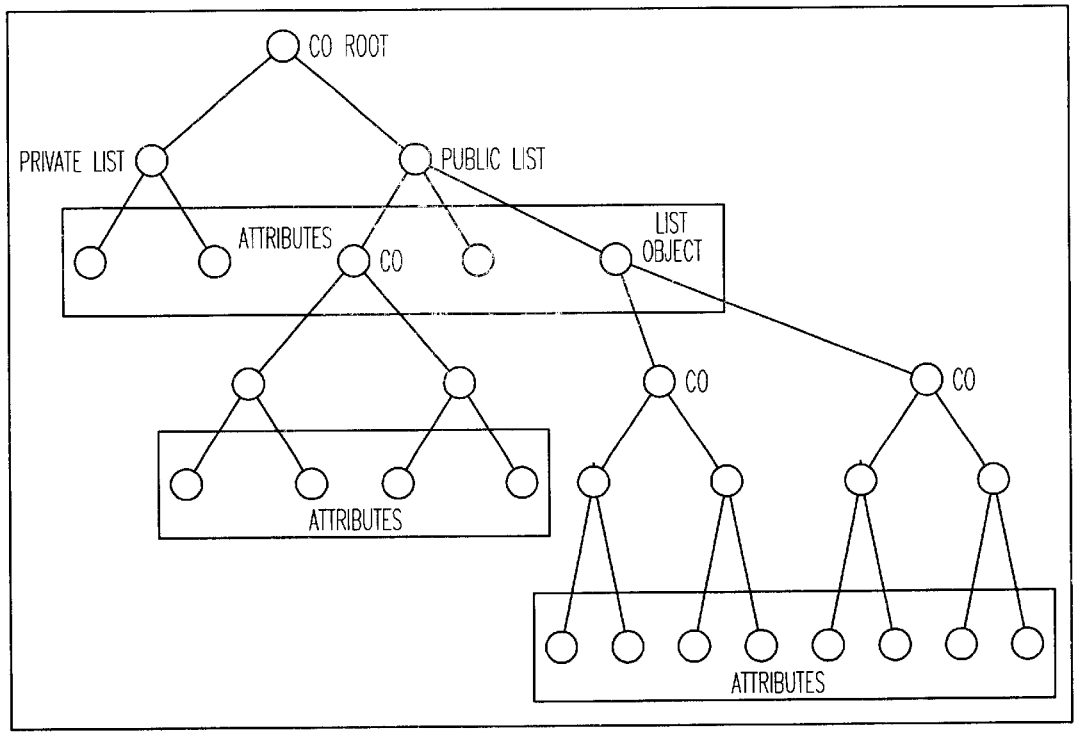
FIG. 15 is an illustration of a Common Object in accordance with one embodiment of the present invention represented in containment tree form.
Figure 16A:
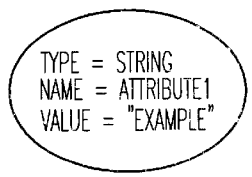
FIGS. 16A–16D illustrate the contents of a Common Attribute when used to represent various types of data supported in a Common Object of the type depicted in FIG. 15.
Figure 16B:
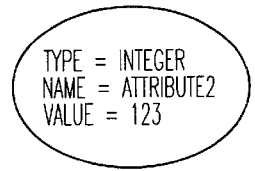
Figure 16C:
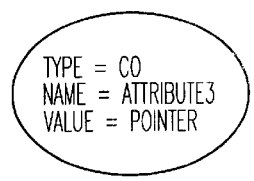
Figure 16D:
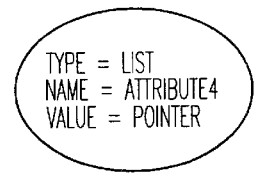

As was described previously, one function performed by an adapter is to disassociate the informational content of a particular data stream from its associated format, protocol, and/or structure. The adapter then transforms the informational content into a Common Object form which represents a generic format used for containing all information transported through and processed by the data exchange engine. FIG. 15 is a depiction of one embodiment of a Common Object represented graphically as an object containment tree.

A Common Object within the context of this illustrative embodiment represents a C++ container object that is used to contain multiple portions of attribute data within a single flexible object. A Common Object comprises two lists, a Private List and a Public List. Both lists contain one or more attribute/value pairs (AV pairs). These AV pairs represent objects referred to as Common Attribute Objects, each of which comprises an attribute name, value, and type. Common Attribute classes are available for all of the basic types plus some complex types as well.

The Public List represents a sequence of two types of user-defined attributes, which are instances of an Attribute class or a Common Object. The Private List contains attributes that are used internally by the system for a variety of purposes, such as naming, routing, and identifying ancestry information. The Public List contains data that the user has defined, which may include other Common Objects. Each list may contain two types of attributes, type specific AV pairs or objects. Contained objects may either be List Objects or other Common Objects. The Private List does not include contained objects since this List is only used for simple tags or header information.

The following illustrative examples are intended to demonstrate the behavior of attributes within the Common Object. A type specific attribute within a Common Object named "Employee" might be of type String with an attribute name of "Name" and a value of "John Doe." A List Object is typically used to represent multi-value attributes, where a single attribute name can represent multiple values or multiple Common Objects. For example, a List Object may be used within a Common Object named Department. The "Employees" attribute may constitute a List Object containing numerous "Employee" Common Objects.

As can be seen in the illustration of a Common Object shown in FIG. 15, each node in the containment tree represents an attribute identified by its name. The Distinguished Name of an attribute represents the containment path from the root node to the node represented by the attribute. In accordance with this scheme, it is mandatory that each attribute have a unique Distinguished Name within the object containment tree. By way of example, a Common Object named "foo" may have an attribute name "bar." The Distinguished Name for this attribute is thus "foo.bar." If a second attribute were added, it would require a unique name such as "bar1" and would be addressed as "foo.bar1." This unique naming requirement is automatically enforced by the Common Object.

The Common Object provides the ability to access attributes that are contained in both the Private List and the Public List. The Private List attributes are developer or system defined attributes used as tags that allow the encoding of information that is used in later processing of the object. The Private List attributes are generally not seen by the user since they are developer defined and not user defined. The Public List is used to contain all user-defined attributes, meaning those that specify what the data looks like and how it is named. All logic developed to process data through the data exchange environment is based on the attributes and their values contained in the Public List.

Figure 17:
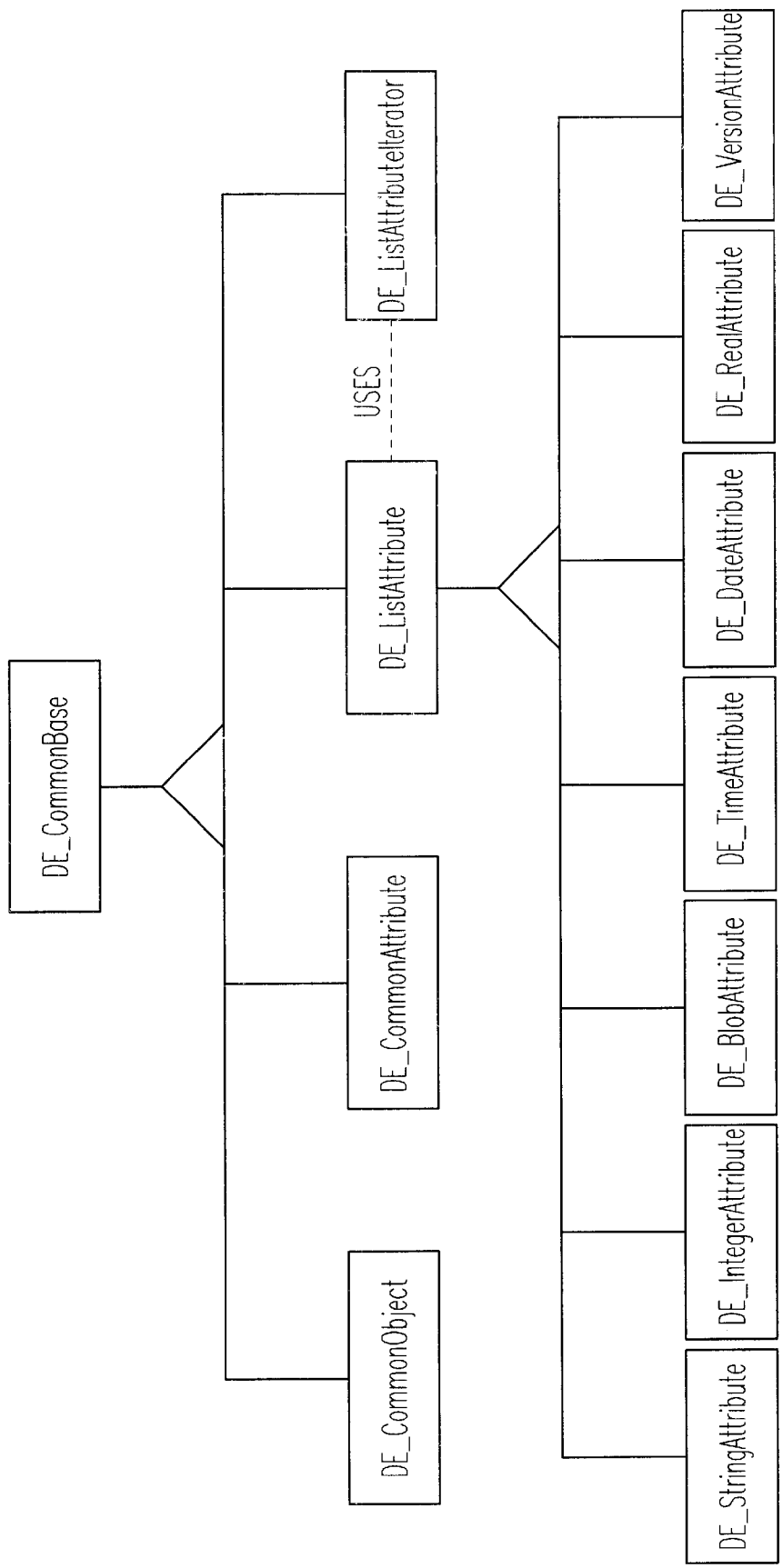
FIG. 17 is an illustration of an inheritance tree graphically depicting a Common Base Class associated with the Common Object shown in FIG. 15.

The Common Base Class is an abstract base from which the Common Object Class is derived. An inheritance tree graphically depicting the Common Base Class is shown in FIG. 17. The main purpose of this class is to provide a single object naming and typing mechanism to aid in object tree searches and traversals. The Common Base Class is characterized in the following code-level example.

EXAMPLE #1

```
class: DX_CommonBase : public RWCollectable
    {
        RWDECLARE_COLLECTABLE(DX_CommonBase);
        protected:
            char*       Name;
            int         Type;
            void        SetName(const char* inName);
        public:
            char*       GetName()           { return name; }
            int         GetType()           { return type; }
            virtual     void PrintContents()=0;
            char*       GetTypeName(int type);
    };
```

The following constant types are used within the data exchange environment and may be defined and located in a header file named "DX$_{13}$ Defs.h".

EXAMPLE #2

```
enum EclassTypes
    {
                DX_OBJECT = 0,
                DX_ATTRIBUTE,
                DX_LIST,
                DX_MULTIVALUE,
                DX_INTEGER,
                DX_STRING,
                DX_STRINGVAL,
                DX_DATE,
                DX_TIME,
                DX_REAL,
                DX_BLOB,
                DX_BLOBVALUE,
                DX_VERSION,
                DX_OID_CLASS
    };
enum EreturnCodes
    {
                NOT_FOUND = 0,
                SUCCESS,
                FAILED,
                TIME_OUT,
                ACCESS_DENIED,
                DUPLICATE_OBJECT,
                NO_OBJECT,
                NO_ATTRIBUTE,
                INVALID_ATTRVAL,
                INVALID_ARGS,
                INVALID_OPERATION,
                SYSTEM_ERROR
    };
enum EstorageTypes
    {
                FLATFILE = 0,
                DATABASE
    };
enum ElistType
```

-continued

```
{
    PUBLIC = 0,
    PRIVATE
};
``` static const int MAX_NAME_LEN=255;
static const int MAX_DOTTED_NAMELEN=8096;
static const int MAX_MULTI_VAL=255;
static const int MAX_BLOB_SIZE=2048;
static const int OID_LEN=128;
static const int MAX_FILE_NAME=256;
static const int MAX_PID_LEN=12;
static const int MAX_LINE_SIZE=100;

Various Common Object access methods have been developed to provide the ability to access attributes contained within the Common Object. Several of these methods involve Boolean operations, thus producing either a pass (i.e., true) or a fail (i.e., false) result. Any specific failures are logged within the called method. Any application specific error handling that depends on a called method should be added by the application developer. The Common Object is characterized in the following code-level example.

EXAMPLE #3

```
class: DX_CommonObject: public DX_CommonBase
{
    RWDECLARE_COLLECTABLE(DX_CommonObject);
    friend class DX_ListObject;
    friend class DX_FileSubQueue;
public:
    virtual~DX_CommonObject();
        // Constructors
    /*****************************************************************/
    //If name==NULL, the name is set to "NOT_SET".
    //If name is ""or contains a "." it will be set to "INVALID_NAME"
    /*****************************************************************/
    DX_CommonObject(const char* name=0);
    /*****************************************************************/
    //Create a copy of an entire DX_CommonObject,
    //but with it's own unique OID value
    /*****************************************************************/
    DX_CommonObject* Clone();
    /*****************************************************************/
    //All AddAttribute and AddPvtAttribute methods take ownership of
    //the pointers passed in to them. Do NOT delete the pointers after
    //a call to AddAttribute and AddPvtAttribute. The pointers will be
    //deleted when the container DX_CommonObject or DX_ListObject is deleted.
    //
    //NOTE: When using the following two methods for creating a DX_STRING
    attribute
    //
    //    AddAttribute(const char* name, const int type, const void* value)
    //    and AddPvtAttribute(const char* name, const int type, const void* value)
    //
    // the value is defaulted to be of type const char* and not UNICHAR*
    // Misuse will lead to unexpected behavior.
    /*****************************************************************/
    EreturnCodes AddAttribute(DX_CommonAttribute* newAttr);
    EreturnCodes AddAttribute(DX_ListObject* newAttr);
    EreturnCodes AddAttribute(DX_CommonObject* newAttr);
    EreturnCodes AddAttribute(const char* name, const int type, const void* value);
    EreturnCodes AddPvtAttribute(DX_CommonAttribute* newAttr);
    EreturnCodes AddPvtAttribute(DX_ListObject* newAttr);
    EreturnCodes AddPvtAttribute(DX_CommonObject* newAttr);
    EreturnCodes AddPvtAttribute(const char* name, const int type, const void*
value);
    /*****************************************************************/
    //DeleteAttribute and DeletePvtAttribute will remove the named attribute
    //from the container DX_CommonObject or DX_ListObject and delete the named
    //attribute's pointer
    /*****************************************************************/
    EreturnCodes DeleteAttribute(const char* name);
    EreturnCodes DeletePvtAttribute(const char* name);
    /*****************************************************************/
    //RemoveAttribute will remove the named attribute from the container
    //DX_CommonObject or DX_ListObject but will not delete the named
    //attribute's pointer
    /*****************************************************************/
    EreturnCodes RemoveAttribute(const char* name);
    EreturnCodes RemovePvtAttribute(const char* name);
    /*****************************************************************/
    //Do NOT delete the pointer that is returned to you, it still is owned by
    //the container DX_CommonObject or DX_ListObject. You CAN use the any of
    //the attribute class methods for the pointer.
    /*****************************************************************/
```

-continued

```
        void* GetAttribute(const char* name);
        void* GetPvtAttribute(const char* name);
        void PrintContents();
        //The caller of Demarshal is responsible for object's memory allocation
        static DX_CommonObject* Demarshal(char* ObjOid, int type, int ContextIndex);
        EreturnCodes Marshal(int type, int ContextIndex);
        static EreturnCodes DeleteStorage(const char* oidVal, int type, int ContextIndex);
        //The caller of GetOID is responsible for deleting the memory of the returned
    char*
        char*       GetOID();
        EPriorityCode   GetPriority();
    protected:
        void* Find(const char* name);
        static EreturnCodes RestorePersistentObject(const char* oidVal);
        static EreturnCodes DeletePersistentObject(const char* oidVal, int type);
    private:
        //Data Members
        DX_ListObject* PrivateList;
        DX_ListObject* PublicList;
        static void Delete(RWDlistCollectables* list);
        static int Copy(RWDlistCollectables* dest, const RWDlistCollectables *src);
        static EreturnCodes CopyPersistentObject(char* filename);
        static EreturnCodes CopyFile(char* filename,char* copyfilename);
        void saveGuts(RWFile& file) const;
        void saveGuts(RWvostream& stream) const;
        void restoreGuts(RWFile& file);
        void restoreGuts(RWvistream& stream);
        const int check() const;
        DX_Boolean updateListOids(DX_ListObject* Plist, DX_OID *Poid);
        DX_Boolean updateObjectOids(DX_CommonObject* Pobj, DX_OID *Poid);
        DX_Boolean ValidateNaming(const char* name);
    #ifdefDX_DATABASE
        EreturnCodes InsertIntoTable(char* filename, int ContextIndex);
        static EreturnCodes RetrieveFromTable(char* filename, char* oid, int
    ContextIndex);
        EreturnCodes UpdateTable(char* filename, int ContextIndex);
    #endif
        //use to cal. the number of bytes needed to store an object using RWFile
        RWspace binaryStoreSize() const;};
};
```

The following methods are implicated when accessing the Public List: AddAttribute; GetAttribute; DeleteAttribute, and RemoveAttribute. The following methods are implicated when accessing the Private List: AddPvtAttribute; GetPvtAttribute; DeletePvtAttribute, and RemoveAttribute. The AddAttribute, DeleteAttribute, and RemoveAttribute methods for manipulating a Common Object are characterized in greater detail in the following code-level examples:

EXAMPLE #4

AddAttribute: Adds attribute to CommonObject tree
   EreturnCodes AddAttribute(DX_CommonAttribute* newAttr);
   EreturnCodes AddAttribute(DX_ListObject* newAttr);
   EreturnCodes AddAttribute(DX_CommonObject* newAttr);
   EreturnCodes AddAttribute(const char* name, const int type, const void* value);
   EreturnCodes AddPvtAttribute(DX_CommonAttribute* newAttr);
   EreturnCodes AddPvtAttribute(DX_ListObject* newAttr);
   EreturnCodes AddPvtAttribute(DX_CommonObject* newAttr);
   returnCodes AddPvtAttribute(const char* name, const int type, const void* value);

EXAMPLE #5

DeleteAttribute: Removes attribute from CommonObject tree and destroys attribute
   EreturnCodes DeleteAttribute(const char* name);
   EreturnCodes DeletePvtAttribute(const char* name);

EXAMPLE #6

RemoveAttribute: Removes attribute from CommonObject tree
   EreturnCodes RemoveAttribute(const char* name);
   EreturnCodes RemovePvtAttribute(const char* name);

The following Common Object retrieval methods are used internally by the GetAttributeValue( ) and SetAttributeValue( ) methods to search the attribute list of a Common Object and to locate a specific Common Attribute instance. These retrieval methods may be used by application developers as well. Each of these methods require a fully dot(.) delimited Distinguished Name and will recursively walk all relative levels of nesting to retrieve the relevant object/attribute.

EXAMPLE #7 void* GetAttribute(const char* name);
where, GetAttribute returns a pointer to a Common Attribute derived object or Common Object stored within a Common Object's Public List.

EXAMPLE #8 void* GetPvtAttribute(const char* name);
where, GetPvtAttribute returns a pointer to a Common Attribute derived object from within a Common Object's Private List.

The following Common Object methods require that the attribute name be represented in its dot(.) delimited fully distinguished name. This naming convention should be followed at all levels of object nesting starting from the name of the object instance from which the method is invoked. These methods also require the user to provide and manage memory allocation for attribute values. Additional usage examples are given as follows:

EXAMPLE #9

EreturnCodes AddAttribute(DX_CommonAttribute* newAttr);
EreturnCodes AddAttribute(DX_ListObject* newAttr);
EreturnCodes AddAttribute(DX_CommonObject* newAttr);
EreturnCodes AddAttribute(const char* name, const int type, const void* value);
EreturnCodes AddPvtAttribute(DX_CommonAttribute* newAttr);
EreturnCodes AddPvtAttribute(DX_ListObject* newAttr);
EreturnCodes AddPvtAttribute(DX_CommonObject* newAttr);
EreturnCodes AddPvtAttribute(const char* name, const int type, const void* value);
EreturnCodes DeleteAttribute(const char* name);
EreturnCodes DeletePvtAttribute(const char* name);
EreturnCodes RemoveAttribute(const char* name);
EreturnCodes RemovePvtAttribute(const char* name);

Further examples of AddAttribute and AddPvtAttribute method usage are provided as follows:

EXAMPLE #10

```
i int *xx=new int(321);
if (PtestObj->AddPvtAttribute("TestObject.PvtIntAttr",
    DX_INTEGER, (void*)xx)==SUCCESS)
{ ... }
    delete xx;
```

A further example of GetAttribute method usage is provided as follows:

EXAMPLE #11

```
DX_XXX*PtrAttr=objInstance->GetAttribute
    ("commonObjName.attrName");
DX_XXX*PtrAttr=objInstance->GetAttribute
    ("commonObjName.listObjName .attrName");
```

A further example of GetAttributeValue method usage is provided as follows:

EXAMPLE #12

```
struct DX_AttributeValue tmpAttrVal;
if (PtestObj->GetAttributeValue("TestObject.IntAttr", tmpAttrVal) ==
SUCCESS)
{
    int* newInt = (int*)tmpAttrVal.value;
    if (newInt)
    {
        // do something
        delete newInt;
    }
}
```

A further example of SetAttributeValue method usage is provided as follows:

EXAMPLE #13

```
int* newVal=new int(555);
if (PtestObj->SetAttributeValue("TestObject.IntAttr",
    (void*)newVal)==SUCCESS)
{ ... }
if (newVal)
    delete newVal;
```

In general, each Common Object is given a unique Object Identifier or OID so that any child or related objects can be associated with each other. All objects created as a result of this original OID require that this initial OID be stored as part of the object, regardless of whether the new object is a direct child object or whether the original object still exists. If the original OID were not stored, it would not be possible to correlate response objects with the initial request object. The OID value is automatically set during instantiation. Parent OID values are updated automatically when AddAttribute( ) is invoked, including all Common Objects that are contained within a ListObject.

The OID is typically a concatenation of count, pid, time, hash, and hostid in order to guarantee its uniqueness. An illustrative example is provided as follows:

EXAMPLE #14

```
class: DX_OID: public DX_CommonAttribute
    {
        RWDECLARE_COLLECTABLE(DX_OID);
        friend class DX_SysConfigObject;
        friend class DX_CommonObject;
        friend class DX_ListObject;
    protected:
        DX_OID(char* value);
        DX_OID(const char* name, char* value);
    public:
        // constructors
        DX_OID();
        virtual~DX_OID();
        /*************************************************************/
        // Get a copy of type specific value. User should new a pointer for the
```

-continued

```
        // return value and then delete the pointer after use
        /**********************************************************/
        EreturnCodes GetAttributeValue(void* value);
        EreturnCodes GetAttributeValue(char* value);
        void PrintContents();
    private:
        static unsigned long OIDCOUNT;
    #ifndef HPUX
        static DX_Mutex lockOidCount;
    #endif
        char *AttrValue;
        char *storeFileName;
        char *storeDirName;
        void saveGuts(RWFile& file) const;
        void saveGuts(RWvostream& stream) const;
        void restoreGuts(RWFile& file);
        void restoreGuts(RWvistream& stream);
        EreturnCodes SetAttributeValue(void* value);
        char*   GetDirName();
        char*   GetFileName();
        static DX_Boolean CheckOIDFormat(char* oidVal);
};
```

The use of reference counting greatly reduces the amount of time and memory that is required to copy objects. Use of a third-party foundation class library, such as one developed by Rogue Wave Software, Inc., automatically supplies a number of the copy constructors. Also, methods within the DX_CommonObject class itself make use of the Rogue Wave copy methods as well. It is noted that the DX_StringAttribute and DX_BlobAttribute classes provide their own copy optimization through reference counting, as objects of these classes could be of a substantial size.

The Common Attribute is an object that is contained within a Common Object and is used to contain attribute data. The Common Attribute contains a private attribute that denotes the specific attribute type and a set of public attributes for name and value. A Common Attribute may be a simple attribute of a specific data type, name, and value or it may contain another object, such as a List Object or Common Object. The type specific Common Attribute classes all inherit their capabilities from the generic Common Attribute class so all classes will behave in an equivalent manner. Reference is made to FIGS. 16A–16D, which illustrate the contents of a Common Attribute when used to represent some of the supported data types.

The Common Attribute class is an abstract base class from which type specific Attribute classes are derived, a characterizing example of which is given as follows:

EXAMPLE #15

```
class: DX_CommonAttribute : public DX_CommonBase
{
    public:
        virtual EreturnCodes GetAttributeValue(void* value) = 0;
        virtual EreturnCodes SetAttributeValue(void* value) = 0;
        virtual void PrintContents()=0;
};
```

The following attribute value access and modification methods, termed GetAttributeValue and SetAttributeValue, are intended to provide access to the attribute value. It is noted that the caller is responsible for the memory allocated in the storage type. Two usage examples are provided as follows:

EXAMPLE #16

DX_CommonAttribute* Pattr=0;
Pattr=(DX_CommonAttribute*)PrestoredObj->GetAttribute
("TestObject.ListObject.IntAttrInList3");
int* intVal=new int;
if (PmyOID && PmyOID->GetAttributeValue(intVal)
!=SUCCESS) { . . . }
if (intVal)
  delete inVal;

EXAMPLE #17 int* newVal=new int(555);
if (PtestObj->SetAttributeValue("TestObject.IntAttr",
(void*)newVal)==SUCCESS) { . . . }
if (newVal)
  delete newVal;

In one embodiment, a set of overloaded operators are provided for performing attribute value comparison operations. In another embodiment, the following comparison operators are supported for Attributes: "==" or equal operator; "!=" or not equal operator; ">" or greater than operator; and "<" or less than operator.

The following non-exhaustive list of attribute types supported by the Common Attribute are given as follows: Integer; String; Date; Time; Real; Blob; Version, MultiValue, ListObject, and ListObjectIterator. It is noted that the MultiValue attribute type represents a container attribute that may have multiple values, and that the ListObject attribute type typically contains a number of attributes or objects to represent a multi-valued attribute. It is further noted that Object version control is implemented by using a private Version object attribute. Any changes to object or attribute makeup will be converted transparently when any new version is introduced.

Code-level examples of various type specific attribute classes that are supported are provided as follows:

EXAMPLE #18

```
attribute class: DX_IntegerAttribute
        /****************************************************************
         * CLASS NAME       :   DX_IntegerAttribute
         * INHERITED FROM   :   None
         * INHERITS         :   DX_CommonAttribute
         * DESCRIPTION      :   Provides storage for integer attributes
         ****************************************************************/
        class DX_IntegerAttribute:public DX_CommonAttribute
        {
             RWDECLARE_COLLECTABLE(DX_IntegerAttribute);
            public:
/****************************************************************/
            // If name==NULL, the name is set to "NOT_SET".
            // If name is ""or contains a "." it will be set to "INVALID NAME"
            /****************************************************************/
            DX_IntegerAttribute(const char* name=0);
            DX_IntegerAttribute(const char* name, int value);
            virtual~DX_IntegerAttribute();
            /****************************************************************/
            // The memory for the value argument is allocated and deallocated
            // by the caller. The library function GetAttributeValue just writes
            // to the value argument and the SetAttributeValue just reads the
            // argument to reset the value of the attribute
            /****************************************************************/
            EreturnCodes GetAttributeValue(void* value);// argument assumed to be int*
            EreturnCodes GetAttributeValue(int& value);
            EreturnCodes SetAttributeValue(void* value);// argument assumed to be int*
            EreturnCodes SetAttributeValue(int value);
            void PrintContents();
         private:
            int AttrValue;
            void saveGuts(RWFile& file) const;
            void saveGuts(RWvostream& stream) const;
            void restoreGuts(RWFile& file);
            void restoreGuts(RWvistream& stream);
};
```

EXAMPLE #19

```
attribute class: DX_StringAttribute
        /****************************************************************
         * CLASS NAME       :   DX_StringAttribute
         * INHERITED FROM   :   None
         * INHERITS         :   DX_CommonAttribute
         * DESCRIPTION      :   Provides storage of strings.
         ****************************************************************/
        class DX_StringAttribute : public DX_CommonAttribute
        {
             RWDECLARE_COLLECTABLE(DX_StringAttribute);
            public:
/****************************************************************/
            // If name==NULL, the name is set to "NOT_SET".
            // If name is "" or contains a "." it will be set to "INVALID NAME"
            /****************************************************************/
            DX_StringAttribute(const char* name=0),
            DX_StringAttribute(const char* name, const char* value);
            DX_StringAttribute(const char* name, const UNICHAR* value);
            DX_StringAttribute(const char* name, const DX_String& value);
            virtual~DX_StringAttribute();
            /****************************************************************/
            // Get a copy of char* value. The library will allocate the
            // appropriate storage, the user should delete the pointer after use.
            /****************************************************************/
            EreturnCodes GetAttributeValue(void* value);// assumes char** is passed
            // Get a copy oftype specific value. The library will allocate the
            // appropriate storage, the user should delete the pointer after use.
            /****************************************************************/
            EreturnCodes GetAttributeValue(char* &value);
            EreturnCodes GetAttributeValue(UNICHAR* &value);
            EreturnCodes GetAttributeValue(DX_String* &value);
```

-continued

```
/************************************************************/
// The memory for the value argument is allocated and deallocated
// by the caller. The library functions just read the value
// argument to reset the value of the attribute.
// NOTE: the method taking (void* value) assumes const char*
/************************************************************/
    EreturnCodes SetAttributeValue(void* value);
    EreturnCodes SetAttributeValue(const char* value);
    EreturnCodes SetAttributeValue(const UNICHAR* value);
    EreturnCodes SetAttributeValue(const DX_String& value);
    void PrintContents();
private:
    DX_String* AttrValue;
    void saveGuts(RWFile& file) const;
    void saveGuts(RWvostream& stream) const;
    void restoreGuts(RWFile& file);
    void restoreGuts(RWvistream& stream);
};
```

EXAMPLE #20 class: DX_String

The DX_String class is a reference counted container class used by the DX_StringAttribute to store the attribute's value. It provides the user a way to keep down the overhead associated with having to copy the data.

```
class DX_String : public RWCollectable
{
    RWDECLARE_COLLECTABLE(DX_String)
    friend class DX_StringAttribute;
public:
    DX_String();
    DX_String(const char* value);
    virtual ~DX_String();
```

-continued

```
    void PrintContents();
private:
    char* StringValue;
    int* len;
    int* refCount;
    DX_String& operator=(const DX_String& rhs);
    void saveGuts(RWFile& file) const;
    void saveGuts(RWvostream& stream) const;
    void restoreGuts(RWFile& file);
    void restoreGuts(RWvistream& stream);
};
```

EXAMPLE #21

```
attribute class: DX_DateAttribute
/*******************************************************************
* CLASS NAME      :    DX_DateAttribute
* INHERITED FROM  :    None
* INHERITS        :    DX_CommonAttribute
* DESCRIPTION     :    Provides storage for Date attributes
*
* NOTE: This class only stores the date related fields of the struct tm*
*    The time related fields are initialized to 0, any data passed in
*    the struct tm* time related fields will be discarded.
*******************************************************************/
class DX_DateAttribute : public DX_CommonAttribute
{
    RWDECLARE_COLLECTABLE(DX_DateAttribute);
public:
    /************************************************************/
    // If name==NULL, the name is set to "NOT_SET".
    // If name is ""or contains a "." it will be set to "INVALID_NAME"
    /************************************************************/
    DX_DateAttribute(const char* name=0);
    DX_DateAttribute(const char* name, const struct tm value);
    virtual DX_DateAttribute();
    /************************************************************/
    //   The struct tm passed as an argument for GetAttributeValue
    //   is to be allocated and deallocated by the caller
    //   The library function just copies the value into the
    //   structure.
    /************************************************************/
    EreturnCodes GetAttributeValue(struct tm& value);
    EreturnCodes GetAttributeValue(void* value); // assumes struct tm* is passed
```

-continued

```
/***********************************************************/
// The memory for the value argument is allocated and deallocated
// by the caller. The library functions just read the value
// argument to reset the value of the attribute
/***********************************************************/
        EreturnCodes SetAttributeValue(void * value);
        EreturnCodes SetAttributeValue(const struct tm value);
        void PrintContents();
    private:
        RWCollectableDate *AttrValue;
        void saveGuts(RWFile& file) const;
        void saveGuts(RWvostream& stream) const;
        void restoreGuts(RWFile& file);
        void restoreGuts(RWvistream& stream);
};
```

EXAMPLE #22

```
attribute class:DX_TimeAttribute
/*****************************************************************
** CLASS NAME      :   DX_TimeAttribute
* INHERITED FROM   :   None
* INHERITS         :   DX_CommonAttribute
* DESCRIPTION      :   Provides storage of time values in form of SSE.
*****************************************************************/
class DX_TimeAttribute : public DX_CommonAttribute
{
    RWDECLARE_COLLECTABLE(DX_TimeAttribute);
public:
/***********************************************************/
// If name==NULL, the name is set to "NOT_SET".
// If name is ""or contains a "." it will be set to "INVALID_NAME"
/***********************************************************/
        DX_TimeAttribute(const char*name=0);
        DX_TimeAttribute(const char*name, unsigned long value);
        virtual~DX_TimeAttribute();
/***********************************************************/
// The memory for the value argument is allocated and deallocated
// by the caller. The library function GetAttributeValue just writes
// to the value argument and the SetAttributeValue just reads the
// argument to reset the value of the attribute
/***********************************************************/
        // argument assumed to be unsigned long*
        EreturnCodes GetAttributeValue(void* value);
        EreturnCodes GetAttributeValue(unsigned long& secondSinceEpoch);
        // argument assumed to be unsigned long*
        EreturnCodes SetAttributeValue(void* value);
        EreturnCodes SetAttributeValue(const unsigned long value);
        void PrintContents();
    private:
        RWCollectableTime* AttrValue;
        void saveGuts(RWFile& file) const;
        void saveGuts(RWvostream& stream) const;
        void restoreGuts(RWFile& file);
        void restoreGuts(RWvistream& stream);
};
```

EXAMPLE #23

```
attribute class:DX_RealAttribute
/*****************************************************/
*  CLASS NAME      :   DX_RealAttribute
*  INHERITED FROM  :   None
*  INHERITS        :   DX_CommonAttribute
*  DESCRIPTION     :   Provides storage of float types
*****************************************************/
class DX_RealAttribute : public DX_CommonAttribute
{
    RWDECLARE_COLLECTABLE(DX_RealAttribute);
public:
/*****************************************************/
//If name==NULL, the name is set to "NOT_SET".
//If name is ""or contains a "." it will be set to
//"INVALID_NAME"
/*****************************************************/
        DX_RealAttribute(const char* name=0);
        DX_RealAttribute(const char* name, float value);
        virtual ~DX_RealAttribute( );
/*****************************************************/
//The memory for the value argument is allocated and
```

-continued

```
        //deallocated by the caller. The library function
        //GetAttributeValue just writes to the value argument
        //and the SetAttributeValue just reads the argument
        //to reset the value of the attribute
        /****************************************************/
        EreturnCodes GetAttributeValue(void* value); //argument
        assumed to be
float*
        EreturnCodes GetAttributeValue(float& value);
        EreturnCodes SetAttributeValue(void* value); //argument
        assumed to be
float*
        EreturnCodes SetAttributeValue(float value);
        void PrintContents( );
    private:
        float AttrValue;
        void saveGuts(RWFile& file) const;
        void saveGuts(RWvostream& stream) const;
        void restoreGuts(RWFile& file);
        void restoreGuts(RWvistream& stream);
};
```

EXAMPLE #24

```
attribute class:DX_BlobAttribute
/*******************************************************
*    CLASS NAME    :    DX_BlobAttribute
*    INHERITED FROM :   None
*    INHERITS       :   DX_CommonAttribute
*    DESCRIPTION    :   Attribute storage class to store raw
*                       binary stream
*                       stored in a unsigned char*
*                       Takes/returns DX_Blob struct
*******************************************************/
class DX_BlobAttribute : public DX_CommonAttribute
{
    RWDECLARE_COLLECTABLE(DX_BlobAttribute);
public:
        /****************************************************/
        //If name==NULL, the name is set to "NOT_SET".
        //If name is "" or contains a "." it will be set to
        //"INVALID_NAME"
        /****************************************************/
        DX_BlobAttribute(const char* name=0);
        DX_BlobAttribute(const char* name, const DX_Blob& value);
        DX_BlobAttribute(const char* name, unsigned char* value,
        unsigned int size);
        virtual ~DX_BlobAttribute( );
        /****************************************************/
        //Get a copy of DX_Blob* value. The library will allocate the
        //appropriate storage, the user should delete the pointer after use.
        /****************************************************/
        EreturnCodes GetAttributeValue(void* value);//assumes
        DX_Blob**
        /****************************************************/
        //Get a copy of type specific value. The library will allocate the
        //appropriate storage, the user should delete the pointer after use.
        /****************************************************/
        EreturnCodes GetAttributeValue(DX_Blob* &value);
        EreturnCodes GetAttributeValue(unsigned char* &value);
        /****************************************************/
        //The memory for the value argument is allocated and
        //deallocated by the caller. The library functions just read
        //the value argument to reset the value of the attribute.
        //
        //NOTE: the method taking (void* value) assumes
        //const DX_Blob*
        /****************************************************/
        EreturnCodes SetAttributeValue(void* value);
        EreturnCodes SetAttributeValue(const DX_Blob& value);
        EreturnCodes SetAttributeValue(const unsigned char* value,
        unsigned int
```

-continued

```
        size);
        unsigned int GetBlobSize( );
        void PrintContents( );
    private:
        DX_Blob* AttrValue;
        void saveGuts(RWFile& file) const;
        void saveGuts(RWvostream& stream) const;
        void restoreGuts(RWFile& file);
        void restoreGuts(RWvistream& stream);
};
```

EXAMPLE #25

```
class: DX_Blob
    The DX_Blob class is a reference counted container class used
    by the DX_BlobAttribute to store the attribute's value.
    It provides the user a way to keep down the overhead associated
    with having to copy the data.
        class DX_Blob : public RWCollectable
        {
            RWDECLARE_COLLECTABLE(DX_Blob);
            friend class DX_BlobAttribute;
            friend class DX_MultiValueAttribute;
        public:
            DX_Blob( );
            DX_Blob(const unsigned char *value, unsigned int size);
            ~DX_Blob( );
            DX_Blob& operator=(const DX_Blob& rhs);
            void PrintContents( );
            unsigned int GetBlobSize( );
            EreturnCodes GetValue(unsigned char** value);
        private:
            int* refCount;
            unsigned int* BlobSize;
            unsigned char* BlobValue;
            void saveGuts(RWFile& file) const;
            void saveGuts(RWvostream& stream) const;
            void restoreGuts(RWFile& file);
            void restoreGuts(RWvistream& stream);
        };
```

EXAMPLE #26

```
attribute class:DX_VersionAttribute
/*******************************************************
*    CLASS NAME     :   DX_VersionAttribute
*    INHERITED FROM :   None
*    INHERITS       :   DX_CommonAttribute
*    DESCRIPTION    :   Provides a integer value that
*                   :   can be used to mark the version of
*                   :   an object in process.
*******************************************************/
class DX_VersionAttribute : public DX_CommonAttribute
{
    RWDECLARE_COLLECTABLE(DX_VersionAttribute);
public:
        /****************************************************/
        //If name==NULL, the name is set to "NOT_SET".
        //If name is "" or contains a "." it will be set to
        //"INVALID_NAME"
        /****************************************************/
        DX_VersionAttribute(const char* name=0);
        DX_VersionAttribute(const char* name, int value);
        virtual ~DX_VersionAttribute( );
        /****************************************************/
        //The memory for the value argument is allocated and
        //deallocated by the caller. The library function
        //GetAttributeValue just writes to the value argument
        //and the SetAttributeValue just reads the argument
```

-continued

```
        //to reset the value of the attribute
        /****************************************************/
        EreturnCodes GetAttributeValue(void* value);
        //argument assumed to be int*
        EreturnCodes GetAttributeValue(int& value);
        EreturnCodes SetAttributeValue(void* value);
        //argument assumed to be int*
        EreturnCodes SetAttributeValue(int value);
        void PrintContents( );
    private:
        int Attrvalue;
        void saveGuts(RWFile& file) const;
        void saveGuts(RWvostream& stream) const;
        void restoreGuts(RWFile& file);
        void restoreGuts(RWvistream& stream);
};
```

A MultiValue attribute by definition is a single named attribute that contains multiple individual values of the same type where the multiple individual values make up the attribute's single value. These multiple values are generally not individually addressable from the attribute level. Examples of a MultiValue attribute and usage of same are given in the following examples.

EXAMPLE #27

```
/**********************************************************
*
*   CLASS NAME      :   DX_MultiValueAttribute
*   INHERITED FROM  :   None
*   INHERITS        :   DX_CommonAttribute
*   DESCRIPTION     :   Provides storage of multiple values
*                       for a single attribute instance given
*                       that all attribute values MUST be the
*                       same type.
**********************************************************/
class DX_MultiValueAttribute : public DX_CommonAttribute
{
    RWDECLARE_COLLECTABLE(DX_MultiValueAttribute);
public:
        /****************************************************/
        //If name==NULL, the name is set to "NOT_SET".
        //If name is "" or contains a "." it will be set to
        //"INVALID_NAME"
        /****************************************************/
        DX_MultiValueAttribute(const char* name=0);
        DX_MultiValueAttribute(const char* name, const struct
        DX_MultiValStruct*
value);
        virtual ~DX_MultiValueAttribute( );
        /****************************************************/
        //Get a copy of type specific value. User should new a
        //pointer for the return value and then delete the
        //pointer after use
        /****************************************************/
        EreturnCodes GetAttributeValue(DX_MultiValStruct* value);
        EreturnCodes GetAttributeValue(void* value);
        EreturnCodes SetAttributeValue(const struct
        DX_MultiValStruct* value);
        EreturnCodes SetAttributeValue(void* value);
        void PrintContents( );
    private:
        RWDlistCollectables* AttrValue;
        void saveGuts(RWFile& file) const;
        void saveGuts(RWvostream& stream) const;
        void restoreGuts(RWFile& file);
        void restoreGuts(RWvistream& stream);
};
```

EXAMPLE #28

```
class: DX_MultiValStruct
    The DX_MultiValStruct is a container class used by the
    DX_MultiValue to store the attribute's value. It contains
    the attribute type information, the number of individual attribute
    values and an array of pointers to the attribute value elements.
        struct DX_MultiValStruct
        {
            int valType;
            int entries;
            voic* valPtrArr[MAX_MULTI_VAL];
        };
```

EXAMPLE #29

```
Instantiation:
    int *int1 = new int(1);
    int *int2 = new int(2);
    struct DX_MultiValStruct tmpStruct;
    if (int1 && int2)
    {
        tmpStruct.valType = DX_INTEGER;
        tmpStruct.entries = 2;
        tmpStruct.valPtrArr[0] = int1;
        tmpStruct.valPtrArr[1] = int2;
    }
    DX_MultiValueAttribute *PmvAttr = 0;
    PmvAttr = new DX_MultiValueAttribute
    ("MultiValuedAttribute",&tmpStruct);
    //cleanup
    if (int1)
        delete int1;
    if (int2)
        delete int2;
```

EXAMPLE #30

```
GetAttributeValue:
    struct DX_MultiValStruct *retStruct = new DX_MultiValStruct;
        if (retStruct)
        {
            if (PmvAttr.>GetAttributeValue((void*)retStruct))
            {
                for (int i=0; i<retStruct->entries; i++)
                {
                    int *retInt = (int*)retStruct->valPtrArr[i];
                    if (retInt)
                    {
                        //Do stuff
                        delete retInt;
                    }
                }
            }
            else
                cerr <<"###### GetAttributeValue FAILED
                for Integers ######"<<end1;
            delete retStruct;
        }
```

As was discussed previously, a List is a sequence of attributes, i.e., instances of attribute classes and/or Common Objects, an example of which is given as follows:

EXAMPLE #31

```
/************************************************************
* CLASS NAME       : DX_ListObject
* INHERITED FROM   : None
* INHERITS         : DX_CommonBase
* DESCRIPTION      : Provides sequential storage for all
*                    DX_*Object and DX_*Attribute
*                    classes. When used with a
*                    DX_ListObjectIterator the list can
*                    be walked an element at a time
*                    and perform a recursive operation.
************************************************************/
class DX_ListObject : public DX_CommonAttribute
{
    RWDECLARE_COLLECTABLE(DX_ListObject);
    friend class DX_ListObjectIterator;
    friend class DX_CommonObject;
protected:
    //Data Members
    RWDListCollectables* Attrvalue;
    char *Parent;
    DX_ListObject(const char* name, char* parent);
public:
    //Constructors
    /*********************************************************/
    //If name==NULL, the name is set to "NOT_SET".
    //If name is "" contains a "." it will be set to
    //"INVALID_NAME"
    /*********************************************************/
    DX_ListObject(const char* name=0);
    DX_ListObject(const DX_ListObject& ref);
    virtual ~DX_ListObject( );
    /*********************************************************/
    //All AddAttribute methods take ownership of the pointers
    //passed in to them. Do NOT delete the pointers after a
    //call to AddAttribute. The pointers will be deleted
    //when the container DX_ListObject is deleted.
    //
    //NOTE: When using the following two methods for creating
    //a DX_STRING
attribute
    //
    //   AddAttribute(const char* name, const int type,
    //   const void* value) and AddPvtAttribute(const char* name,
    //   const int type, const void* value)
    //
    //   the value is defaulted to be of type const char*
    //   and not UNICHAR*
    //   Misuse will lead to unexpected behavior.
    /*********************************************************/
    EreturnCodes AddAttribute(DX_CommonAttribute* newAttr);
    EreturnCodes AddAttribute(const char* name, const int type,
    const void*
value);
    EreturnCodes AddAttribute(DX_CommonObject* newObj);
    EreturnCodes AddAttribute(DX_ListObject* newObj);
    /*********************************************************/
    //Do NOT delete the pointer that is returned to you,
    //it still is owned by the container DX_ListObject.
    //You CAN use the any of the attribute class
    //methods for the pointer.
    /*********************************************************/
    DX_CommonBase* GetAttribute(const char* name);
    /*********************************************************/
    //Removes from list, but does not delete
    /*********************************************************/
    EreturnCodes RemoveAttribute(const char* name);
    /*********************************************************/
    //Removes from list, and deletes the pointer
    /*********************************************************/
    EreturnCodes DeleteAttribute(const char* name);
    DX_CommonBase* Find(const char* name);
    void PrintContents( );
private:
    void saveGuts(RWFile& file) const;
    void saveGuts(RWvostream& stream) const;
    void restoreGuts(RWFile& file);
    void restoreGuts(RWvistream& stream);
};
```

The ListObject iterator enables a user to incrementally retrieve and use objects or attributes contained within a ListObject, an example of which is given as follows:

EXAMPLE #32

```
/************************************************************
* CLASS NAME       : DX_ListObjectIterator
* INHERITED FROM   : None
* INHERITS         : DX_CommonBase
* DESCRIPTION      : Provides sequencial retrieval for all
*                    DX_*Object and DX_*Attribute
*                    classes store within a
*                    DX_ListObject.
************************************************************/
class DX_ListObjectIterator : public DX_CommonBase
{
private:
    RWDlistCollectablesIterator *listIter;
public:
    DX_ListObjectIterator(const DX_ListObject& PlistObj);
    virtual ~DX_ListObjectIterator( );
    void toFirst( );
    void toLast( );
    void* next( );//returns nil when end of list is reached
    void* getCurrent( );
};
```

An example of ListObject usage is provided as follows:

EXAMPLE #33

Assumes a populated DX_ListObject identified by a pointer "PlistObj"

```
// Instantiate the DX_ListObjectIterator for
    DX_ListObject pointer PlistObj
DX_ListObjectIterator PlistIter(*PlistObj);
// Set the iterator to the beginning of the list
PlistIter.toFirst( );
DX_CommonBase *PcurrentObj=0;
PcurrentObj=(DX_CommonBase*)PlistIter.getCurrent( );
while(PcurrentObj)
{
    // Do something with object/attribute
    . . .
    PcurrentObj=(DX_CommonBase*) PlistIter.next( );
}
```

Having discussed in detail various aspects of the Common Object design hereinabove, a more comprehensive description of a data exchange system infrastructure in accordance with one embodiment of the present invention is provided below. The various aspects of the system infrastructure described in greater detail hereinbelow include: configuration management; logging and tracing; context definition; performance and statistics monitoring; administration and maintenance; security; processing thread pool; internationalization; and process procedures.

Configuration management involves managing the static and run time configurable parameters of the various components of the data exchange system. When a component in the data exchange system is initiated, it reads a specific text file, referred to as the configuration file (<component_name>.cfg, specified either in directory $(DX_HOME)/DX_Config or current working directory) to determine the initial values of the parameters. It is noted that each component has its own configuration file, but multiple instances of a component share the same file. Default values are assumed for parameters not specified in the configuration file. If there are multiple entries for a parameter, all entries except the first entry are ignored.

Parameters of a component, such as trace/log settings, may be changed at run time. For this purpose, configuration management tools provide a command line interface and a Web interface for viewing and configuring various parameters at run time. It is noted that various components of the data exchange system may be running on different machines. Thus, the configuration management utility provides the ability to view and modify the parameters of a component running on a different machine, possibly on a different platform. The Web interface of the configuration management utility provides the requisite connectivity to a remote machine and provides the capability for performing remote configurations.

When initiated, a component creates an instance of a System Configuration Object (DX_SysConfigObject) that stores the current parameter settings. The component also registers for a Signal/Event so that it is informed of changes to the configuration using the dynamic configuration command line interface/web interface. When a user wants to change the run time parameters of a component (identified by the process ID and the machine on which it is running), a signal/event is sent to the component to update its configuration. A signal/event handler invokes the ReconfigParameters( ) method on the DX_SysConfigObject, which takes care of reconfiguring the various controller objects, such as DX_TraceLogObject, DX_QueueManager, and DX_ThreadController for example. The System Configuration object, DX_SysConfigObject, is a singleton object that initializes and controls the configuration of a component in the data exchange system, such as logging/tracing levels, thread controller, queuing, and performance monitoring. A singleton object, as understood in the art, refers to a C++ nomenclature meaning that only a single instance of the class may exist within a single executable. A singleton object is most commonly used when controlling system wide resources.

Two macros, DX_SYSINIT and DX_SYSEXIT, are used to manage initialization and destruction of the DX_SysConfigObject, respectively. A usage example of these two macros is given as follows:

EXAMPLE #34

```
#define DX_SYSINIT(ComponentName) \
    DX_SysConfigObject::Instance(ComponentName); \
    RegisterForEvent( );
#define DX_SYSEXIT EndWaitForEvent( ); \
    DX_SysConfigObject::DeleteInstance( );
class DX_SysConfigObject{
public:
    // To ensure that only one instance of the System Config
        object
    // exists, one has to always use this function to obtain a
    // reference to the
    // system config object
    // Cannot delete the pointer returned. use
    // DX_SYSEXIT if you want to delete
    // the sysconfigobject
    static DX_SysConfigObject* Instance(char
        *componentName=0);
    // static method to delete the instance of the singleton
        object
    static void DeleteInstance( );
    // Called when the parameters are to be changed to run
        time
    void ReconfigParameters( );
    // used to find parameter values by name from the param-
        ValueList
    // do not delete the pointer returned by this function
    char *FindValue(char *name);
private:
    // constructor is private to make sure the user cannot
        instantiate
    DX_SysConfigObject(char *componentName);
    // destructor
    ~DX_SysConfigObject( );
    // to read the configuration file and initialize the
    // paramValueList
    EreturnCodes InitParamValueList(char *dx_home,
        char** outCfgFileName);
    void GetTraceLogParams(DX_INDICATOR
        *trcLogCategoryInd,
        char* trcLogDir,
        long &logSize);
    // a pointer that stores the one and only instance of the
    // system config object
    static DX_SysConfigObject* instance;
    // the list of various configuration parameters
    //DX_ListObject *paramValueList;
    RWDlistCollectables *paramValueList;
    char ComponentName[MAX_NAME_LEN];
    // Pointer to DX_ThreadController instance
    DX_ThreadController *PthrCtrl;
    // Method to instantiate DX_ThreadController
    // after DX_SysConfigObject constructor
    EreturnCodes InitThreadController( );
    void DeleteThreadController( );
    void DeletePMonitor( );
    // Pointer to DX_Monitor instance
    DX_Monitor *pMonitor;
    // Method to instantiate DX_Monitor after
    // DX_SysConfigObject constructor
    EreturnCodes InitMonitor(const char *appName);
    EreturnCodes InitTraceLogObject(char*
        componentName);
    // Get Monitor config parameters
    void GetMonitorParam(struct MonConfigType
        *monConfig);
    // To access the DX_ThreadController object
    DX_ThreadController* GetThreadController( );
    DX_Mutex* paramListLock;
};
```

The configuration management utility provides a command line interface to get/set the run time configurable parameters of each component in the data exchange system. A Web interface may also be used to provide for component configuration, which would internally be using the command line interface. The following commands are provided for configuration management.

The DX_ConfigGet command may be used to view the configuration parameters for a particular instance of a component identified by its name and typically running on the same machine. A user may choose to specify parameters of particular interest. Otherwise, a list of all the parameters is returned. The syntax for this command is:

DX_ConfigGet <component name>[<param name>]

The DX_ConfigSet command is used to modify configurable parameters for a particular instance of a component at run time. The instance is identified by the component name and the process ID. The syntax for this command is:

DX_ConfigSet <component name><process id><param name>=<new value>{[<param value>=<new value>]}

The logging and tracing utility provides for logging and tracing during execution of a component. As discussed previously, logging reveals the state of the component at the time of an error, while tracing provides a description of all software events as they occur. The tracing information may be used for tracking the component-state, and other related operations. It may be used in conjunction with the logging information to determine the cause of an error, as it provides information about the sequence of events prior to an error.

A component that intends to record a log/trace message indicates the category to which the message belongs. The log and trace messages are recorded in two different files whose names are derived from the name of the application, as indicated in the following example:

(<componentName><pid>.log and <componentName><pid>.trc, respectively)

The possible severity levels for logging various diagnostic messages are as follows. The CRITICAL severity level indicates that the component is in a critical state and cannot proceed properly until the problem is attended to. The MAJOR severity level indicates that a particular activity/operation of the component has failed. However, this may not effect other activities that may continue to run. The WARNING severity level indicates that the component acted in an unexpected manner. This may be something minor, such as a component receiving an invalid message.

Tracing involves recording three types of messages, which are typically specified by the developer. The INFORMATION (SYS_INFO and APP_INFO) message provides a record of specific events that occur during the execution of the component, such as beginning of a new control thread. SYS_INFO is used within the DX libraries and APP_INFO is to be used by applications using the DX libraries. The TRACE (SYS_TRACE and APP_TRACE) message provides a detailed record of various software events that occur during the course of normal execution of the component. SYS_TRACE is used within the DX libraries and APP_TRACE is to be used by the applications using the DX libraries. The AUDIT message provides a record of all the information sent or received by various components of the data exchange system.

A configuration file is used to store trace/log related parameters in one or more directories. The TRACE_LOG_DIR directory is used to store the trace/log files. If this parameter is not specified, it is set by default to the current working directory. The tracing level associated with the SYS_INFO, APP_INFO, SYS_TRACE, APP_TRACE, and AUDIT parameters may be specified as ON or OFF. The default value for any trace level is OFF. The WARNING, MAJOR, and CRITICAL parameters may also be specified as ON or OFF. It is noted that there exists a hierarchical relationship between these three error levels. For example, if WARNING is ON, it implies that all the error levels are ON. If MAJOR is ON, then CRITICAL is ON.

The TRACE_LOG_SIZE parameter controls the maximum size of a trace/log file. When the trace or log file reaches the specified size, it is moved into the files named <componentname><pid>.trc.bk or <componentname><pid>.log.bk, respectively. The default value for the trace/log file size is 100K bytes.

A trace statement is typically used to write a developer specified string to the <ComponentName><pid>.trc file if the trace category specified by the developer, which is generally hard coded in the program, is ON at run time. A log statement is generally used to write a specified error message to <ComponentName><pid>.log file if the category specified by the developer, which is generally hard coded in the program, is set to ON at run time. It is noted that the developer typically specifies an error number that is used to retrieve the error message from an external Message Catalog.

In order to write a message into the log/trace file, the developer may use the macro DX_TL as shown below:

DX_TL(DX_ARGS,Category, StringToLog/ErrorNumber[,arg 1 [,arg2]]);

The macro DX_ARGS includes parameters such as filename, line number, time and thread ID that are automatically written into the trace/log messages. Category is specified by the following enumerated data types:

EXAMPLE #35

```
enum DX_TL_CATEGORY
{
    CRITICAL,
    MAJOR,
    WARNING,
    SYS_INFO
    APP_INFO
    SYS_TRACE,
    APP_TRACE,
    AUDIT
};
```

StringToLog is specified by the developer as a trace message and is written into the <ComponentName><pid>.trc file (type char *). For Example, an AUDIT message could include the details of a Common Object typically stored as a formatted string. ErrorNumber is specified by the developer for a log message (e.g., when the category is CRITICAL, MAJOR or WARNING), and is used to index into a Message Catalog to retrieve the error message to be logged. The error message numbers are defined as an enumerated type as shown below:

EXAMPLE #36

```
enum DX_ERROR_NUM
{
    FILE_NOT_FOUND,
    INVALID_DATA
    . . .
}
```

A component using the Tracing/Logging Utility needs to include the following statement: #include "traceLogUtil.h".

The definition of DX_TraceLogObject and other related definitions are provided as follows:

EXAMPLE #37

```
enum    DX_INDICATOR
        {
            ON,
            OFF
        };
    class DX_TraceLogObject{
        friend class DX_SysConfigObject;
    public:
        //cannot delete the pointer returned
        //call DeleteInstance( )
        static DX_TraceLogObject* Instance
        (char *componentName,
                DX_INDICATOR *initTrcLogCatInd,
                char* initTrcLogDir,
                long initTrcLogSize);
        //cannot delete the pointer returned
        //call DeleteInstance( )
        static DX_TraceLogObject* GetInstance( );
        static void DeleteInstance( );
        //used to write a trace/log message specified by msg
        //to the //.trc/.log file
        void Write(
                char *filename,
                int lineno,
                char* context,
                char* threadId,
                DX_TL_CATEGORY ctg,
                char* msg,
                char* arg1=0,
                char* arg2=0);
        //used to write a log message specified by errNo
        //(access Message Catalog
        //to get the message) to the.log file
        void Write( char *filename,
            int lineno,
            char* context,
            char* threadId,
            DX_TL_CATEGORY ctg,
            EerrorNumber errNo,
            char* arg1=0,
            char* arg2=0);
    private:
        static DX_TraceLogObject* instance;
        //default constructor - does nothing
        DX_TraceLogObject( );
        //constructor used to initialize the Tracing/logging object
        DX_TraceLogObject(char *componentName,
                DX_INDICATOR *initTrcLogCatInd,
                char* initTrcLogDir,
                long initTrcLogSize);
        //destructor
        ~DX_TraceLogObject( );
        //called by sysConfigObject when a deconfigset
        //command modifies any parameters
        void ReconfigParameters(char* componentName,
                DX_INDICATOR *newTrcLogCatInd,
                char* newTrcLogDir,
                long newTrcLogSize);
        //to retrieve the message from the catalog
        char*   GetMessageFromCatalog(int errNum,
                                              char* arg1,
                                              char* arg2);
        //to store the settings of the trace/log levels
        DX_INDICATOR    trcLogCategoryInd
        [DX_NUM_CATEGORIES];
        DX_Boolean CheckLogFileSize(ofstream &logStream,
                                              char *fileName,
                                              long size);
        void CloseLogFile(ofstream &logStream);
        DX_Boolean OpenLogFile(ofstream &logStream,
        char *fileName);
        //the out streams for the trace and log files
        ofstream trcStream;
        ofstream logStream;
        int logStreamIsOpen;
        int trcStreamIsOpen;
        long logSize;
        char traceFileName[MAX_FILE_NAME];
        char logFileName[MAX_FILE_NAME];
        DX_Mutex* trcLock;
        DX_Mutex* logLock;
        DX_Mutex* trclogParamsLock;
    };
    class DX_TraceLogFormatControl
    {
    public:
        static void     WriteFormattedTraceLog
        (ofstream& outStream,
                                              char *category,
                                              char *time,
                                              char *filename,
                                              int lineno,
                                              char* threadId,
                                              char *message);
    };
```

The Write( ) method in the DX_TraceLogObject calls WriteFormattedTraceLog( ) of DX_TraceLogFormatControl Object to write to the trace/log stream in a specific format. Thus, the implementation of the DX_TraceLogFormatControl object may be changed to accommodate the needs of users who would want to implement a desired formatting style. The contents of Trace/Log messages that are logged include the following: Category; File name; Line Number; Thread ID; Time; and Context.

The System Configuration Object contains an instance of the Trace/Log Object, which is initialized with parameter values specified in the Configuration file. When the user modifies the Trace/Log parameters at run time, typically by use of the DX_ConfigSet command, a signal is sent to the applicable component which calls the method ReconfigParameters( ) on the System Configuration Object to re-initialize the parameters. This method, in turn calls ReconfigParameters( ) on the DX_TraceLogObject.

An error/event may occur at a very low level in the code (e.g., database space exhausted). It is important to report this low level event, but it is also important to report the context of what was trying to be achieved within the application when this low level error occurred. The application developer is provided with macros to define a context within the developer's code. The set of macros provided for this purpose include: INIT_CONTEXT; CONTEXT_BEGIN; and CONTEXT_END. In general, every function using the context macros should first use the macro INIT_CONTEXT. It is noted that, if INIT_CONTEXT is not called before defining CONTEXT_BEGIN, the code may not compile.

The beginning of a context may be defined using the macro CONTEXT_BEGIN, and the end of a context can be defined using the macro CONTEXT_END, as is indicated in the following example. The CONTEXT_BEGIN macro takes the argument Context Number. This context number is used to access the Context Catalog of an application and to retrieve the context string. It is noted that nested contexts are generally not allowed. If a CONTEXT_BEGIN is called before the previous context is ended, an implicit CONTEXT_END for the previous context is assumed. The following example is provided:

EXAMPLE #38

```
Func1( )
    {
         INIT_CONTEXT;
         ...
         CONTEXT_BEGIN(Econtext0);
         // all the trace/log statements in this region will
         // have the context information
         // specified by Econtext0.
         CONTEXT_END;
         CONTEXT_BEGIN(Econtext1);
         // in Econtext1
         CONTEXT_END;
    }
```

An object DX_ContextObject is used to store the context information and is defined as follows:

EXAMPLE #39

```
class: DX_ContextObject
    {
    public:
         DX_ContextObject( );
         virtual~DX_ContextObject( );
         void    SetCurrentContext(EcontextNumber cxt);
         char *GetContextFromCatalog(EcontextNumber cxt);
         char* GetContextStr( );
    private:
         char* currentContext;
    }
```

The method GetContextStr( ) is called by every log/trace statement to include the current context information in the message. GetContextFromCatalog( ) is used to retrieve the Context information from the context catalog.

Within a given function, INIT_CONTEXT declares a pointer to a DX_ContextObject, referred to as dx_context, and initializes it to point to a global dummy DX_ContextObject, whose context string is blank. It also declares and initializes a variable dx_init_context. The definition of the INIT_CONTEXT macro is as follows:

EXAMPLE #40 define INIT_CONTEXT DX_ContextObject* dx_context=&dummy; \
int dx_init_context=1;

The macro CONTEXT_BEGIN, described in the following example, checks whether dx_init_context is initialized or not. The significance of this check is to make sure that the function does not compile if INIT_CONTEXT is not called before the first occurrence of CONTEXT_BEGIN. It then initializes the DX_ContextObject pointer to point to a new DX_ContextObject instance storing the context string specified by the context number argument.

EXAMPLE #41 define CONTEXT_BEGIN(cxt)
    if(dx_init_context){\
         dx_context=new DX_ContextObject; \ dx_context
         >SetCurrentContext(cxt);}

The macro CONTEXT_END deletes the DX_ContextObject instance created by CONTEXT_BEGIN, as can be seen in the following example.

EXAMPLE #42 define CONTEXT_END delete dx_context; \
    dx_context=&dummy;

Various aspects of the performance and statistics monitoring features of the data exchange system infrastructure will now be described. An automated performance monitoring mechanism is used to provide load and throughput statistics for each system input queue on a regular interval basis. The statistical data may be used to generate a performance report. The monitoring interval and output type and location is typically externally controlled.

The following statistics are typically recorded when monitoring is performed on the queue: (1) number of the messages processed in the system input queue; (2) the average message cache time in the system input queue, by priority; and (3) the average message processing time from the system input queue, by priority. The following statistics are typically recorded when monitoring is performed on the disk space and database table space usage: (1) the percentage of the disk space usage if the queue storage type is FLATFILE; and (2) the percentage of the table space usage if the queue storage type is DATABASE.

The Monitor is implemented as a threaded operation that exists for the duration of the executable whenever the monitor is triggered ON. At externally controlled intervals, this thread is activated, retrieves all pertinent statistical data, and then writes to the Statistics Log for each of its system input queues. The statistical log is typically an ASCII file.

When queue monitoring is being performed (i.e., QUEUE_MONITOR=ON), the monitor writes the log file into a $DX_HOME/DX_MonitorLog directory. The monitor writes the number of message processed in the system input queue, the average processed message cache time in the system input queue, and the average message transaction time from the system input queue by priority into an ASCII file on a regular time interval. Each system input queue of a monitor instance has its own ASCII log file. The name of the file follows the system file name schema (e.g., AppName>_<QueueName>.Mon_Log).

This file stores the most current queue performance information. The maximum file size is defined in the system configuration file. After the file reaches its maximum size, the monitor moves it to a backup copy named <AppName>_<QueueName>.Mon_Log.bk and creates and writes the performance information into the new <AppName>_<QueueName>.Mon_Log file. The system typically retains only one backup copy of the monitor log files.

The monitor writes the log file in the same format irrespective of whether the queue is file based or database based. The format of the report file is provide in Table 1 below:

TABLE 1

| Time | Priority | Number Of Msg | Avg Cache Time | Avg Process Time | Priority | Number Of Msg | Avg Cache Time | Avg Process Time |
| --- | --- | --- | --- | --- | --- | --- | --- | --- | where, Time represents the time stamp of the record; Priority represents the priority of the queue; Number of Messages represents the number of message processed in the last time interval; Average Cache Time represents the average time that a message stays in the queue (i.e., the time between dequeue and enqueue); and Average Process Time represents the average transactions time for a message (i.e., the time between commit successful and dequeue). The report headers repeat for each priority queue supported in the system. It is noted that the data fields are delimited by a comma so that the log file may be easily imported into spreadsheet software.

When disk space and/or database table space usage is being monitored (i.e., SYSTEM_INFO_MONITOR=ON), the monitor writes the usage of the disk where the queue files located into an ASCII file on a regular time interval if the queue is file based. The name of the file follows the system file name schema (e.g., <AppName>_SysInfo.Mon_Log). The maximum file size is defined in the system configuration file. After the file reaches its maximum size, the monitor moves it to a backup copy named <AppName>_SysInfo.Mon_Log.bk and creates and writes the performance into the new <AppName>_SysInfo.Mon_Log file. The system retains only one backup copy of the monitor log files. The format of the report file is give below in Table 2:

TABLE 2

| Time | DiskUsage |
| --- | --- | where, Time represents the time stamp of the record in the log file; and DiskUsage represents the percentage of the file disk usage if STORAGE_TYPE=FLATFILE. Again, the data fields are delimited by a comma. It is noted that the database table space usage is generally not available to the application user, such that only the system administrator has the privilege to view it. As such, the monitor does not perform monitoring for the database table space usage.

Changes in the run-time monitor configuration are handled through the system configuration utility. The System Configuration Object contains an instance of Monitor Object which is initialized with the monitor configuration parameter values specified in the System Configuration file and saves them as configuration member data. When the user modifies the Monitor Configuration parameters at run time, typically be use of the deconfigset command, a signal is sent to the component which calls the method ReconfigParameters( ) on the System Configuration Object to re-initialize the parameters. This method, in turn, calls reconfigparameters( ) on the Monitor Object and updates the configuration member data. The monitor thread reads the configuration member data when it becomes active in the next time interval. As such, the monitor configuration parameters are modifiable at run-time.

In the system configuration file, the monitor uses the following parameters. To turn the monitor output ON or OFF, the MONITOR=ON/OFF parameter is used. The default is OFF. To turn the monitor output ON or OFF for the queue performance, the QUEUE_MONITOR=ON/OFF parameter is used. The default is OFF. To turn the monitor output ON or OFF for the system information, the SYSTEM_INFO_MONITOR=ON/OFF parameter is used. The default is OFF. To set the monitor poll interval in terms of seconds, the MONITOR_INTERVAL=XX (i.e., number of seconds) is used. The default interval is 600 seconds. The maximum and minimum poll intervals are predefined. The maximum size of the log file is set using the parameter MONITOR_LOG_FILE_SIZE=XXX (i.e., number of blocks). The default size is 1000 blocks. The name list of the system input queues is established using the SYSTEM_INPUT_QUEUE_NAMES=, *, *** parameter format, where the names are separated by commas. The default is empty. Also, the monitor gets the "DX_HOME" parameter from the system environment.

The Monitor Object is instantiated by the DX_SysConfigObject instance or by calling the static method DX_Monitor::Instance( ) directly. There is only one DX_Monitor thread running per executable component. The monitor thread is spawned whenever the MONITOR in the system configuration file is triggered to ON. The monitor thread exists until the MONITOR is triggered to OFF. The implementation of the monitor impacts three areas. The Queue Manager provides the queue performance data. The DX_SysConfigObject provides the configuration change handling and the monitor object instantiation. The DX_Monitor Object spawns or kills the monitor and generates the monitor log files or log table in the database. The methods added in the DX_Queue classes are listed below:

EXAMPLE #43

```
DX_QueueObject:
    Class DX_QueueObject {
        Private:
            long enQTimeStamp;
            long deQTimeStamp;
            ........
        Public:
            long GetObjectEnQTime( );
            Void SetObjectEnQTime(int time);
            long GetObjectDeQTime( );
            Void SetObjectDeQTime(int time);
            .......
    };
```

EXAMPLE #44

```
DX_Queue:
  Class DX_Queue {
    Public:
      ......
      virtual void GetQueuePerformance(long *pNumOfMsgProcessed,
                                       long *pAvgMsg-
                                            CacheTime,
                                       long *pAvgMsg-
                                            ProcessTime) = 0;
      virtual void Reset( ) = 0;
      ......
  };
  Class DX_FileQueue : public DX_Queue {
    Public:
      ......
      void GetQueuePerformance(long *pNumOfMsgProcessed,
                               long *pAvgMsg-
                                    CacheTime,
                               long *pAvgMsg-
                                    ProcessTime);
      void Reset( );
      ......
  };
  Class DX_FileSubQueue {
    Public:
      ......
      long GetNumOfMsgProcessed( );
      long GetTotalMsgCacheTime( );
      long GetTotalMsgProcessTime( );
      void Reset( );
    Private:
      ......
      long totalMsgCacheTime;
      long totalMsgProcessTime;
      long numOfMsgCommited;
      void SetDequeueTime(DX_QueueObject *qo);
```

```
          void SetEnQueueTime(DX_QueueObject *qo);
          void CompleteCommitCalculation(DX_QueueObject *qo);
     };
Class DX_DBQueue : DX_Queue {
  Public:
     ........
          void GetQueuePerformance(long *pNumOfMsgProcessed,
                                   long *pAvgMsg-
                                        CacheTime,
                                   long *pAvgMsg-
                                        ProcessTime );
          void Reset( );
     private:
     .......
          long *numOfMsgCommited;
          long *totalMsgCacheTime;
          long *totalMsgProcessTime;
          void SetDequeueTime(DX_QueueObject *qo);
          void SetEnqueueTime(DX_QueueObject *qo);
          void SetOrigEnqueueTime(DX_QueueObject *qo,
          const char* timeStr);
          static void CommitCalculations(DX_Queue
          Transaction &transaction);
          time_t ConvertStringDate(const char* timeStr);
     };
```

The data collecting mechanism is as follows: set the enqueue time stamp of the queue object when the message is enqueued; set the dequeue timestamp of the queue object when the message is dequeued; calculate the message cache time and the process time when the message is dequeue-committed from the queue successfully; and reset the totalMsgCacheTime, totalMsgProcessTime, numberOfMsgProcessed to zero upon request.

An additional method added in the DX-Queue classes is provided as follows:

EXAMPLE #45

```
DX_QueueManger:
     Class DX_QueueManger {
          Public:
               EreturnCodes GetQueuePerformance(char *inputQName,
                                                long *pNumOf-
                                                     MsgProcessed,
                                                long *pAvg-
                                                     MsgCacheTime,
                                                long *pAvg-
                                                     MsgProcess-
                                                     Time,
                                                bool reset-
                                                     Flag = true);
               void ResetAll(const char *qNameList);
               ........
     };
```

The methods added in DX_SysConfigObject are described below:

EXAMPLE #46

```
DX_SysConfigObject:
     Class DX_SysConfigObject {
          Public:
               .........
               static Boolean MonitorQueueIsOn( );
```

```
          Private:
               .......
               // Pointer to DX_Monitor instance
               DX_Monitor *pMonitor;
               // Method to instantiate DX_Monitor after DX_Sys-
               ConfigObject constructor
               void InitMonitor(const char *appName);
               // Get Monitor config parameters
               void GetMonitorParam(struct MonConfig-
                    Type * monConfig);
     }
```

It is noted that InitMonitor( ) instantiates the DX_Monitor instance, and ReconfigParameters( ) read the monitor configuration parameters or set the default configurations.

EXAMPLE #47

```
DX_Monitor:
     class DX_Monitor
     {
          friend class DX_SysConfigObject;
          public:
               static DX_Monitor* Instance(const MonConfigType &monConfig,
                                            const char *appName);
               DX_Monitor *GetInstance( );
          protected:
               void ReconfigParameters(const MonConfigType &monConfig);
               Boolean MonitorQueueIsOn( );
               // Can only be deleted by DX_SysConfigObject
               virtual~DX_Monitor( );
          private:
               DX_Monitor(const MonConfigType &mon-
               Config, const char *appName);
               static void* RunMonitor(void *Arg);
               void StartMonitorThread( );
               // set the monitor config parameters
               void SetConfigParams(const MonConfigType &monConfig);
               // write the queue performance into a log file
               void WriteToQueueLogFile(const char *inputQName,
                                        long *pNumOfMsgProcessed,
                                        long *pAvgMsgCacheTime,
                                        long *pAvgMsgProcessTime,
                                        const MonConfig-
                                             Type &curConfig,
                                        int numOfPriority);
               void GetNewLogTitleLine(char *titleLine, int numOfPriority);
               void GetLogEntryLine(char *logEntryLine,
               long *pNumOfMsg, long *pMsgCacheT,
                                    long *pMsgProcessT,
                                    int numOfPriority);
               void GetQueueInfo(const MonConfigType &curConfig);
               void GetSystemInfo(const MonConfigType &curConfig);
               void WriteToSysLogFile(float diskUsage,
                                      const MonConfigType &curConfig);
               // Data members
               static DX_Monitor* _instance;
               // lock for monitor config parameters
               DX_Mutex* MonConfigMutex;
               // monitor config parameters
               MonConfigType config;
               char appName[MAX_NAME_LEN];
               DX_QueueManager *pQMgr;
     };
```

Various utilities may be used to facilitate data exchange system administration and maintenance activities. These utilities include component shutdown, queue monitoring, queue viewing, and queue modification utilities. Descriptions and implementation examples of each of these utilities are provide below.

A shell/bat script DX_Shutdown is provided to shutdown individual components identified by the component name. DX_Shutdown needs to halt all the threads of execution gracefully before shutting down the component. The syntax of the DX_Shutdown script is DX_Shutdown <ComponentName><Pid>. An implementation example is provided as follows. DX_Shutdown script uses DX_ConfigSet to communicate with the component being shutdown. DX_ConfigSet can be used to raise a signal or event after adding a parameter to the config file to indicate that an instance of the particular component is to shut down gracefully. The configuration parameter used is DX_SHUTDOWN and its value is set to the PID of the instance to be shutdown.

As in the case of run-time configuration management, the ReconfigParameters( ) function on DX_SysConfigObject will be called. In this function, the DX_SysConfigObject first checks if the signal/event received corresponds to Shutdown and if the PID specified is its own PID. If so, it, in turn, must make sure that no new transactions are started, and waits for all of the current transactions to be completed. This involves calling the macro DX_SYSEXIT. It is noted that, before shutting down, the entry in the configuration file should be deleted by the exiting process. It is possible that the component aborts prior to cleaning up the configuration file. This stray entry does not effect the start up of any other component using the same configuration file. DX_ConfigSet is also responsible for clean up of stray DX_SHUTDOWN entries in the configuration file.

The queue monitoring administration and maintenance utility will now be described. The sequence of enqueue/dequeue operations performed on a Queue may be logged into a special audit file named <Queuename>.qlog (stored in directory $(DX_HOME)/DX_Qlog) specified by environment variable DX_QLOG. The audit logging can be switched ON or OFF at run time using DX_QMonitor utility. The syntax for this utility is DX_QMonitor <QueueName><ON/OFF>. An example of the queue monitoring utility is given as follows.

The DX_Qlog directory stores a registration file for every Queue in the system (<Queuename>.reg). This file stores the information whether audit logging for a particular queue is ON or OFF (i.e., 1 or 0). It also stores the list of Components and their PIDs that are currently using the Queue. This information is used by the DX_Qmonitor to determine which components are to be informed when the audit logging status of the queue is changed.

Every instance of a component instantiates a DX_QueueLogMgr object. When the instance wants to access a particular queue for the first time, which may be a new 5 or an existing queue, the DX_QueueLogMgr looks up the registration file for the queue in DX_Qlog directory to determine the audit logging status and also writes its name and PID into the registration file. It is noted that DX_QueueLogMgr creates a registration file for a queue in case it does not exist. The default value for Qmonitor status is OFF(i.e., 0).

The DX_QMonitor utility informs the change in the audit logging status of a queue to all the processes using the Queue by updating the registration file and raising an event/signal to inform all the components to update their DX_QueueLogMgr objects. This command is also responsible for cleaning up entries in the registration file corresponding to components that died without cleaning up the registration file. Whenever an Enqueue or Dequeue operation is committed, a check is made on the DX_QueueLogMgr to see if audit logging is ON or OFF and information is logged in case it is ON. When an instance is terminating, the destructor of DX_QueueLogMgr should update all the registration files in which it has created an entry. An implementation example is provided as follows:

EXAMPLE #48

```
class: DX_QueueLogMgr
{
public:
    // create an instance of the object by calling the constructor
    // delete using DeleteInstance( )
    static DX_QueueLogMgr* Instance(char* ComponentName=0);
    // delete the object
    static void DeleteInstance( );
    // Checks if the QueueStatusList has an entry
    // for the particular queue and if so checks
    // if the entry indicates whether the
    // queue monitoring is on or off and logs the
    // QueueObject accordingly
    static void DumpQLog(EQueueOperation op,
                char* queueName,
                DX_QueueObject* qo);
    // if you want to monitor a queue, an entry in
    // the queue status list should be created first
    // by giving the queue name and the pid. The function
    // reads the .reg file and initializes the entry
    // accordingly.
    EreturnCodes InsertQueueStatusList(char* QName, int pid);
    // if queue monitor changed the queue registration file, reset the
    // object, read the reg file and update the queueStatusList;
    EreturnCodes ReconfigQueueStatusList( );
private:
    DX_Mutex* listLock;
    static DX_QueueLogMgr* instance;
    char ComponentName[MAX_NAME_LEN];
    char QlogDir[MAX_FILE_NAME];
    DX_QueueLogMgr(char* inComponentName=0,char* qlogdir=0);
    virtual~DX_QueueLogMgr( );
```

-continued

```
        EreturnCodes DeleteFromRegFiles(char* ComponentName,int pid);
        DX_INDICATOR GetStatusFromRegFile(char* regFileName, int& regFileExists);
        char* GetQRegFileName(char* QName);
        EreturnCodes FindQueueLogStatusInfo(char* inQName,
                                        DX_QueueLogStatusInfo** copy);
        RWDlistCollectables *queueStatusList;
};
class DX_QueueLogStatusInfo: public RWCollectable
{
        friend class DX_QueueLogMgr;
private:
        char qName[MAX_NAME_LEN];
        DX_INDICATOR qLogStatus;
        char qLogFileName[MAX_FILE_NAME];
        RWDECLARE_COLLECTABLE(DX_QueueLogStatusInfo);
        DX_QueueLogStatusInfo( ){ };
        // During construction if inQLogStatus is ON
        // open the logStream for QName.qlog in directory DX_HOME/DX_QLOG
        DX_QueueLogStatusInfo(char* inQName,
                                        DX_INDICATOR inQLogStatus,
                                        char* qlogdir);
        // close all the streams which are open
        ~DX_QueueLogStatusInfo( );
        char* GetQName( );
        DX_INDICATOR GetQLogStatus( );
        char* GetQLogFileName( );
        // if set to on, open stream, if set to off close the stream
        EreturnCodes SetQLogStatus(DX_INDICATOR inStat);
};
#define DX_QLOG(QueueOp,QueueName,qo)        DX_QueueLogMgr::\
                                        DumpQLog(QueueOp,QueueName,qo);
```

The queue viewing administration and maintenance utility will now be described. DX_Qview <queue_name> [priority] permits viewing of all items in a Queue identified by its name. This information may be obtained using the GetQueueView( ) method on DX_QueueManager object. DX_GetCO <oidval> permits viewing of the common object for a particular OID in the queue. This utility uses the Demarshal( ) method provided in DX_CommonObject class. Other viewing options include the following: viewing the queue entry corresponding to common object specified by its name or OID; viewing all queue entries enqueued by a particular source; viewing all queue entries having a particular status; and viewing the names of all objects in the queue.

Modifying the contents of Queues involves the DX_QMove utility which provides for the following: Dequeuing of an entry from the queue identified by the OID of the common object; and Enqueuing the entry to another queue. The syntax for this utility is DX_QMove Source_Queue Destination_Queue OID.

Concerning data exchange system security, the basic security control is focused on the queue files access or the database tables access. The file access control requires the application user to be in a specific user group. The user group should be set before the application runs. The database table access control requires the application users to have the correct user name and user password. The user name and user password may be set in the environment variables or be hard coded in the application programs. In one embodiment, all applications share one database user account. This user account has privileges to create/update/delete tables in the view.

As was previously discussed in connection with FIG. 9, the Processing Thread Pool is a pool of native system threads whose maximum number is externally controlled. The function of the Processing Thread Pool is to provide a run-time configurable thread of control for the data exchange system application. The thread controller will also provide a request FIFO (First-In-First-Out buffer) that will buffer threaded operations when all threads are in use, and process these requests as system resources are made available. The thread controller's resources are configurable at run-time through the system administration.

The thread controller is implemented as DX_ThreadController, which is automatically initialized by the DX_SysConfigObject. It may alternatively be used in a standalone mode as well. The DX_ThreadController operations will wrap the platform specific thread package operations, making them invisible to the user. Use of the DX_ThreadController does not preclude a developer from using native thread package calls.

The DX_ThreadController is implemented as a singleton object which makes system tuning and performance management an easier task. The DX_ThreadController is instantiated by the DX_SysConfigObject at startup. All parameters used by the DX_ThreadController are configurable at runtime via the DX_ConfigSet tool, with any changes being applied to the next thread created following the configuration change.

A macro called DX_Thread_Execute( ) is provided for ease of use. This macro retrieves the DX_ThreadController instance from the DX_SysConfigObject and then invokes the DX_ThreadController::Execute( ) method. The method DX_ThreadController::Execute( ) behaves exactly the same as if a call was invoked to create a new thread. A pointer must be passed to the function and as well as a pointer to the arguments. Internally, the DX_ThreadController uses the class DX_ThreadRequest when a thread is not available to provide a FIFO buffer that will store the function pointer and argument pointer. Each time a thread completes execution, the FIFO is checked for the presence of entries. If there are entries in the FIFO, the first entry in the buffer is removed and executed. An example of DX_ThreadController implementation is provided in the following example:

EXAMPLE #49

```
class: DX_ThreadController
{
    friend class DX_SysConfigObject;
public:
    static DX_ThreadController* Instance( );
    virtual ~DX_ThreadController( );
    EreturnCodes Execute(void* (* functionPtr)(void*), void* args);
};
class DX_ThreadRequest : public RWCollectable
{
    friend class DX_ThreadController;
private:
    DX_ThreadRequest(void *(*functionPtr)(void *), void *args);
    virtual ~DX_ThreadRequest( );
    // data members
    void* function;
    void* args;
};
```

A DX_Utils library provides the DX_Mutex class for platform independent mutex protection, an example of which is provided below. The DX_Mutex class does not require use of the DX_ThreadController class.

EXAMPLE #50

```
class: DX_Mutex
{
public:
    DX_Mutex(const char* name);
    virtual ~DX_Mutex( );
    int lock( );
    int unlock( );
private:
    char* Name;
};
```

For purposes of data internationalization, Unicode UTF-8 formatting is provided to store all attribute value strings using wide character strings. Code conversion functions to convert a Unicode string to UTF-8 string and vice-versa are also provided. These conversion methods are used to store any user-specified data internally in UTF-8 format. To support language localization, all message strings use an external message catalog. The interface provided by the DX_CodeConversion class is as follows:

EXAMPLE #51

```
class: DX_CodeConversion
{
    typedef struct {
        int     cmask;
        int     cval;
        int     shift;
        long    lmask;
        long    lval;
    } Tab;
public:
    // memory for out is allocated by the func
    // and needs to be deallocated by the caller
    // the return value is the length of the unichar
    // string(number of unichars) or −1 if the
    // conversion failed
    static int ConvertUTF8ToUCS(const char *in,
```

-continued

```
                                 UNICHAR* &out);
    // memory for out is allocated by the func
    // and needs to be deallocated by the caller
    // the return value is the length of the utf8 string
    // and −1 if the conversion failed
    static int ConvertUCSToUTF8(const UNICHAR *in,
                                 char* &out);
private:
    static Tab tab[ ];
    static int MBToWC(UNICHAR *p, const char *s, size_t n);
    static int WCToMB(char *s, UNICHAR wc);
    // In the code-conversion functions it is assumed
    // that the memory
    // for the in , out strings are
    // out_len are allocated before the function is called.
// out should be size of(UNICHAR)*(strlen(in)+1)) bytes long
    static int PvtConvertUTF8ToUCS(const char * in,
                                    const int in_len,
                                    UNICHAR *out,
                                    int *out_len);
    // out should be (UCSStrlen(in)*4 +1 ) bytes long
    static int PvtConvertUCSToUTF8(const UNICHAR *in,
                                    const int in_len
                                    char *out,
                                    int *out_len);
};
```

A skeleton main( ) function is provided to illustrate the system initialization and startup procedures required for each component of the data exchange system application. This includes operations such as database connection, system resource configuration, thread control, etc. In addition, a System Health Monitor thread is provided which, on a timed interval, polls all system resources to ensure that system operation can continue. This thread invokes the system checking operations System Configuration Object. The sample code provided below illustrates the ease of initializing system components and application operations. This sample is part of the DX_Engine executable, which serves as the core of the data exchange system.

EXAMPLE #52

```
#define COMPONENT_NAME "DX_Engine"
void* ProcessInputQueues(void* args);
int main(int argc, char* argv[ ])
{
    // Initialize the SysConfig object and all system resources
    DX_SYSINIT(COMPONENT_NAME);
    void **params;
    params = (void**)malloc(2 * sizeof(long));
    int DQthreads = atoi(DX_SysConfigObject::Instance( )-
>FindValue("DEQUEUE_THREADS"));
    // Start threads for dequeuing input requests
    for (int i=0; i<DQthreads; i++)
    {
        DX_QueueManager* QueueMgr = DX_Queue-
        Manager::GetInstance( );
        DX_QueueTransaction* Trans = new DX_Queue-
        Transaction(QueueMgr);
        params[0] = QueueMgr;
        params[1] = Trans;
        DX_Thread_Execute(ProcessInputQueues,params);
    }
    free(params);
    while(1)
    {
        // loop so app doesn't exit
        // sleep or do something else
    }
    DX_SYSEXIT;
```

```
        return 0;
}
```

A set of libraries that cooperate in tandem provide for basic request routing. The DX_Rules library is a dynamic shared library that serves to provide a stub API for application developers. The DX_Engine executable makes use of both the DX_Rules and DX_Route libraries. When custom rules and routing logic for an application have been designed and implemented, the DX_Rules library should be replaced with the new custom library using the API defined in "DX_RulesAPI.h". The DX_Rules( ) method is automatically invoked from within DX_Route( ). The DX_Rules API is defined as EreturnCodes DX_Rules (void* args).

The DX_Route library serves two primary purposes. Its first job is to invoke any customized rule and routing implementation by calling the DX_Rules( ) function in the following manner:

EXAMPLE #53

```
EreturnCodes DX_Route (void* args)
    {
        DX_TL(DX_ARGS,SYS_INFO, "Entering
        DX_Route(void* args)");
        void **params;
        params = (void**)args;
        DX_CommonObject* PcommonObj = (DX_Common-
        Object*)params[0];
        DX_QueueManager* Qmgr = (DX_Queue-
        Manager*)params[1];
        DX_QueueTransaction* T = (DX_Queue-
        Transaction*)params[2];
        if (PcommonObj)
        {
            if(DX_Rules(args) == NOT_FOUND)
            {
                // No rules implemented, so do default routing
                if (DX_Default_Route(args) == SUCCESS)
                    return SUCCESS;
                else
                    return FAILED;
            }
        }
        DX_TL(DX_ARGS,SYS_INFO, "Returning
        from DX_Route(void* args)");
        return SUCCESS;
    }
```

The DX_Route library also provides a mechanism for default request routing, where requests that do not require any special business rule processing may automatically be routed to one or more output queues. The DX_Default_Route( ) function is automatically invoked when DX_Rules( ) returns "NOT_FOUND", which is what the stub API returns. The DX_Route( ) function is invoked in the following manner:

EXAMPLE #54

```
DX_QueueManager* Qmgr = DX_QueueManager::GetInstance( );
DX_QueueTransaction* T = new DX_QueueTransaction(Qmgr);
T->Begin( );
```

```
if (Qmgr->Dequeue("DX_SYSTEM_IN", PnewCO, *T) ==
SUCCESS)
{
    if (PnewCO)
    {
        void **params;
        params = (void**)malloc(3 * sizeof(long));
        params[0] = PnewCO;
        params[1] = Qmgr;
        params[2] = T;
        if(DX_Route(params) == SUCCESS)
            T->Commit( );
        else
            T->Rollback( );
        free(params);
    }
    else
        T-Rollback( );
}
```

The default routing information is contained in an ASCII file that is specified in each application's configuration file using the parameter "ROUTE_TABLE=path/filename". The file containing the default routing information pointed to by the "ROUTE_TABLE" variable will contain the request name and one or more output queues. A maximum of 1024 different messages may be defined with a maximum of 255 different outputs per request. The following exemplifies a sample default routing table:

EXAMPLE #55

```
%%%%%%%%%%%%%%%%%%%%%%%%%%%%%%%%%
% This file contains the default routing
% information to Dequeue an incoming object,
% identify it and then send it to an output
% queue.
%
% The entries should be stored in the following manner:
%
% ObjectName>output queue,...,...,...
%
% The default routing limits are:
% 1024 ObjectNames
% 255 output queues per entry
%%%%%%%%%%%%%%%%%%%%%%%%%%%%%%%%%
```

CustomerOrder>OrderSystem, MarketingRecord, Service
CancelService>CustomerRecords
ProblemReport>Service A further description of a data exchange system queuing methodology in accordance with one embodiment of the present invention will now be described. In order to provide a clean "buffered API," a queued request approach is used. Use of interface queues allows the caller of the API to send its request irrespective of whether the engine core and another outgoing adapter are running. The queue interface approach of the instant embodiment also provides a mechanism for buffering the load that may be placed upon a server from multiple clients. It also provides the ability to scale the number of database servers that can process any given queue in parallel.

As was discussed previously, two types of priority based queues are used, namely, the incoming Receive Queues and the outgoing Send Queues. Each outgoing adapter will have its own outgoing queue so that any interface specific translation or routing may be performed outside the engine core. Each instance of the DX_Engine executable has one or more input queues, although only one is allowed for file-based queues, and one or more output queues. An instance of the DX_QueueManager class is used as a central proxy to all queue access, and will be mutex protected and record-lock protected, for file-based implementation, or row lock protected, for database implementations, to prevent data contention.

Two types of queues are provided, file and database queues, both of which are fairly simple implementations that allow for a clean breakup to the API. Priority based queuing is provided so that requests of high importance can be serviced quickly. Multiple queues are used to provide this level of functionality, but the implementation is logically transparent to users. A user perceives that there is only one logic queue with objects of different priority in it.

The file storage or database tables for the queue are created at running time and deleted by queue administration process. There are four types of pre-defined priority: NON-URGENT; NORMAL; URGENT; and INTERACTIVE in order of increasing priority. INTERACTIVE is the highest priority, which can block any request having other priorities. The priority algorithm ensures that the Dequeue operation always returns successfully when the queue is not empty, prevents starvation of lower priority entries, and ensures more frequent visits on higher priority queues. The priority algorithm is implemented on a weighted basis of each priority.

Support for parallel gateways is only available to a database queue implementation. File-based queue implementations will not guarantee single delivery, i.e., one object might be dequeued by multiple process at the same time. All parallel access should be completely transparent to any participating gateway. The only areas of common resources between any parallel gateways are the Enqueue and Dequeue operations. The design of the Enqueue/Dequeue module ensures that parallel access is made possible without any deadlocks or duplicated queue entries by using the database supplied row-level locking.

Since the external API is limited to the Enqueue/Dequeue API, the only limit to multiple access is the row-level table locking that the database supports. The file based queue mechanism uses simple file record-lock to protect from multiple updates to the file from multiple threads. The queue access operations for file-based implementation are thread-safe, such that all the operations are mutex protected.

The Queue Manager public interface makes use of the DX_QueueTransaction object for transaction control. The Enqueue( ), Dequeue( ), Commit( ), and Rollback( ) methods take pass-in argument of an instance of the DX_QueueTransaction class which belongs to a running thread. The transaction object contains an ordered list of operations performed in this transaction. For file-based implementations, all operations are maintained in buffered memory and are not written into file storage until commit time. For database implementations, the database provided rollback mechanism is employed, with each transaction using its own unique run-time database context.

Figure 18:
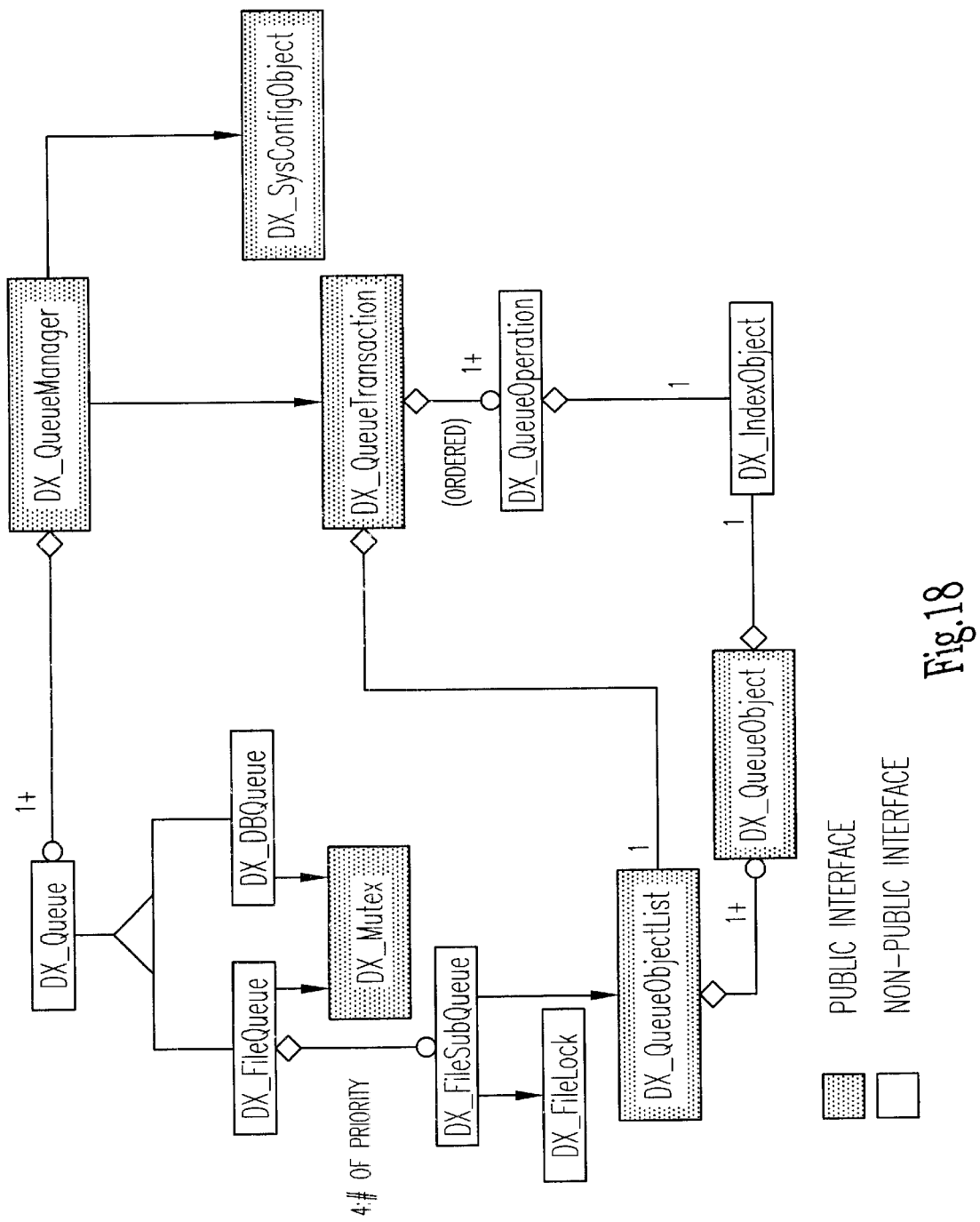
FIG. 18 is a class structure diagram showing public and non-public interfaces associated with various file based and database based queuing processes.
Figure 19:
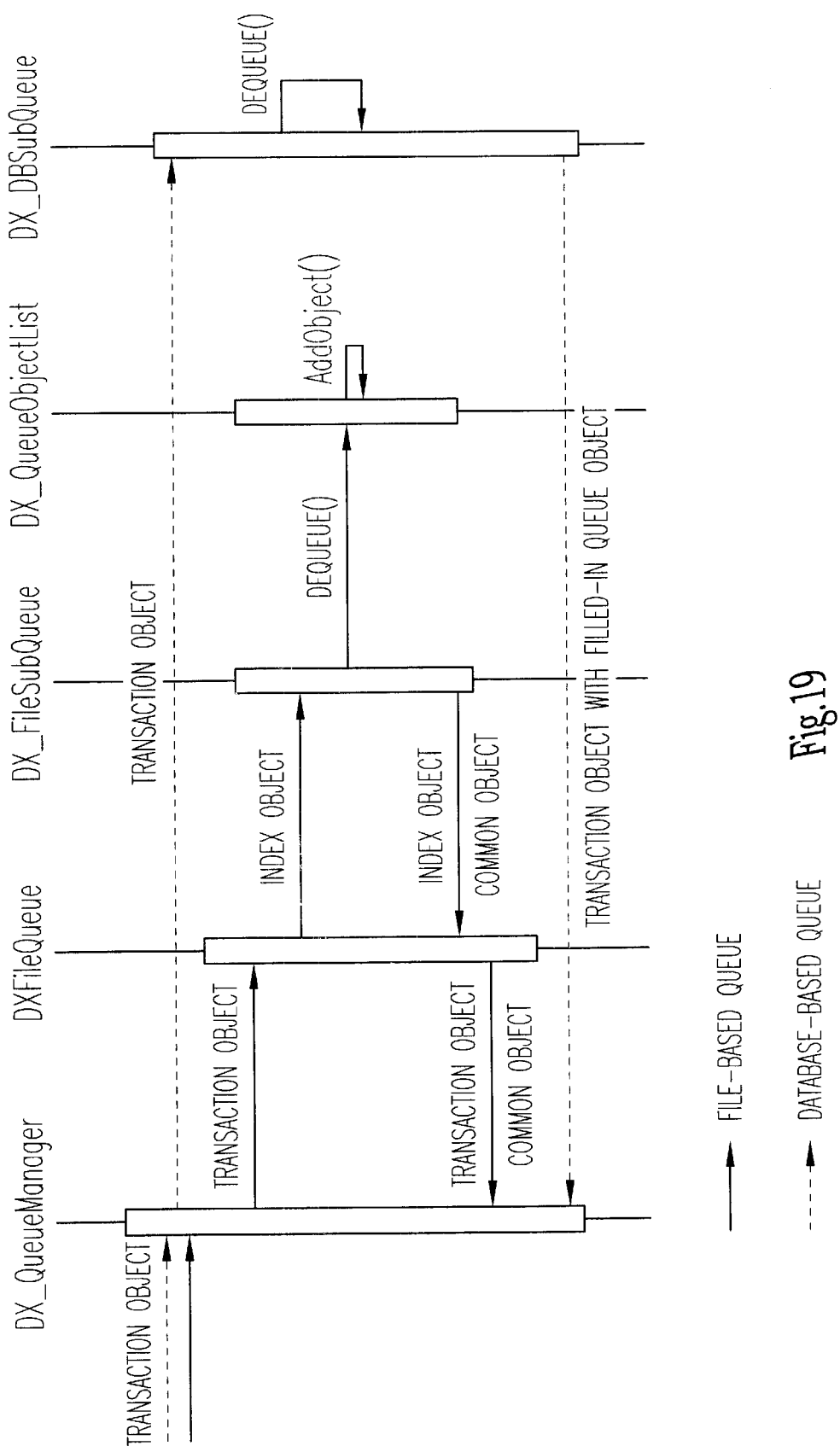
FIG. 19 is a pictorial description of the calling structure between data exchange queue classes when dequeueing a Common Object in accordance with one embodiment of the present invention.
Figure 20:
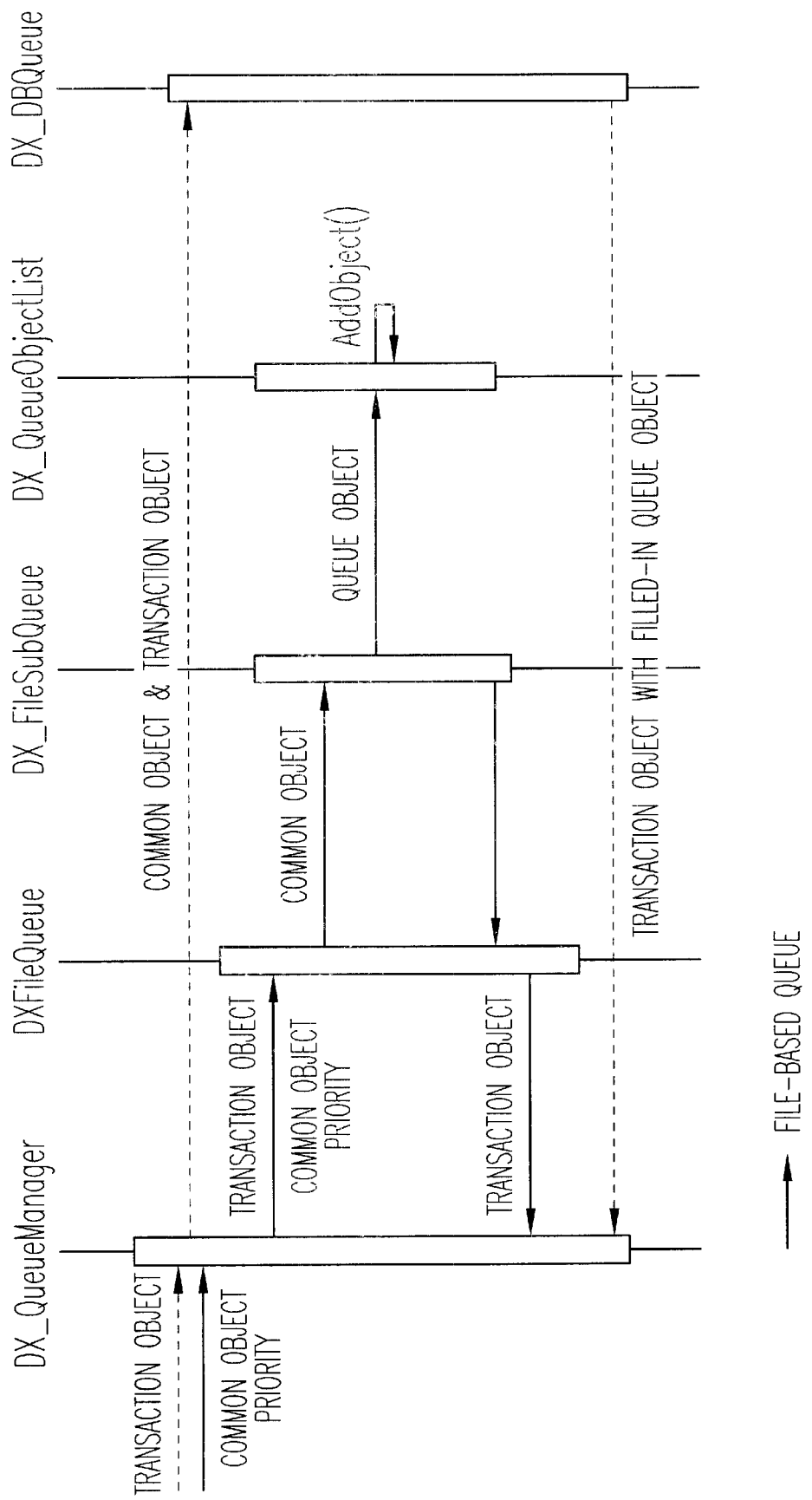
FIG. 20 is a pictorial description of the calling structure between data exchange queue classes when enqueueing a Common Object in accordance with the embodiment of FIG. 19.

The class structure diagram is shown in FIG. 18. The public interface, shown in shaded boxes, is used by adapter developers, but the non-public interface, shown without shading, is intended for internal use only. This usage restriction is forcefully implemented.

The following system constants, which are defined in DX_Defs.h, are used by the queuing system.

EXAMPLE #56

```
enum EstorageTypes
{
    FLATFILE = 0,
    DATABASE
};
enum EQueueOperation
{
    ENQUEUE = 0,
    DEQUEUE
};
static const int NUM_PRIORITIES = 4;
enum EPriorityCode
{
    NONURGENT = 0,
    NORMAL,
    URGENT,
    INTERACTIVE
};
```

The DX_QueueManager class is a singleton class and acts as the global access point of all queue operations. It contains a list of queues, instances of DX_Queue class, as its data member. Users, however, do not need to create a queue with Queue Manager before using it. The creation of the queue is embedded in Enqueue and Dequeue operations. Besides the Enqueue ( ) and Dequeue ( ) operations, DX_QueueManager also defines interfaces for extended transaction support, performance monitoring, and queue administration. An illustrative example of DX_QueueManager implementation is provided as follows:

EXAMPLE #57

```
class: DX_QueueManager
{
    friend class DX_QueueTransaction;
    friend class DX_DBQueue;
    friend class DX_Monitor;
public:
    static DX_QueueManager* Instance(const char* ProcessName, EstorageTypes type);
    static void DeleteInstance( );
    static DX_QueueManager* GetInstance( );
    /****************************************************************/
    //Queue operation interface
    /****************************************************************/
    /****************************************************************/
    //The label and comment arguments will be used for Queue Administration Purpose.
    //So queue administration GUI will also see the name and comment of each CO in
```

-continued

```
    the
    //queue. They can be type of UTF-8 encoded string, 7-bit ASCII string or wide
string.
    //User should not delete pointer to DX_CommonObject after call Enqueue
    /***************************************************************/
    EreturnCodes Enqueue(const char* qName, DX_CommonObject &co,
            DX_QueueTransaction &transaction, const char* oLabel,
            const char* comment, EPriorityCode priority =
        NORMAL);
    EreturnCodes Enqueue(const char* qName, DX_CommonObject &co,
            DX_QueueTransaction &transaction, const UNICHAR*
        oLabel,
            const UNICHAR* comment, EPriorityCode priority =
        NORMAL);
    /***************************************************************/
    //Caller should free non-NULL pointer to DX_CommonObject
    //Return SUCCESS if Dequeue returned a common object
    //Return FAILED if Dequeue returned a NULL common object pointer
    /***************************************************************/
    EreturnCodes Dequeue(const char* qName, DX_CommonObject* &CO
            DX_QueueTransaction &transaction);
    EreturnCodes Dequeue(const char* qName, const char* objID, const char*
objLabel,
            DX_CommonObject* &co, DX_QueueTransaction
        &transaction);
    /***************************************************************/
    //The caller of GetCursor is responsible for deleting
    //returned DX_IndexObject* pointer.
    /***************************************************************/
    DX_IndexObject* GetCursor(const char* qName, EPriorityCode priority =
INTERACTIVE);
    /***************************************************************/
    //Will set the cursor to the EPriorityCode passed in
    /***************************************************************/
    EreturnCodes ResetCursor(DX_IndexObject &cursor,
            EPriorityCode priority = INTERACTIVE);
    /***************************************************************/
    //There always is a non-null DX_QueueList returned
    //Caller should delete DX_QueueObjectList returned
    //
    //NOTE: DX_QueueList may be empty if no entries were found
    //
    //USAGE:
    //GetQueueView(DX_QueueObjectList* &list DX_IndexObject &QViewCursor,
    //            int size = 0)
    //will return #entries =< size for EPriorityCode of QViewCursor and ALL lower
priorities
    //
    //GetQueueView(DX_QueueObjectList* &list, EPriorityCode priority,
    //            DX_IndexObject &QViewCursor, int size = 0)
    //will return #entries =< size for EPriorityCode of priority, QViewCursor is
updated to
    //reflect position of last retrieved entry.
    /***************************************************************/
    EreturnCodes GetQueueView(DX_QueueObjectList* &list,
            DX_IndexObject &QViewCursor, int size = 0;
    EreturnCodes GetQueueView(DX_QueueObjectList* &list, EPriorityCode priority,
            DX_IndexObject &QViewCursor, int size = 0);
    /***************************************************************/
    //Caller should free char** returned twice
    /***************************************************************/
    char** GetManagedQueueNames(int& number);
    char** GetAllQueueNames(int& number);
private:
    static DX_QueueManager* instance;
    char* owner;
    EstorageTypes Implementation;
    char* FileDBDirectory;
    RWGDlist(DX_Queue) QueueList;
    DX_Mutex* mutex;
    DX_QueueManager(const char* processID, EstorageTypes type, const char*
FileDBDir);
    ~DX_QueueManager( );
    //Extended transaction support interface
    EreturnCodes Commit(DX_QueueTransaction &transaction);
    EreturnCodes Rollback(DX_QueueTransaction &transaction);
    //Queue administration interface
    EreturnCodes DeleteQueue(const char* qName);
    EreturnCodes FlushQueue(const char* qName);
```

-continued

```
    EreturnCodes FlushQueue(const char* qName, EPriorityCode priority);
    EreturnCodes RemoveFromQueue(DX_QueueObject *object);
    //Performance monitor interface
    //the memory of pNumOfMsgProcessed, pAvgMsgCacheTime,
pAvgMsgProcessTime
        //should be allocated before invoking this method.
    EreturnCodes GetQueuePerformance(char * inputQName, long
*pNumOfMsgProcessed,
                double *pAvgMsgCacheTime,
                double *pAvgMsgProcessTime,
                DX_Boolean resetFlag = TRUE);
    void ResetAll(const char *qNameList);
    EreturnCodes GetDBTableSpaceUsage(float &usage);
    //Internal use
    DX_Queue* FindQueue(const char* qName);
    DX_Queue* CreateQueue(const char* qName);
};
```

The ownership of the pointer of a Common Object is transferred to DX_QueueManager after invoking the Enqueue( ) method and transferred to the caller process after invoking Dequeue( ) method. GetQueueView ( ) obtains a snap-shot of a given queue. It has two options: it either gets the snap-shot of the entire queue or only the snap-shot on the queue of a given priority. Since it can be invoked repeatedly to get the snap-shot of a queue page by page, a cursor must be defined to record the position of queue in order to get the snap shot. Before calling GetQueueView( ), the caller must call GetCursor( ) to get the cursor first. The appropriate usage is "GetCursor (QueueName)" to get a cursor for the entire queue. Calling GetCursor (QueueName, Priority) will initialize a cursor for the queue entries of a given priority.

If the user does not pass in the size argument of GetQueueView( ), the snap-shot of the entire queue will be returned. When the size is passed in, it will be used to limit the number of entries returned. In this case, a user may call GetQueueView( ) repeatedly to get the next size controlled block of entries until the list returned is empty list. A user may invoke Reset( ) to reset the cursor the beginning of the queue.

DX_Queue is an abstract interface class. It only provides an interface for Enqueue/Dequeue operations and Commit/Rollback operations. An implementation example is given as follows:

EXAMPLE #58

```
class: DX_Queue
{
    friend class DX_QueueManager;
    friend DX_Boolean IsQueueEqual(const DX_Queue* queue, const void* value);
    protected:
        virtual ~ DX_Queue( );
        virtual EreturnCodes Enqueue(DX_CommonObject& co, const char* ProcessId,
    const char* label, const char* comment, DX_QueueTransaction& transact, EPriorityCode
    pCode) = 0;
        virtual DX_CommonObject* Dequeue(DX_QueueTransaction& transact) = 0;
        virtual DX_CommonObject* Dequeue(DX_QueueTransaction& transact, const
    char* ObjectID, const char* ObjectLabel) = 0;
        //Only DX_FileQueue need to implemented the following two methods
        virtual EreturnCodes Commit(DX_QueueOperation& oper) {return FAILED;}
        virtual EreturnCodes CompleteCommit(DX_QueueOperation& oper) {return
    FAILED;}
        virtual EreturnCodes Rollback(DX_QueueOperation& oper) {return FAILED;}
        const char* GetQueueName( ) const;
        virtual EreturnCodes DestroyStorage( ) = 0;
        virtual EreturnCodes Flush(EPriorityCode priority) = 0;
        virtual EreturnCodes RemoveObject(DX_QueueObject* qObj) = 0;
        virtual EreturnCodes GotoBeginning(EPriorityCode priority, DX_IndexObject
    &cursor) = 0;
        virtual EreturnCodes GetQueueView(EPriorityCode priority, DX_IndexObject
    &cursor,
                DX_QueueObjectList* &list, int size) = 0;
        //performance monitor
        virtual void GetQueuePerformance(long *pNumObjectProcessed,
                double *pAvgMsgCacheTime,
                double *pAvgMsgProcessTime ) = 0;
        virtual void Reset( ) = 0;
        //We should not have instance of this class
        DX_Queue(const char* qName);
        in line void SetWeightRootsAndVisitedFlags( )
        {
            roots[NONURGENT] = 0.0f;
            roots[NORMAL] = 0.6f;
```

-continued

```
        roots[URGENT] = 0.8f;
        roots[INTERACTIVE] = 1.0f; //will always block other priorities
        VisitedFlags[NONURGENT] = 0x01;
        VisitedFlags[NORMAL] = 0x02;
        VisitedFlags[URGENT] = 0x04;
        VisitedFlags[INTERACTIVE] = 0x08;
    }
    //Because these members should be seen by the derived classes,
    //we keep them as protected.
    float roots[NUM_PRIORITIES];
    unsigned char VisitedFlags[NUM_PRIORITIES];
    float weights[NUM_PRIORITIES];
    char *QueueName;
};
```

DX_FileQueue class contains four child queues for each priority. Besides the queue operation interface and transaction interface, the algorithm of priority handling is also implemented in this class. The priority algorithm is implemented inside the Dequeue method. The DX_IndexObject argument of the Dequeue methods is used for transaction control. At running time, Dequeue operations fill in corresponding fields in DX_IndexObject, which is a component of DX_QueueOperation object. An implementation example is given as follows:

EXAMPLE #59

DX_FileSubQueue is mapped to a set of files of one queue of one priority. The internal DX_QueueObjectList object acts as a buffer at running time. All the operations will not be written into files until commit or rollback time.

Each queue is stored into two categories of files. Each Common Object will be stored as a single file, named by its OID. These files will be evenly distributed, on the modula of 256, into different sub-directories for purposes of even file distribution and performance. These files are generated when the object is serialized. The index of each Common Object is stored in a series of indexed files, indexed from 0 to 9999, which is the physical and persistent storage for the

```
class: DX_FileQueue : public DX_Queue
{
    friend class DX_QueueManager;
    private:
        DX_FileQueue(const char* qName, const char* FileDBDir);
        ~DX_FileQueue( );
        EreturnCodes Enqueue(DX_CommonObject& co, const char* ProcessId,
                const char* label, const char* comment,
                DX_QueueTransaction& transact, EPriorityCode pCode);
        DX_CommonObject* Dequeue(DX_QueueTransaction& transact);
        DX_CommonObject* Dequeue(DX_QueueTransaction& transact,
                const char* ObjectID, const char* ObjectLabel);
        EreturnCodes Commit(DX_QueueOperation& oper);
        EreturnCodes CompleteCommit(DX_QueueOperation& oper);
        EreturnCodes Rollback(DX_QueueOperation& oper);
        EreturnCodes DestroyStorage( );
        EreturnCodes Flush(EPriorityCode priority);
        EreturnCodes RemoveObject(DX_QueueObject* qObj);
        EreturnCodes GotoBeginning(EPriorityCode priority, DX_IndexObject &cursor);
        EreturnCodes GetQueueView(EPriorityCode priority, DX_IndexObject &cursor,
                DX_QueueObjectList* &list, int size);
        //used for the performance monitor
        void GetQueuePerformance(long *numOfMsgProcessed, double
    *avgMsgCacheTime,
                double *avgMsgProcessTime);
        void Reset( );
    private:
        DX_FileSubQueue* subqueues[NUM_PRIORITIES];
        DX_Mutex* WeightMutex;
        DX_Mutex* SubQueueMutex[NUM_PRIORITIES];
};
```

The dequeuing interface, as previously discussed, uses a weight based priority algorithm. This ensures that the highest priority messages are handled in a timely manner and low priority messages are not starved. Each priority level has its own base weight. Each time a priority queue is visited, the weight of the other priorities is increased by 0.1. If the weight of any priority reaches 1.0, it is then processed. The base weight of the interactive priority is 1.0, so it will always be visited first, thus it can block all the other priorities.

logic queue. Each file may contain up to 100 index records. The order of the index record is defined by the offset of that record to the beginning of the file.

A logical dequeue cursor is also defined and manipulated in this class. For purposes of performance, this cursor should never be rolled back. This feature is also implemented via the help of DX_QueueObjectList class as well.

The enqueue operation appends a record at the end of the newest file. The dequeue operation attempts to find a valid record from the internal memory buffer. If one is not found, the dequeue operation will then read one index object from file into the memory buffer. A status field is used to determine the validity of the record. An object can be marked as follows: NEW_OBJECT (object is enqueued but not committed yet); ENQUEUED_OBJECT (object is enqueued and committed); NORMAL_OBJECT (valid object in the queue storage or a the object was rolled back in the memory buffer); ACTIVE_OBJECT (object is read from file into memory buffer and being processed); or DELETED_OBJECT (object has been processed after it is dequeued or it was marked as so in the file). The object in the file storage will only be labeled DELETED_OBJECT after the transaction is committed. An implementation example is given as follows:

EXAMPLE #60

```
class: DX_FileSubQueue
{
    friend class DX_FileQueue;
    friend class DX_QueueManager;
    private:
        DX_FileSubQueue(const char* qName, EPriorityCode pCode, const char*
    FileDBDir);
        ~DX_FileSubQueue( );
        EreturnCodes Enqueue(DX_CommonObject& co, const char* ProcessId,
                const char* label, const char* comment);
        DX_CommonObject* Dequeue(DX_IndexObject& io);
        DX_CommonObject* Dequeue(DX_IndexObject& io, const char* ObjectID,
                const char* ObjectLabel);
        EreturnCodes Commit(DX_QueueOperation& oper);
        EreturnCodes CompleteCommit(DX_QueueOperation& oper);
        EreturnCodes Rollback(DX_QueueOperation& oper);
        EreturnCodes DestroyStorage( );
        EreturnCodes Flush( );
        EreturnCodes RemoveObject(DX_QueueObject* qObj);
        EreturnCodes GotoBeginning(DX_IndexObject& cursor);
        EreturnCodes GetQueueView(DX_IndexObject &cursor, DX_QueueObjectList*
    &list,
                int size);
        //used by the performance monitor
        long GetNumOfMsgProcessed( );
        double GetTotalMsgCacheTime( );
        double GetTotalMsgProcessTime( );
        void Reset( );
    private:
        char* QueueName;
        EPriorityCode Priority;
        char* QueueFileName;
        char* IndexDirectory;
        int startFileIndex;
        int endFileIndex;
        //These two fields are used for Dequeue operation and always go forward
        int currentFileIndex;
        int currentRecordIndex;
        int lastRecordIndex;
        DX_QueueObjectList BufferList;
        /////////////////////////
        //Internal use only
        /////////////////////////
        EreturnCodes EnqueueCommit(DX_QueueOperation &oper);
        EreturnCodes DequeueCommit(const char* oid, const DX_IndexObject* io);
        EreturnCodes CompleteEnqueueCommit(DX_QueueOperation &oper);
        EreturnCodes CompleteDequeueCommit(const char* oid, const DX_IndexObject*
    io);
        EreturnCodes EnqueueRollback(const char* oid, const DX_IndexObject* io);
        EreturnCodes DequeueRollback(const char* oid, const DX_IndexObject* io);
        EreturnCodes TryRecycleFile(int fIndex);
        void TryRecycleQueue( );
        char* GetFileName(int fIndex);
        int OpenFile(int whichFile);
        EreturnCodes CreatEndFile( );
        void UpdateIndexFile( );
        void UpdateFileIndex( );
        EreturnCodes ExpandQueue( );
        EreturnCodes MarkObjectInFile(const DX_IndexObject* iObj,
                EQueueObjectStatus status);
        //Unix does not have low-level eof IO function available
        int IsEOF(int fd);
        //used by performance monitor
        double totalMsgCacheTime;
        double totalMsgProcessTime;
        long numOfMsgCommited;
        void SetDequeueTime(DX_QueueObject *qo);
```

```
        void SetEnqueueTime(DX_QueueObject *qo);
        void CompleteCommitCalculation(DX_QueueObject *qo);
};
```

Enqueue( ) creates a queue object marked as NEW_OBJECT and inserts it into memory buffer. EnqueueCommit( ) serializes Common Object, writes a queue object into a queue file and marks the queue object as ENQUEUED_OBJECT. CompleteEnqueueCommit( ), which is called after all the operations in a transaction have been committed successfully, removes a queue object from the memory buffer and frees memory of Common Object. EnqueueRollback( ) marks the queue object as DELETED_OBJECT in the queue file, deletes the Common Object file, removes the queue object from the memory buffer, and frees memory of Common Object.

Dequeue( ) attempts to find a queue object marked as NORMAL_OBJECT first from the memory buffer. If it can not find one, it will try to find one from the queue files. If Dequeue( ) finds a queue object marked as NORMAL_OBJECT in a file, it creates a queue object, marks it as ACTIVE_OBJECT, inserts it into the memory buffer, and de-serializes the Common Object it refers to and returns the Common Object to the caller. During this process, if Dequeue( ) can not de-serialize the Common Object, it will mark the queue object as DELETED_OBJECT in the queue file and continue its search.

During the de-serialization process of a Common Object, a backup file of the Common Object is created for the purpose of the Rollback( ) method which can restore it to the initial status. DequeueCommit( ) removes the Common Object file. CompleteDequeueCommit( ), which is called after all operations in a transaction have been committed successfully, marks the queue object as DELETE_OBJECT in the queue file, removes the queue object from the memory buffer, and removes the backup file of the Common Object created by the Dequeue( ) method. DequeueRollback( ) restores the Common Object from the backup file, deletes the backup file, and marks the queue object as NORMAL_OBJECT in the memory buffer.

DX_DBQueue is the database-based implementation of the DX_Queue interface. Its instance is mapped to a single table per queue at run-time. The order of the records is determined by the enqueue time stamp. All dequeue operations are sorted by priority and enqueue time stamp. An illustrative example of a DX_DBQueue implementation is provided as follows:

EXAMPLE #61

```
class: DX_DBQueue : public DX_Queue
{
    friend class DX_QueueManager;
    private:
        DX_DBQueue(const char* qName);
        ~DX_DBQueue( );
        EreturnCodes Enqueue(DX_CommonObject& co, const char* ProcessId,
                const char* label, const char* comment,
                DX_QueueTransaction& transaction, EPriorityCode
    priority);
        DX_CommonObject* Dequeue(DX_QueueTransaction &);
        DX_CommonObject* Dequeue(DX_QueueTransaction& transaction, int priority);
        DX_CommonObject* Dequeue(DX_QueueTransaction& transaction,
                const char* ObjectID, const char* ObjectLabel);
        //Virtual methods inherited from DX_Queue and NOT USED
        EreturnCodes Commit(DX_QueueOperation& oper) {return FAILED;}
        EreturnCodes CompleteCommit(DX_QueueOperation& oper) {return FAILED;}
        EreturnCodes Rollback(DX_QueueOperation& oper) {return FAILED;}
        static EreturnCodes Commit(DX_QueueTransaction& transaction);
        static EreturnCodes Rollback(DX_QueueTransaction& transaction);
        static EreturnCodes CreateTable(int DBcontextId, const char* qName);
        EreturnCodes DestroyStorage( );
        EreturnCodes Flush(EPriorityCode priority);
        EreturnCodes RemoveObject(DX_QueueObject* qObj);
        EreturnCodes GotoBeginning(EPriorityCode priority,
                DX_IndexObject &cursor){return SUCCESS;}
        EreturnCodes GetQueueView(EPriorityCode priority, DX_IndexObject &cursor,
                DX_QueueObjectList* &list, int size);
        //used for the performance monitor
        void GetQueuePerformance(long *NumOfMsgProcessed,
                double *avgMsgCacheTime,
                double *avgMsgProcessTime);
        void Reset( );
        static EreturnCodes GetTableSpaceUsage(float &usage);
        static char** GetAllQueueNames(int& number);
        //Data member
        DX_Mutex* WeightMutex;
        //used by performance monitor
        long *numOfMsgCommited;
        double *totalMsgCacheTime;
```

```
    double *totalMsgProcessTime;
    static void CommitCalculations(DX_QueueTransaction &transaction);
};
```

The DX_IndexObject class is important for all the queue operations. It is used to uniquely identify the location at which a Common Object is stored, and is further used for internal routing of all queue requests. The DX_IndexObject class is member of the DX_QueueObject class and DX_QueueOperation class. Its members include queue name, queue priority, storage type, file handle, file index, record offset, and record sequence. An illustrative example of a DX_IndexObject implementation is provided as follows:

EXAMPLE #62

```
class: DX_IndexObject
{
friend class DX_QueueObject;
friend class DX_QueueOperation;
friend class DX_FileSubQueue;
friend class DX_FileQueue;
friend class DX_DBQueue;
friend class DX_QueueManager;
public:
    //Because GetQueueView needs an instance of DX_IndexObject
        as cursor
    //and user should be able free the instance after use
    ~DX_IndexObject( );
private:
    DX_IndexObject(EstorageTypes type);
    DX_IndexObject(EstorageTypes type, const char *qName,
    EPriorityCode priority);
    DX_IndexObject(const DX_IndexObject& inputIO);
    DX_IndexObject& operator=(const DX_IndexObject&
    inputIO);
    in line EstorageTypes GetStorageType( ) const
    {
        return StorageType;
    }
    in line const int GetFileHandle( ) const
    {
        return FileHandle;
    }
    in line const char* GetQueueName( ) const
    {
        return QueueName;
    }
    in line EPriorityCode GetPriority( ) const
    {
        return Priority;
    }
    in line int GetFileIndex( ) const
    {
        return FileIndex;
    }
    in line long GetRecordOffset( ) const
    {
        return RecordOffset;
    }
    in line long GetTimeStamp( ) const
    {
        return TimeStamp;
    }
    EreturnCodes SetFileHandle(int fh);
    EreturnCodes SetQueueName(const char* qName);
    EreturnCodes SetPriority(EPriorityCode priority);
    EreturnCodes SetRecordOffset(long rOffset);
    EreturnCodes SetFileIndex(int fIndex);
    EreturnCodes SetTimeStamp(long tm);
```

```
private:
    char* QueueName;
    EPriorityCode Priority;
    EstorageTypes StorageType;
    int FileHandle; //handle to a file already opened
    int FileIndex;
    long RecordOffset;
    long TimeStamp; //enqueue time
};
```

The invocation of the Enqueue( ) and Dequeue( ) API is effected by sending a request to the Queue Manager Object. In response to a request, the Queue Manager Object locates the correct queue and populates the operations to that queue object. When Enqueue( ) is invoked, the object is placed into a buffer list and will not be collapsed into a data stream until Commit( ) is invoked. Until the commit time, the DX_IndexObject attribute of the DX_QueueOperation object retains the real meaning, which may be used in connection with a rollback operation if the commit operation is not successfully executed. For purposes of serialization, if the queue is a database, the row-level locking provided by the database is used. If the queue is a file, file access control is used. When a Common Object is serialized at commit time, a priority tag is appended to its private attribute list, such that when the Common Object is dequeued, its priority can be easily determined.

When Dequeue( ) is invoked, the oldest entry with the proper priority is retrieved with the marshalled object then being instantiated as a Common Object using the Demarshal( ) method invocation. This mechanism provides database row-locking on read events to prevent parallel gateways reading the same queued requests. If the queue is file based, record lock is used. The logic to determine which priority queue should be invoked on implemented inside the DX_Queue object.

A description of the queue record structure will now be described. Each queued entry contains the following data: OID of the entry in the object table/file that contains the flattened object; object label; object status; offset or sequence; owner process identification string; and annotation or comment information. Table 3 below is a graphical representation of a typical queue record.

TABLE 3

|      | OID    | Object-Label | Priority | Enqueue-Time     | ProcessId | Object-Comment |
|------|--------|--------------|----------|------------------|-----------|----------------|
| Type | String | String       | Integer  | Unsigned Long    | String    | String         |

The Error Queue is needed to provide storage for run-time processing failures. Since the entries are stored in a queue with an index to the object that generated the error, the processing logic can decide what further operations should be performed. The implementation of Error Queue is as an instance of DX_Queue. Since no priority issue is involved in Error Queue, the priority argument of the queue operation is relegated to a dummy argument, and only one of the internal child queues need be used.

The Error Queue contains the following data: OID of the entry in the object table/file that contains the flattened object; object label; object status; offset or sequence; owner process identification string; and annotation or comment information. An Error Queue record has a structure substantially equivalent to the record structure shown in Table 3 above.

Objects are stored and retrieved from a persistent store in an efficient manner. Two types of object storage, termed relational database storage and file storage, are implemented for this purpose. The object persistency is implemented using Marshal( ), Demarshal( ), and DeleteStorage( ) methods of the DX_CommonObject class, where a parameter is passed to indicate storage type. A policy for object caching and sharing may also be employed.

Since database implementation may vary among venders and file based persistency is needed, the object persistency model has been developed to be independent from any database storage technology. This approach involves collapsing the object into a raw binary data stream, and uses various headers to denote any marker and priority related information. The headers of a Common Object typically include OID and priority tag information. Table 4 provide below illustrates a how a Common Object may be stored in a typical database.

TABLE 4

| | OID | Size | Image |
|---|---|---|---|
| Column Type | VARCHAR(128) | NUMBER(10) | LONG RAW |

As stated previously, all database access is hidden inside the Enqueue( ) and Dequeue( ) methods of DX_QueueManager and Marshal( ), Demarshal( ), and DeleteStorage( ) methods of DX_CommonObject. In one embodiment, all vendor specific access mechanisms may be delivered in a separate set of database enabled libraries.

Serialization and de-serialization optimization refers to the ability to collapse and inflate a tree-like object for transmission beyond the bounds of a functional block. The example below is provided to illustrate usage of the Marshal( ), Demarshal( ) methods within this context:

EXAMPLE #63 marshal
   void Marshal(int StorageType, int DatabaseContextld);
demarshal
   void Demarshal(const char* OID, int StorageType, int DatabaseContextld);

It is noted that when serializing and de-serializing an object in a Java™ environment, the Rouge Wave Jtools Java™ foundation classes may be used since they project a broad set of base classes and are compatible with the Rogue Wave Tools.h++ classes used in C++.

File-based database access is invoked using the Marshal( ), Demarshal( ), and DeleteStorage( ) methods from the Common Object with the output argument set to a file. Each object may be stored to a separate file where the filename incorporates the object ID. By using the object counter mechanism as a directory name, files can be spread evenly across a file system for better access time.

In some applications, an ability to perform extended transactions may be required to guarantee successful processing and message delivery. This transaction processing does not need to be as full scale as a TP monitor, but it must generally be able to guarantee successful completion or return of the initial request to its initial state or perform error handling. Extended transaction mechanisms are supported so that a user can define a run-time transaction and perform transactional operations. More specifically, this API includes Begin( ), Commit( ), and Rollback( ) operations.

A transaction object should be created and destroyed as a local object of a thread. If neither Commit( ) nor Rollback( ) was called when a thread exits, all operations executed by this thread are rolled back. For a database implementation, the native transaction control mechanism of the database is used. For a file implementation, a transaction object contains a list recording of all operations in the current transaction. This memory buffer is used to buffer all queue operations and will not be written into file storage until commit time. Rollback( ) removes the operations from that memory buffer for operations that have not been committed. Since Commit( ) might fail, Rollback( ) also cleans the entries in the queue files and Common Object file for those operations that failed at commit time.

To maintain the extended transaction concept and operation, a transaction object is passed as an argument for each queue operation. The queue manager fills the operation into that transaction object argument so that all queue operations are recorded into that transaction object. The Commit( ) and Rollback( ) methods of a queue transaction object are actually routed to the Commit( ) and Rollback( ) methods of the queue manager, which actually performs the transaction operations.

Concerning the ownership of pointers, once Enqueue( ) is invoked, the DX_QueueManager and its related components take over all ownership of the object's pointer, irrespective of whether either Commit( ) or Rollback( ) will be called later. When Dequeue is invoked, ownership of the object's pointer is given to the caller, irrespective of whether either Commit( ) or Rollback( ) will be called later.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of transporting data, comprising:
   receiving a data stream from each of a plurality of source applications, each of the data streams comprising informational content and having a technology dependent form associated with a source protocol;
   converting the data streams from the technology dependent forms to technology independent forms not associated with the respective source protocols and not associated with respective destination protocols of one or more destination applications;
   identifying the one or more destination applications;
   transporting the data streams having the technology independent forms;
   transforming the data streams from the technology independent forms to technology dependent forms associated with the respective destination protocols of the one or more of the destination applications; and
   transmitting all or a portion of the data streams having the technology dependent forms to the one or more of the destination applications.

2. The method of claim 1, further comprising processing the data streams using pre-established logic associated with each of the data streams.

3. The method of claim 2, wherein the pre-established logic associated with each of the data streams is alterable by a user.

4. The method of claim 1, wherein transmitting the data streams comprises transmitting the data streams asynchronously or pseudo-synchronously to the destination applications.

5. The method of claim 1, wherein identifying one or more destination applications comprises applying routing logic associated with each of the data streams to facilitate transmission of the data streams to the destination applications.

6. The method of claim 5, wherein the routing logic is alterable by a user.

7. The method of claim 1, further comprising tracking each of the data streams during converting, identifying, or transforming operations.

8. The method of claim 7, further comprising logging errors occurring during converting, identifying, or transforming operations.

9. The method of claim 1, further comprising validating the data streams.

10. A method of transporting data, comprising:
receiving, from a source application, data comprising informational content in a technology dependent form associated with a source protocol;
converting the data from the technology dependent form associated with the source application to a technology independent form not associated with the source protocol and not associated with respective destination protocols of one or more destination applications;
identifying the one or more destination applications;
transporting the data having the technology independent form;
transforming the data from the technology independent form to a technology dependent form associated with the respective destination protocols of the one or more of the destination applications; and
transmitting all or a portion of the data in the technology dependent form to the one or more of the destination applications.

11. The method of claim 10, further comprising processing the data in the technology independent form.

12. The method of claim 11, wherein processing the data comprises altering the data according to pre-established logic.

13. The method of claim 12, wherein the pre-established logic is alterable by a user.

14. The method of claim 10, wherein transmitting the data comprises transmitting the data asynchronously or pseudo-synchronously to the destination applications.

15. The method of claim 10, wherein identifying one or more destination applications comprises applying routing logic to facilitate transmission of the data to the destination applications.

16. The method of claim 15, wherein the routing logic is alterable by a user.

17. The method of claim 10, further comprising tracking the data during converting, identifying, or transforming operations.

18. The method of claim 17, further comprising logging errors occurring during converting, identifying, or transforming operations.

19. A method of transporting data, comprising:
receiving data from a source application, the data comprising information associated with a source format;
disassociating the information from its associated source format;
converting the disassociated information to information having a generic format not associated with the source application and not associated with one or more destination applications;
identifying the one or more destination applications;
transporting the information having the generic format;
transforming the information having the generic format to information having a format compatible with the respective one or more of the destination applications, the formats of the one or more of the destination applications being dissimilar to the source format; and
transmitting all or a portion of the transformed information to the one or more of the destination applications.

20. The method of claim 19, further comprising processing the information having the generic format using pre-established business logic.

21. The method of claim 20, further comprising altering the business logic by a user.

22. The method of claim 19, further comprising applying routing logic to facilitate transmission of the transformed information to the destination applications.

23. The method of claim 22, further comprising altering the routing logic by a user.

24. The method of claim 19, wherein transmitting the transformed information further comprises asynchronously or pseudo-synchronously transmitting the transformed information to the destination applications.

25. The method of claim 19, further comprising:
tracking processing of the information having the generic format; and
logging errors occurring during the processing of the information having the generic format.

26. The method of claim 19, further comprising producing performance data associated with processing of the information having the generic format.

27. The method of claim 19, further comprising validating the received data.

28. A system for transporting data among applications, comprising:
an input data adapter comprising an input interface and an input data converter, the input interface receiving an input data stream comprising informational content and having a technology dependent form associated with a source protocol of a source application, the input data converter converting the input data stream having the technology dependent form to input data having a technology independent form not associated with the source protocol and not associated with a plurality of destination applications;
a processor communicatively coupled to the input adapter and coordinating the input data having the technology independent form, the processor coordinating transmission of all or a portion of the input data to the plurality of destination applications; and
a plurality of output adapters each communicatively coupled to the processor and a respective one of the plurality of destination applications, each of the output adapters comprising an output data converter that converts the input data having the technology independent form to an output data stream having a technology dependent form associated with a destination protocol compatible with a respective destination application, and each of the output adapters further comprising an output interface that transmits the output data stream to the respective destination application.

29. The system of claim 28, wherein the input data adapter implements logic for processing the input data stream having the technology dependent form.

30. The system of claim 28, wherein each of the output data adapters implements logic for processing the input data having the technology independent form.

31. The system of claim 29, further comprising an interface for altering the logic by a user.

32. The system of claim 30, further comprising an interface for altering the logic by a user.

33. The system of claim 28, wherein the processor comprises a plurality of distributed processing units.

34. The system of claim 28, wherein the processor is coupled to a receive queue and a plurality of send queues, the receive queue receiving the input data having the technology independent form from the input data adapter and the processor coordinating transmission of all or a portion of the input data having the technology independent form to one or more of the send queues.

35. The system of claim 34, wherein the processor communicates control signals to the send queues to coordinate transmission of all or a portion of the input data having the technology independent form to one or more of the output data adapters.

36. The system of claim 35, wherein processor coordinates transmission of the input data having the technology independent form to one or more of the output data adapters in an asynchronous or pseudo-synchronous manner.

37. The system of claim 28, wherein the receive queue operates as a first-infirst-out buffer.

38. A system for transporting data among applications, comprising:
   a plurality of input data adapters each comprising an Input interface and an input data converter, each of the input interfaces receiving an input data stream comprising informational content and having a technology dependent form associated with a source protocol of a respective source application, the input data converters converting the input data streams having technology dependent forms to input data streams having technology independent forms not associated with the respective source protocols and not associated with a plurality of destination applications;
   a processor communicatively coupled to the input adapters and coordinating the input data streams having the technology independent form, the processor coordinating transmission of all or a portion of the input data streams having the technology independent form to the plurality of destination applications; and
   a plurality of output adapters each communicatively coupled to the processor and a respective one of the plurality of destination applications, each of the output adapters comprising an output data converter that converts a respective input data stream having the technology independent form to an output data stream having a technology dependent form associated with a destination protocol compatible with a respective destination application, and further comprising an output interface that transmits the output data stream to the respective destination application.

39. The system of claim 38, wherein each of the input data adapters implements logic for processing the respective input data stream having the technology dependent form.

40. The system of claim 38, wherein each of the output data adapters implements logic for processing the output data stream having the technology dependent form compatible with the respective destination application.

41. The system of claim 38, wherein the processor comprises a plurality of distributed processing units.

42. The system of claim 38, wherein the processor is coupled to a receive queue and a plurality of send queues, the receive queue receiving the input data streams from the input data adapters and the processor coordinating transmission of all or a portion of the input data streams having technology independent forms to the send queues.

43. The system of claim 42, wherein the processor communicates control signals to the send queues to coordinate transmission of the input data streams having technology independent forms to one or more of the output data adapters in an asynchronous or pseudo-synchronous manner.

44. A computer readable medium tangibly embodying a program executable for transporting data, comprising:
   receiving, from a source application, data comprising informational content in a technology dependent form associated with a source protocol;
   converting the data from the technology dependent form associated with the source application to a technology independent form not associated with the source protocol and not associated with destination protocols associated with one or more destination applications;
   identifying the one or more of the destination applications;
   transporting the data having the technology independent form;
   transforming the data from the technology independent form to a technology dependent form comprising a destination protocol associated with each of the one or more of the destination applications; and
   transmitting all or a portion of the data in the technology dependent form to the one or more of the destination applications.

45. The medium of claim 44, further comprising altering the data according to pre-established logic.

46. The medium of claim 45, wherein the pre-established logic is alterable by a user.

47. (New) The medium of claim 44, wherein identifying one or more destination applications comprises applying routing logic to facilitate transmission of the data to the destination applications.

48. The medium of claim 47, wherein the routing logic is alterable by a user.

49. The medium of claim 44, further comprising tracking the data during converting, identifying, or transforming operations.

50. The method of claim 49, further comprising logging errors occurring during converting, identifying, or transforming operations.

51. A system for transporting data, comprising:
   means for receiving data comprising informational content in a technology dependent form associated with a source protocol from a source application;
   means for converting the data from the technology dependent form to a technology independent form not associated with the source protocol and not associated with destination protocols associated with one or more destination applications;
   means for identifying the one or more destination applications;
   means for transporting the data having the technology independent form;

means for transforming the data from the technology independent form to a technology dependent form comprising a destination protocol associated with each of the one or more of the destination applications; and means for transmitting all or a portion of the data in the technology dependent form to the one or more of the destination applications.

52. The system of claim 51, further comprising means for altering the data according to pre-established logic.

53. The system of claim 52, further comprising means for altering the pre-established logic by a user.

54. The system of claim 51, further comprising means for applying routing logic to facilitate transmission of the data to the destination applications.

55. The system of claim 54, further comprising means for altering the routing logic by a user.

56. The system of claim 51, further comprising means for tracking the data during converting, identifying, or transforming operations.

* * * * *